US 11,444,814 B2

(12) United States Patent
Dutronc et al.

(10) Patent No.: US 11,444,814 B2
(45) Date of Patent: Sep. 13, 2022

(54) INNOVATIVE USE OF THE KALMAN FILTER IN RECEPTION MATRICES FOR PERFOMING AN IMPROVED ESTIMATION OF TELECOMMUNICATION SIGNALS

(71) Applicant: EUTELSAT S A, Paris (FR)

(72) Inventors: Jacques Dutronc, Paris (FR); Antonio Saitto, Paris (FR)

(73) Assignee: EUTELSAT S A, Issy les Moulineaux (FR)

( * ) Notice: Subject to any disclaimer, the term of this patent is extended or adjusted under 35 U.S.C. 154(b) by 0 days.

(21) Appl. No.: 17/043,351

(22) PCT Filed: Mar. 30, 2018

(86) PCT No.: PCT/IB2018/000483
§ 371 (c)(1),
(2) Date: Sep. 29, 2020

(87) PCT Pub. No.: WO2019/186222
PCT Pub. Date: Oct. 3, 2019

(65) Prior Publication Data
US 2021/0028965 A1 Jan. 28, 2021

(51) Int. Cl.
H04B 1/10 (2006.01)
H04L 27/233 (2006.01)
(Continued)

(52) U.S. Cl.
CPC ...... H04L 27/2334 (2013.01); H04L 25/0384 (2013.01); H04L 27/2335 (2013.01);
(Continued)

(58) Field of Classification Search
CPC ............. H04L 27/2334; H04L 25/0384; H04L 27/2335; H04L 27/2338; H04L 27/32;
(Continued)

(56) References Cited

U.S. PATENT DOCUMENTS 6,285,720 B1 * 9/2001 Martone .............. H04B 7/0613
375/219
6,735,258 B1 * 5/2004 Trott ..................... H04L 1/0057
375/308

FOREIGN PATENT DOCUMENTS

WO   WO 2014/016655 A1   1/2014
WO   WO 2015/067987 A1   5/2015
(Continued)

OTHER PUBLICATIONS

Andrew Logothetis, Atif Osserian, Per Zetterberg, 2005 IEEE, Single Carrier Frequency Domain Equalization on a Real-Time DSP-Based MIMO Test-Bed, 16th International Symposium on Personal, Indoorand Mobile Radio communications, pp. 131-135 (Year: 2005).*

(Continued)

Primary Examiner — Tanmay K Shah
(74) Attorney, Agent, or Firm — Pillsbury Winthrop Shaw Pittman LLP

(57) ABSTRACT

A radio communications method includes carrying out, by a transmitter, transmission operations that include generating digital transmission signals carrying symbols to be transmitted and having a predefined time length; and transmitting a radio frequency signal carrying, in successive, non-overlapped time frames or slots having the predefined time length, the digital transmission signals generated. The method further includes carrying out, by a receiver, reception operations that include receiving the radio frequency signal transmitted by the transmitter; processing the received radio frequency signal to obtain a corresponding digital incoming signal; applying an oversampling operation to the digital incoming signal thereby obtaining an oversampled digital incoming signal; detecting successive, non-overlapped time frames/slots with the predefined time length in the oversampled digital incoming signal; and, for each (Continued)

detected time frame/slot, estimating respective symbols carried by the oversampled digital incoming signal in the time frame/slot with a predefined reception matrix incorporating a predefined Kalman filter.

10 Claims, 39 Drawing Sheets

(51) Int. Cl.
    *H04L 25/03*     (2006.01)
    *H04L 27/32*     (2006.01)
    *H04B 1/69*     (2011.01)
    *H04L 5/04*     (2006.01)

(52) U.S. Cl.
    CPC .......... *H04L 27/2338* (2013.01); *H04L 27/32* (2013.01); *H04B 1/69* (2013.01); *H04L 5/04* (2013.01)

(58) Field of Classification Search
    CPC ....... H04L 5/04; H04L 27/18; H04L 25/0242; H04L 27/2644; H04B 1/69; H04B 1/7093
    USPC .......................................................... 375/350
    See application file for complete search history.

(56) References Cited

FOREIGN PATENT DOCUMENTS

| WO | WO 2015/068036 A1 | 5/2015 |
| --- | --- | --- |
| WO | WO 2015/189653 A1 | 12/2015 |
| WO | WO 2015/189703 A2 | 12/2015 |
| WO | WO 2015/189704 A2 | 12/2015 |
| WO | WO 2018/109518 A1 | 6/2018 |

OTHER PUBLICATIONS

International Search Report as issued in International Patent Application No. PCT/IB2018/000483, dated Dec. 13, 2018.

Enescu, M., et al., "Recursive estimator for Blind MIMO equalization via BSS and fractional sampling," $3^{rd}$ IEEE Signal Processing Workshop on Signal Processing Advances in Wireless Communications, Mar. 2001, pp. 94-97, XP010542279.

Feng, T. S., et al., "Novel Procedure for Reliable Signal Detection in an Unknown Wireless Environment," 2006 IEEE Radio and Wireless Symposium, Jan. 2006, pp. 11-14, XP010907040.

Logothetis, A., et al., "Single Carrier Frequency Domain Equalization on a Real-Time DSP-Based MIMO Test-Bed," 2005 IEEE International Symposium on Personal, Indoor and Mobile Radio Communications, vol. 1, Sep. 2005, pp. 131-135, XP010926468.

Lim, T. J., et al., "The Kalman Filter as the Optimal Linear Minimum Mean-Squared Error Multiuser CDMA Detector," IEEE Transactions on Information Theory, vol. 46, No. 7, Nov. 2000, pp. 2561-2566, XP011027788.

Park, S., et al., "Joint Blind Symbol Rate Estimation and Data Symbol Detection for Linearly Modulated Signals," JCOMMS, Nov. 2009, Retrieved from the Internet: URL:http://people.qatar.tamu.edu/khalid.qaraqe/kqperso/Joint BlindSymbol Rate Estimation.pdf, 18 pages, XP055201697.

\* cited by examiner

INNOVATIVE USE OF THE KALMAN FILTER IN RECEPTION MATRICES FOR PERFOMING AN IMPROVED ESTIMATION OF TELECOMMUNICATION SIGNALS

CROSS-REFERENCE TO RELATED APPLICATIONS

This application is the U.S. National Stage of PCT/IB2018/000483, filed Mar. 30, 2018. The content of this application is incorporated herein by reference in its entirety.

TECHNICAL FIELD OF THE INVENTION

The present invention relates, in general, to an improved radio communications system and method (namely, a system and a method for implementing communications at radio frequency (RF), i.e., at frequencies that can range from a few KHz to hundreds of GHz).

More specifically, the present invention concerns the use of the Kalman filter in reception matrices for carrying out an improved estimation of telecommunication signals at reception side, preferably in radio communications systems based on twisted waves.

In this respect, it is worth noting that, in the present application, the expressions "twisted modes/signals/waves" are used to denote Orbital Angular Momentum (OAM) modes with topological charge different from zero, and the expressions "main/conventional/traditional/plane mode/signal/wave" are used to denote the OAM mode with topological charge equal to zero. Moreover, in the present application, the expression "higher order mode(s)" (or, equivalently, the corresponding acronym HOM(s)) is used as synonym of "twisted mode(s)" (i.e., OAM mode(s) with topological charge different from zero).

BACKGROUND ART

In recent years, the Applicant has developed an innovative technique for radio communications based on a completely new concept named frequency/time twisted waves.

In particular, this technique is based on a "modulation space", which produces a new kind of symmetry for creating orthogonal signal families, based on even and odd properties of a signal structure defined on a reference RF frame. The presence of even and odd signals allows introducing two sets of orthogonal signals, namely: main mode signals (which are "even") and HOM signals (which are "odd").

In this respect, it is worth referring, first of all, to Applicant's International application WO 2014/016655 A1 (whose content is herewith enclosed by reference), that concerns a multidimensional space modulation technique for transmitting and receiving radio vortices at frequencies ranging from a few kHz to hundreds of GHz.

In particular, the multidimensional space modulation according to WO 2014/016655 A1 is actually a phase modulation applied to signals to be transmitted at RF such that to result in orthogonal radio vortices along the boresight direction. Therefore, the modulation according to WO 2014/016655 A1 is conveniently called multidimensional space modulation because it allows orthogonal RF OAM modes to be transmitted and received in one and the same direction, namely the boresight direction, wherein each OAM mode represents a specific space channel along the boresight direction, which specific space channel is orthogonal to all the other space channels represented by the other OAM modes.

In order for the multidimensional space modulation according to WO 2014/016655 A1 to be better understood, attention is drawn, by way of example, to the fact that a twisted RF signal having, or carrying, the OAM mode m=+1 (where m, as is known, is called topological charge) is characterized by only one clockwise rotation of 360° of the Poynting vector around the propagation axis per period and, thence, it can be generated by transmitting, for example by means of four ring-arranged transmitting antenna elements, RF signals associated with phases of 0°, 90°, 180°, and 270° clockwise distributed among said four ring-arranged transmitting antenna elements. Instead, in order to transmit at RF the OAM mode m=+, WO 2014/016655 A1 teaches to exploit only one antenna transmitting the four different phases 0°, 90°, 180°, and 270° at different times or at different frequencies.

From a conceptual perspective, according to WO 2014/016655 A1, in order to manage OAM rotation, a supplementary phase modulation is introduced, which leaves only a residue of the OAM rotation and keeps the OAM signature in a limited bandwidth. This residual rotation achieved by means of the supplementary phase modulation allows a signal having a proper bandwidth to be orthogonal to another signal having a different rotation. Therefore, an RF twisted wave can be transmitted by means of a modulated waveform and can be received by an antenna operating in the complex conjugated mode.

In detail, WO 2014/016655 A1 discloses a device for generating OAM modes for radio communications, which device is designed to receive one or more input digital signals, each of which:

has a respective sampling period, which is a respective multiple of a given sampling period; and occupies a frequency bandwidth, which is a respective fraction of a given available frequency bandwidth.

The device for generating OAM modes according to WO 2014/016655 A1 is:

operable to
  apply, to each input digital signal, a respective space modulation associated with a respective OAM mode having a respective topological charge to generate a corresponding modulated digital signal carrying said respective OAM mode, and
  provide an output digital signal based on the modulated digital signal(s); and
configured to apply, to each input digital signal, the respective space modulation by interpolating said input digital signal and phase-modulating the interpolated input digital signal so as to generate a corresponding phase-modulated digital signal carrying said respective OAM mode, having the given sampling period, and occupying the given available frequency bandwidth.

In particular, the device for generating OAM modes according to WO 2014/016655 A1 is configured to apply, to each input digital signal, the respective space modulation by:

digitally interpolating said input digital signal thereby generating a corresponding digitally-interpolated signal having the given sampling period; and phase-modulating the corresponding digitally-interpolated signal on the basis of digital phase shifts related to the respective OAM mode so as to generate the corresponding phase-modulated digital signal.

For example, in order to generate OAM mode +1, WO 2014/016655 A1 teaches to:

digitally interpolate an input digital signal (having a sampling period equal to $4T_0$, where $T_0$ denotes the given sampling period) by outputting, for each digital sample of said digital signal, four corresponding digital samples with time step (i.e., time distance) $T_0$, thereby generating a corresponding digitally-interpolated signal having the given sampling period $T_0$;

apply, to each set of four digital samples obtained by means of the digital interpolation, digital phase shifts related to the OAM mode +1 (namely, digital phase shifts related to phase values $0$, $\pi/2$, $\pi$ and $3\pi/2$) so as to generate a corresponding set of four phase-shifted digital samples, which corresponding set of four phase-shifted digital samples carries the OAM mode +1; and combine the sets of four phase-shifted digital samples into a single phase-modulated digital signal carrying the OAM mode +1, having the given sampling period $T_0$, and occupying the given available frequency bandwidth.

Accordingly, in order to generate OAM mode −1, WO 2014/016655 A1 teaches to:

digitally interpolate an input digital signal (having a sampling period equal to $4T_0$, where $T_0$ denotes the given sampling period) by outputting, for each digital sample of said digital signal, four corresponding digital samples with time step (i.e., time distance) $T_0$, thereby generating a corresponding digitally-interpolated signal having the given sampling period $T_0$;

apply, to each set of four digital samples obtained by means of the digital interpolation, digital phase shifts related to the OAM mode −1 (namely, digital phase shifts related to phase values $0$, $-3\pi/2$, $-1$ and $-\pi/2$) so as to generate a corresponding set of four phase-shifted digital samples, which corresponding set of four phase-shifted digital samples carries the OAM mode −1; and combine the sets of four phase-shifted digital samples into a single phase-modulated digital signal carrying the OAM mode −1, having the given sampling period $T_0$, and occupying the given available frequency bandwidth.

The generation of higher-order OAM modes (i.e., with $|m|>1$, where m denotes the topological charge of the OAM mode considered) according to WO 2014/016655 A1 is performed, mutatis mutandis, conceptually in the same way as the generation of OAM modes ±1 previously described.

Additionally, Applicant's International applications WO 2015/067987 A1 and WO 2015/068036 A1 (whose contents are herewith enclosed by reference) disclose, both, the feasibility of increasing transmission capacity at RF (including frequencies from a few kHz to hundreds of GHz) by exploiting a proper approximation in time domain of the Hilbert transform of digital analytical signals, wherein said approximation of the Hilbert transform is obtained by exploiting time twisted waves.

Instead, Applicant's International applications WO 2015/189653 A1 and WO 2015/189704 A2 (whose contents are herewith enclosed by reference) teach, by exploiting duality between time and frequency, to use also a twisted-wave-based approximation of the Hilbert transform in frequency domain in order to increase transmission capacity.

In particular, as for time twisted waves, WO 2015/067987 A1 discloses a radio communications system comprising a transmitter and a receiver, wherein the transmitter is configured to:

generate or receive digital symbols having a given symbol rate associated with a corresponding symbol period;

generate, every S digital symbols generated/received (S being an integer higher than three), a respective multi-mode digital signal, which has a predefined time length shorter than S times the symbol period, which is sampled with a predefined sampling rate higher than the symbol rate, and which carries said S digital symbols by means of a plurality of orthogonal OAM modes comprising a main mode carrying P of said S digital symbols (P being an integer higher than zero and lower than S), and one or more secondary modes carrying the other S-P digital symbols, each secondary mode being time-shifted by half the symbol period with respect to the main mode; and transmit an RF signal carrying a sequence of the generated multi-mode digital signals.

Moreover, the receiver of the radio communications system according to WO 2015/067987 A1 is configured to:

receive the RF signal transmitted by the transmitter;

process the received RF signal so as to obtain a corresponding incoming digital signal; and extract, from successive, non-overlapped portions of the incoming digital signal sampled with the predefined sampling rate, the S digital symbols respectively carried by each incoming digital signal portion by means of the orthogonal OAM modes; wherein each of the successive, non-overlapped portions of the incoming digital signal has the predefined time length.

More in detail, the transmitter of the radio communications system according to WO 2015/067987 A1 is configured to generate a multi-mode digital signal carrying S digital symbols by:

allocating P of the S digital symbols to the main mode by providing, for each of said P digital symbols, a corresponding complex value which represents said digital symbol and is related to the main mode;

allocating each of the other S-P digital symbols to a corresponding secondary mode by providing, for each of said S-P digital symbols, a corresponding complex value which represents said digital symbol and is related to the secondary mode to which said digital symbol is allocated;

computing, by using a predefined transmission matrix, M multi-mode complex values related to M successive time instants (M being an integer equal to, or higher than, S) which, within the predefined time length, are separated by half the symbol period, wherein the predefined transmission matrix relates the S complex values representing the S digital symbols and related to the OAM modes to the M successive time instants through complex coefficients each of which is related to a respective OAM mode and to a respective time instant; and generating a multi-mode digital signal having the predefined time length and sampled with the predefined sampling rate on the basis of the M multi-mode complex values computed.

Moreover, the receiver of the radio communications system according to WO 2015/067987 A1 is configured to extract the S digital symbols carried by an incoming digital signal portion having the predefined time length and sampled with the predefined sampling rate by:

extracting, from said incoming digital signal portion, M multi-mode complex values related to M successive time instants which are, within the predefined time length, separated by half the symbol period;

computing, by using a reception matrix derived from the predefined transmission matrix through a generalized inversion technique (such as a pseudo-inverse technique), S complex values representing the S digital symbol carried by said incoming digital signal portion by means of the orthogonal OAM modes, wherein said reception matrix relates the M extracted multi-mode complex values related to the M successive time instants to the S complex values to be computed through complex coefficients each of which is related to a respective OAM mode and to a respective time instant; and determining the S digital symbols represented by the S complex values computed.

Additionally, WO 2015/068036 A1 discloses a radio communications method that comprises carrying out, by a transmitter, the following steps:

a) generating or receiving digital symbols to be transmitted, said digital symbols having a given symbol rate associated with a corresponding symbol period;

b) generating, every S digital symbols generated/received (S being an integer higher than three), a corresponding multi-mode digital signal, which has a predefined time length shorter than S times the symbol period, has a predefined bandwidth larger than the Nyquist bandwidth corresponding to the given symbol rate, and carries said S digital symbols by means of OAM modes comprising a main mode, that is an OAM mode with topological charge equal to zero and that carries P of said S digital symbols (P being an integer higher than zero and lower than S), and one or more twisted modes carrying the other S-P digital symbols, wherein each twisted mode is an OAM mode with a respective topological charge different than zero and is time-shifted with respect to the main mode;

c) generating a multi-frame digital signal comprising successive, non-overlapped time frames, each of which has the predefined time length and carries a respective multi-mode digital signal generated; and d) transmitting an RF signal carrying the multi-frame digital signal.

Moreover, the radio communications method according to WO 2015/068036 A1 further comprises carrying out, by a receiver, the following steps:

e) receiving the RF signal transmitted by the transmitter;

f) processing the received RF signal so as to obtain a corresponding incoming digital signal;

g) performing on the basis of the incoming digital signal
carrier synchronization thereby recovering frequency and/or phase carrier used by the transmitter to generate the multi-mode digital signals, clock synchronization thereby recovering the symbol rate and sampling time instants of the multi-mode digital signals generated by the transmitter, and frame synchronization thereby detecting successive, non-overlapped portions of the incoming digital signal corresponding to the successive, non-overlapped time frames of the multi-frame digital signal generated by the transmitter; and h) extracting, on the basis of the carrier, clock and frame synchronizations performed, the S digital symbols respectively carried by each detected incoming digital signal portion by means of the OAM modes.

The use of twisted waves in time domain requires, in general, the use of filters at transmission and reception sides. The use of filters introduces a convolutional process and, consequently, a potential additional complexity in the definition of an RF frame and as far as independence between frames (inter-frame interference) is concerned.

In this connection, WO 2015/067987 A1 and WO 2015/068036 A1 describe the use of one and the same filter, in particular a Gaussian filter, with the same characteristics for the main mode and the HOMs (i.e., the twisted ones). Indeed, WO 2015/068036 A1 teaches that the use of a Gaussian filter (with the same characteristics for the main mode and the HOMs) is more advantageous than, and hence preferable to, the use of a raised cosine filter (with the same characteristics for the main mode and the HOMs).

This overall channel filter has good performance, but makes complications when it is exploited in systems based on different (time-domain-based) radio communications technologies. In practical terms, some difficulties may arise for backward compatibility.

In order to solve the above problems related to the use of time twisted waves, Applicant's International application PCT/IB2016/001972 filed on 14 Dec. 2016 (whose content is herewith enclosed by reference) teaches to use:

at transmission side, different filters for the main mode and the HOMs; and at reception side, one and the same filter for the main mode and the HOMs.

This solution allows to reduce the bandwidth of the main mode with two important results:

the possibility of using, at transmission side, conventional (or almost conventional) filter shapes for the main mode and optimized filter shapes for the HOMs; and the possibility of reducing the residual interference between adjacent channels.

More in detail, PCT/IB2016/001972 discloses a radio communications method that includes carrying out, by a transmitter, transmission operations comprising:

generating first digital time signals related to a first OAM mode with topological charge equal to zero, wherein each first digital time signal includes respective first time samples carrying corresponding first digital symbols to be transmitted;

applying a first transmission filter to the first digital time signals, thereby obtaining filtered first digital time signals;

generating second digital time signals related to one or more second OAM modes with topological charge different than zero, wherein each second digital time signal includes respective second time samples carrying one or more respective second digital symbols by means of a phase, or amplitude and phase, modulation related to a respective second OAM mode with topological charge different than zero;

applying a second transmission filter to the second digital time signals, thereby obtaining filtered second digital time signals;

combining the filtered first and second digital time signals into combined digital time signals, all having one and the same predefined time length; and transmitting an RF signal carrying, in successive, non-overlapped time frames having the predefined time length, the combined digital time signals.

The radio communications method according to PCT/IB2016/001972 further includes carrying out, by a receiver, reception operations that comprise:

receiving the RF signal transmitted by the transmitter;

processing the received RF signal so as to obtain a corresponding incoming digital signal; and processing said incoming digital signal so as to extract therefrom the first and second digital symbols carried thereby.

According to PCT/IB2016/001972, the first transmission filter and the second transmission filter have different filtering characteristics.

Preferably, the first transmission filter is a Gaussian filter or a first raised-cosine-based filter, and the second transmission filter is a second raised-cosine-based filter different from said first raised-cosine-based filter.

Conveniently, processing the incoming digital signal includes processing successive, non-overlapped portions of said incoming digital signal, wherein the successive, non-overlapped portions of said incoming digital signal have the predefined time length, and wherein processing successive, non-overlapped portions of said incoming digital signal includes:
  applying a reception filter to said successive, non-overlapped portions of said incoming digital signal, thereby obtaining filtered incoming digital signal's portions; and
  extracting, by using a reception matrix, the first and second digital symbols respectively carried by said filtered incoming digital signal's portions;
wherein said reception filter is a third raised-cosine-based filter that is related to the second transmission filter.

Preferably, the first transmission filter is a square root raised cosine filter with roll-off factor equal to, or higher than, 20%, the transmission operations further comprise applying a transmission time window to the filtered first digital time signals, thereby obtaining filtered, time-limited first digital time signals, wherein combining the filtered first and second digital time signals includes combining the filtered, time-limited first digital time signals and the filtered second digital time signals into combined digital time signals, all having one and the same predefined time length.

Conveniently, the transmission time window is a raised cosine time window.

Preferably, the transmission operations further comprise arranging the filtered second digital time signals within the combined digital time signals according to a given time arrangement criterion modifiable by the transmitter (e.g., for cryptography purposes).

Instead, WO 2015/189653 A1 relates to a radio communications system and method with increased transmission capacity based on frequency twisted waves. In particular, the radio communications method according to WO 2015/189653 A1 comprises:
  carrying out, by a transmitter, the steps of
  a) providing a digital time signal carrying digital symbols to be transmitted, and
  b) transmitting an RF signal carrying said digital time signal; and
  carrying out, by a receiver, the step of
  c) receiving the RF signal transmitted by the transmitter,
  d) processing the received RF signal so as to obtain a corresponding incoming digital signal, and
  e) extracting, from the incoming digital signal, the digital symbols carried by said incoming digital signal.

The radio communications method according to WO 2015/189653 A1 is characterized in that said digital time signal carrying the digital symbols to be transmitted results from an approximation of the Hilbert transform in frequency domain, which approximation is based on a frequency main mode and one or more frequency twisted modes, wherein said frequency main and twisted modes carry, each, respective digital symbols to be transmitted.

In detail, according to WO 2015/189653 A1, the digital time signal is time-limited, carries a limited sequence of digital symbols to be transmitted, and results from:
  main mode frequency samples carrying respective digital symbols of said limited sequence via a frequency main mode; and
  twisted mode frequency samples carrying the other digital symbols of said limited sequence via one or more frequency twisted modes, wherein each frequency twisted mode is an OAM mode that is orthogonal to the frequency main mode and to any other frequency twisted mode used.

More in detail, the main mode frequency samples are at main mode frequencies spaced apart by a predetermined frequency spacing, and the twisted mode frequency samples comprise, for a frequency twisted mode, respective twisted mode frequency samples at corresponding twisted mode frequencies that:
  are related to said frequency twisted mode;
  are spaced apart by said predetermined frequency spacing; and
  are different from the main mode frequencies.

Additionally, also WO 2015/189704 A2 relates to a radio communications system and method with increased transmission capacity based on frequency twisted waves. In particular, the radio communications method according to WO 2015/189704 A2 comprises:
  carrying out, by a transmitter, the steps of
  a) generating a digital time signal, that is time-limited, carries a limited sequence of digital symbols to be transmitted and results from an approximation of the Hilbert transform in frequency domain, which approximation is based on
    a frequency main mode, that is associated with an OAM mode with topological charge equal to zero, and that includes main mode frequency samples carrying respective digital symbols of said limited sequence via said OAM mode with topological charge equal to zero, and
    one or more frequency twisted modes carrying the other digital symbols of said limited sequence, wherein each frequency twisted mode is associated with a corresponding OAM mode with a respective topological charge different than zero, and includes respective twisted mode frequency samples carrying one or more respective digital symbols of said limited sequence via said corresponding OAM mode with said respective topological charge different than zero; and
  b) transmitting an RF signal carrying the digital time signal generated; and
  carrying out, by a receiver, the step of
  c) receiving the RF signal transmitted by the transmitter,
  d) processing the received RF signal so as to obtain a corresponding incoming digital signal, and
  e) extracting, from the incoming digital signal, the digital symbols carried by said incoming digital signal.

In particular, according to WO 2015/189704 A2, for each frequency twisted mode, the respective twisted mode frequency samples are mutually phase-shifted on the basis of phase shifts related to the corresponding OAM mode with the respective topological charge different than zero.

Additionally, Applicant's International application WO 2015/189703 A2 relates to the use of frequency twisted waves to increase transmission capacity of:

in general, wireless communication systems based on Orthogonal Frequency-Division Multiplexing (OFDM) and/or Orthogonal Frequency-Division Multiple Access (OFDMA) and/or Single-Carrier Frequency-Division Multiple Access (SC-FDMA) and/or combinations/variants/developments of these technologies; and, in particular, 4G (4$^{th}$ Generation) cellular networks based on Long Term Evolution (LTE) and/or LTE Advanced standards, future 5G (5$^{th}$ Generation) cellular networks, and also wireless communication systems based on Worldwide Interoperability for Microwave Access (WiMAX) standard.

In particular, WO 2015/189703 A2 discloses a method for radio communications in a wireless communication system including one or more base stations and one or more user terminals, said method comprising performing a radio communication between a base station and a user terminal of said wireless communication system, wherein performing a radio communication includes transmitting, in a given time slot, first digital symbols by using a frequency-division technique, whereby the first digital symbols are carried by first frequency samples at respective sub-carriers, that are distributed over a predefined frequency band and belong to a given sub-carrier block.

The method according to WO 2015/189703 A2 is characterized in that performing a radio communication further includes transmitting, in said given time slot, also second digital symbols by means of one or more frequency twisted modes, wherein each frequency twisted mode carries a respective OAM mode with a respective topological charge different than zero by means of respective second frequency samples, that:

are phase-shifted with respect to each other on the basis of phase shifts related to said respective OAM mode;

carry one or more respective symbols of said second digital symbols via said respective OAM mode; and are at respective frequencies, that are distributed over said predefined frequency band and are different than the sub-carriers belonging to said given sub-carrier block.

In detail, according to WO 2015/189703 A2, the sub-carriers belonging to the given sub-carrier block are spaced apart by a predetermined frequency spacing, and each frequency twisted mode includes respective second frequency samples at respective frequencies that are spaced apart by said predefined frequency spacing and are distributed over said predefined frequency band between pairs of consecutive sub-carriers belonging to the given sub-carrier block.

More in detail, according to WO 2015/189703 A2, for each second digital symbol to be transmitted in the given time slot, a respective frequency twisted mode carries, by means of respective second frequency samples, said second digital symbol via a phase-modulation related to the OAM mode carried by said respective frequency twisted mode.

In summary, the processes for generating twisted waves in time and frequency domains can be considered as particular applications of the Hilbert transform, as shown in FIG. 1 (or, in other words, time and frequency twists can be considered as higher order modes of the Hilbert transform).

In particular, FIG. 1 schematically illustrates a comparison of the processes for generating twisted waves in time domain according to WO 2015/067987 A1, WO 2015/068036 A1 and PCT/IB2016/001972, and in frequency domain according to WO 2015/189653 A1, WO 2015/189703 A2 and WO 2015/189704 A2.

In particular, as shown in FIG. 1, both the process according to WO 2015/067987 A1, WO 2015/068036 A1 and PCT/IB2016/001972 (denoted as a whole by 11) and the process according to WO 2015/189653 A1, WO 2015/189703 A2 and WO 2015/189704 A2 (denoted as a whole by 12) are applied to a limited-band signal x(t) and include:

applying to the limited-band signal x(t) a frequency shift (block 111 and 121, respectively); and performing a time Hilbert transform of the frequency-shifted signal to get the analytical signal (block 112 and 122, respectively).

Instead, the two processes are differentiated by the fact that:

the process 11 according to WO 2015/067987 A1, WO 2015/068036 A1 and PCT/IB2016/001972 exploits an approximation in time domain of the Hilbert transform of the analytical signal to create time twisted waves (block 113); and the process 12 according to WO 2015/189653 A1, WO 2015/189703 A2 and WO 2015/189704 A2 exploits an approximation in frequency domain of the Hilbert transform of the analytical signal to create frequency twisted waves (block 123).

The use of the representation of FIG. 1, in agreement with the Hilbert transform, implies the definition of a time period, which can be assumed valid to represent the signal sequence as part of a periodic signal. This is not strictly true, of course, but in many cases it is a good approximation and represents a technique typically used in many radio communications technologies, such as Code-Division Multiplexing (CDM), Code-Division Multiple Access (CDMA), OFDM, OFDMA, etc.

In all the cases indicated above it is necessary to introduce an RF frame, which organizes the time period where the main mode (even) and the HOMs (odd) are represented. This RF frame can be assumed as the "space" where the "space modulation" represents the additional degree of freedom (or dimension) necessary for introducing the even and odd orthogonality properties.

From a mathematical perspective, the introduction of additional dimensions to optimize communication systems is largely used in Multiple-Input, Multiple-Output (MIMO) technology, where the additional dimensions are represented by a propagation environment model. However, the use of twisted waves represents a completely different layer (largely compatible with, and independent from, MIMO), where the additional dimension is added directly to the transmitted signal architecture.

The introduction of the RF frame implies that the receiving section acquires each RF frame time period in an ordered way and for each time period produces a set of results related to the values of the digital symbols transmitted via OAM modes (i.e., main+twisted modes). The acquisition of the RF frame may be conveniently performed by an RF frame acquisition and hold block and the digital symbol values are extracted by using a suitable reception matrix, called also generalized matched filter (GMF) (in this connection reference can be made, again, to the above-referenced Applicant's International applications).

OBJECT AND SUMMARY OF THE INVENTION

A first object of the present invention is that of improving performance of radio communications systems based on twisted waves.

A second object of the present invention is that of improving performance also of conventional digital communication systems, such as those based on based on raised cosine, CDM/CDMA and/or OFDM/OFDMA.

These and other objects are achieved by the present invention in that it relates to a radio communications method and system, as defined in the appended claims.

BRIEF DESCRIPTION OF THE DRAWINGS

For a better understanding of the present invention, preferred embodiments, which are intended purely by way of non-limiting example, will now be described with reference to the attached drawings (all not to scale), where.

DETAILED DESCRIPTION OF PREFERRED EMBODIMENTS OF THE INVENTION

Figure 1:
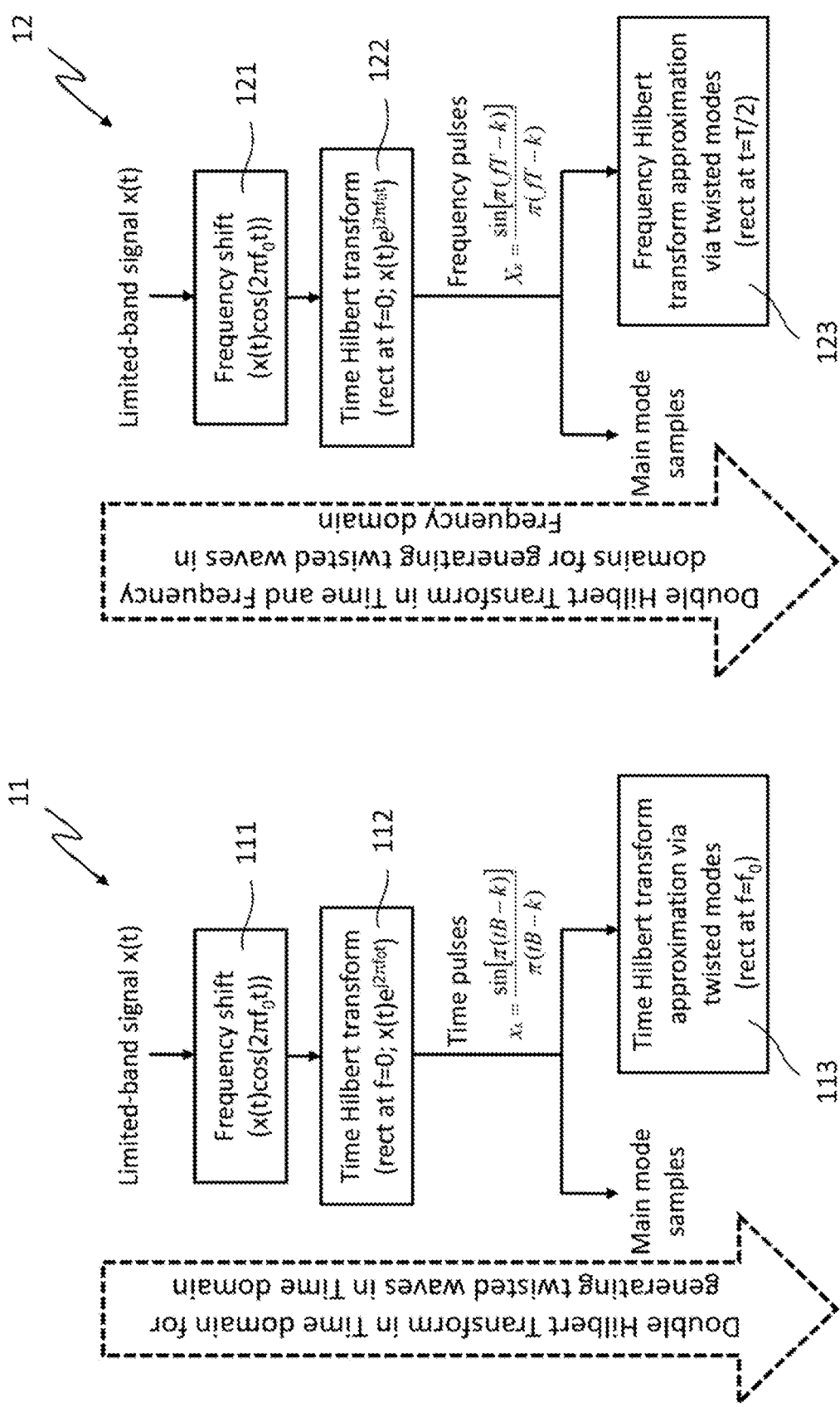
FIG. 1 schematically illustrates a comparison between a process for generating twisted waves in time domain according to WO 2015/067987 A1, WO 2015/068036 A1 and PCT/IB2016/001972 and a process for generating twisted waves in frequency domain according to WO 2015/189653 A1, WO 2015/189703 A2 and WO 2015/189704 A2.

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown and described, but is to be accorded the widest scope consistent with the principles and features disclosed herein and defined in the appended claims.

As previously explained, in the present application the expressions "twisted modes/signals/waves" are used to denote OAM modes with topological charge different than zero, and the expressions "main/conventional/traditional/plane mode/signal/wave" are used to denote the OAM mode with topological charge equal to zero. Moreover, in the present application, the expression "higher order mode(s)" (or, equivalently, the corresponding acronym HOM(s)) is used as synonym of "twisted mode(s)" (i.e., OAM mode(s) with topological charge different than zero). Additionally, for the sake of conciseness, hereinafter the word "reception" will be abbreviated to RX and the word "transmission" will be abbreviated to TX.

The present invention relates to a technique for optimizing RX matrices used, at RX side, for extracting digital symbols carried via the twisted-wave-based digital modulation(s) (in frequency/time domain) described in WO 2014/016655 A1, WO 2015/067987 A1, WO 2015/068036 A1, WO 2015/189653 A1, WO 2015/189703 A2, WO 2015/189704 A2 and PCT/IB2016/001972. The present invention allows improving overall performance of twisted-wave-based radio communications systems.

Moreover, the present invention allows optimizing also a conventional signal structure, essentially at low/medium signal-to-noise ratios (S/Ns, or SNRs), with outstanding performance.

The present invention stems from smart, innovative idea of the Applicant of applying the Kalman filter to digital communication signals.

In particular, the present invention can be advantageously applied to time twisted waves (e.g., based on raised cosine and/or CDM/CDMA), frequency twisted waves (e.g., based on OFDM/OFDMA) and also to conventional digital communications (e.g., based on raised cosine, CDM/CDMA and/or OFDM/OFDMA).

In detail, the present invention allows enhancing performance of a communication system in presence of noise by introducing, at RX side, a Kalman-filter-based estimation technique in place of conventional detection techniques. Such a Kalman-filter-based estimation is always possible for twisted waves thanks to oversampling necessary at the RX side, but it may be advantageously used also with conventional signals by implementing oversampling and by introducing an arbitrary RF frame at RX side. In this connection, it is important to stress the point that the Kalman-filter-based estimation at RX side according to the present invention may be advantageously applied to many signal structures (and, thence, not only to twisted waves).

More specifically, the present invention concerns a radio communications method including carrying out, by a transmitter, transmission operations that comprise:
- generating digital transmission signals carrying symbols to be transmitted and having a predefined time length; and
- transmitting an RF signal carrying, in successive, non-overlapped time frames or slots having the predefined time length, the digital transmission signals generated.

Moreover, the radio communications method according to the present invention further includes carrying out, by a receiver, reception operations that comprise:
- receiving the RF signal transmitted by the transmitter;
- processing the received RF signal so as to obtain a corresponding digital incoming signal;
- applying an oversampling operation to the digital incoming signal thereby obtaining an oversampled digital incoming signal;
- detecting successive, non-overlapped time frames/slots with the predefined time length in the oversampled digital incoming signal; and,
- for each detected time frame/slot, estimating respective symbols carried by the oversampled digital incoming signal in said time frame/slot by using a predefined reception matrix incorporating a predefined Kalman filter.

Preferably, the digital transmission signals are generated by using one of the following digital transmission techniques: a predefined raised-cosine-filter-based technique, a predefined code-division technique, or a predefined frequency-division technique.

Conveniently, the RF signal is transmitted through a satellite transponder.

Preferably, the generated digital transmission signals carry:
- first symbols via a first phase, or amplitude and phase, digital modulation related to an Orbital Angular Momentum (OAM) mode with topological charge equal to zero; and
- second symbols via a second phase, or amplitude and phase, digital modulation related to one or more OAM modes with topological charge different than zero.

Conveniently, the first and second phase, or amplitude and phase, digital modulations are performed in time or frequency domain.

Preferably, the predefined Kalman filter is based on predefined or estimated noise levels related to radio communication carried out by the transmitter and the receiver.

Additionally, the present invention concerns also:
- a radio communications system including a transmitter and a receiver configured to carry out, respectively, the transmission and the reception operations of said radio communications method;
- a transmitting and receiving device/system/equipment configured to carry out the transmission operations and the reception operations of said radio communications method;
- a transmitting device/system/equipment configured to carry out the transmission operations of said radio communications method; and
- a receiving device/system/equipment configured to carry out the reception operations of said radio communications method.

In order to be better understood, the present invention will be described in detail in the following paragraphs.

1. INTRODUCTION

Let's consider the RF frame and particularly the three types of RF frames, which represent wide classes of signals; they may be divided according to the twisted wave type and modulation scheme:
- Time Twisted Waves,
    - minimum bandwidth signals, such as raised cosine signals used for broadband and direct-broadcast satellite (or "Direct To the Home"—DTH) applications;
    - CDM/CDMA signals, widely used for 3G ($3^{rd}$ Generation) mobile communications, but also for aeronautical communications, satellite mobile communications, etc;
- Frequency Twisted Waves,
    - OFDM/OFDMA signals used for 4G and 5G mobile communications, WiFi, WiMAX, etc.

Hereinafter RF frames applicable to twisted waves and RX matrices exploitable at RX side will be presented for each of the above signal types, with and without the optimization introduced by the present invention so as to show the intrinsic advantage in using said optimization.

Additionally, hereinafter the application of the optimized RX matrix to conventional signals (in particular, to each of the three above signal types) will be also described, showing its information rate capacity enhancement with respect to conventional detection techniques.

It is worth noting that the present invention introduces a capacity enhancement at transmission layer level, producing an equivalent Modulation Error Ratio (MER) increase, without any restriction on the type of digital modulation used. It is an additional improvement of the transmission system capacity to be added to all the other possible techniques compatible with the specific transmission and modulation systems.

2. RX MATRIX AND OPTIMIZED RX MATRIX

The RX matrices defined in WO 2014/016655 A1, WO 2015/067987 A1, WO 2015/068036 A1, WO 2015/189653 A1, WO 2015/189703 A2, WO 2015/189704 A2 and PCT/IB2016/001972 are based on a time domain evaluation of the signals for both time and frequency twisted waves. Indeed, it is well known that the digital communication approach always implies the analysis in the time domain.

In general terms, it is possible to define for each RF frame (minimum bandwidth, CDM/CDMA, OFDM/OFDMA) an "unknown vector" $[x_k]$, where $x_k$ can represent either a main mode unknown or a HOM unknown. Then, a coefficient matrix $[A_{kj}]$ is considered where k is associated with the $k^{th}$ unknown and j is associated with the $j^{th}$ sampling point; finally, at the output of the RX filter, a vector $[\hat{b}_j]$ is considered, which represents the observable vector.

In all cases (assuming a good approximation of system linearity) it can be written with $[n_j]$ and $[i_j]$ the samples of noise and interference:

$$[A_{kj}][x_k]=[\hat{b}_j],$$

where $$[\hat{b}_j]=[b_j]+[n_j]+[i_j].$$

Using the pseudo-inverse technique, WO 2014/016655 A1, WO 2015/067987 A1, WO 2015/068036 A1, WO 2015/189653 A1, WO 2015/189703 A2, WO 2015/189704 A2 and PCT/IB2016/001972 present the solution given by:

$$[\hat{x}_k]=[[A_{kj}]^T[A_{kj}]]^{-1}[A_{kj}]^T[\hat{b}_j].$$

The above solution is valid in many cases, but shows some criticalities (essentially, a noise amplification due to the RX matrix) for low S/Ns and when the transponder distortions are not negligible, that is the case of DTH digital television signal used in broadcasting services.

In order to solve this problem, the innovative, original approach according to the present invention is that of applying the Kalman filter to the static case of digital communications, with or without the twisted waves.

In particular, the Kalman filter is a very powerful tool capable of producing an optimal estimation of a hidden state of a linear dynamic process. In case of communications, the situation is much simpler because the system is static; the only problem is due to the determination of the unknown vector from the observable vector in presence of noise, which can be approximated as Gaussian noise.

As previously explained, the present invention teaches the completely new and original application of the Kalman filter to communications. Due to independence of the RF frame from time, no iteration is necessary and the optimum result can be achieved in one single step.

The solution derived from the Kalman approach is given by the following expression:

$$[\hat{x}_k]=[A_{kj}][[A_{kj}][A_{kj}]^T+\sigma^2[I]]^{-1}[\hat{b}_j],$$

where $\sigma^2$ is the noise-to-signal ratio (including interference) and $[I]$ is the unitary matrix.

In order to get a more robust matrix, the following implementation has been elaborated for the RX matrix:

$$[\hat{x}_k]=[[A_{kj}]^T[A_{kj}]+\alpha\sigma^2[I]]^{-1}[A_{kj}]^T[\hat{b}_j],$$

where $\alpha$ is a suitable parameter $\leq 1$.

The above modification of the RX matrix coefficients (which allows operating with smaller dimension matrixes depending on the unknown vector dimensions and not on the observable vector dimensions) is based on the static characteristics of the Kalman filter hereby proposed, which does not modify the noise bandwidth, and is sufficient to minimize the noise level on the output vector $[\hat{x}_k]$, namely: to get the minimum value for the expression $$\sigma_{out}^2 = \sum_k (\hat{x}_k - x_k)^2$$

the Kalman gain is given by $$\text{Kalman Gain} = \frac{\sigma_{input}^2}{\sigma_{out}^2}.$$

The performance associated with the described approach will be presented in the following paragraphs for twisted wave signals and also for conventional signals, which can be organized in an arbitrary RF frame structure.

3. TIME TWISTED WAVES—MINIMUM BANDWIDTH MODULATION SYSTEMS

This category of signals includes those signals with a total bandwidth close to the symbol rate. The "raised cosine" can be considered as a typical example of this kind of signals (which can include, however, also Gaussian signals, such as Continuous Phase Modulation (CPM) Gaussian signals used for 2G ($2^{nd}$ Generation) cellular networks, i.e., those based on Global System for Mobile communications (GSM)).

These signals are the most critical to be used for time twisted waves, due to the difficulty in defining an efficient RF frame, where the signal structure can be considered independent from the adjacent RF frames.

According to PCT/IB2016/001972, in order to overcome this issue, the main mode and the HOMs are properly shaped, accepting a residual adjacent channel interference to get a very low adjacent RF frame interference.

Figure 2:
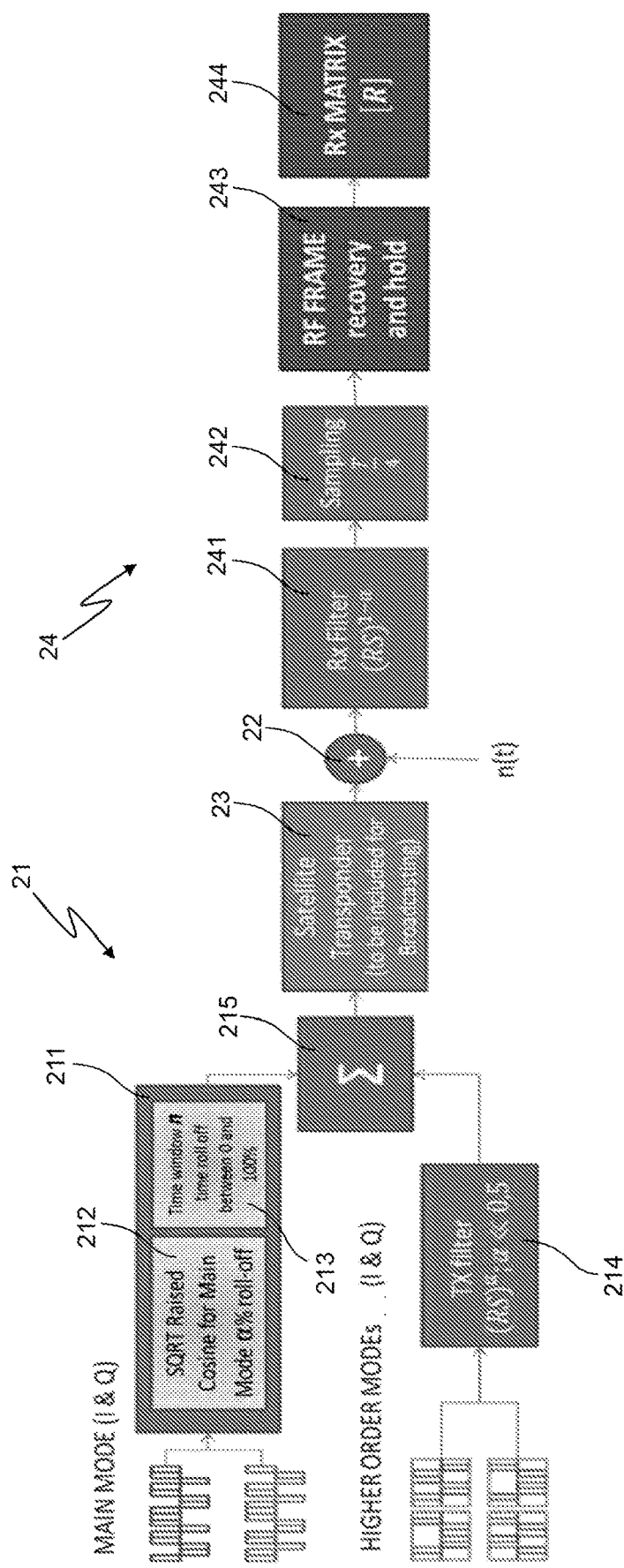
FIG. 2 schematically illustrates a radio communications architecture according to the teachings of PCT/IB2016/001972.

In this respect, FIG. 2 shows a functional block diagram schematically representing a radio communications architecture according to the teachings of PCT/IB2016/001972.

In particular, as shown in FIG. 2, at TX side (denoted as a whole by 21) the following TX operations are performed:
a main mode TX filtering (block 211) is applied to a main mode (digital) time signal (conveniently, in-phase and quadrature (I and Q) components thereof) carrying first symbols to be transmitted; wherein said main mode TX filtering (block 211) includes applying a square root raised cosine filter 212 (with roll-off $\alpha$; e.g., equal to, or higher than, 20%; for example, comprised between 20% and 35% or equal to 20% or 35%) and a time window 213 (with time roll-off n comprised between 0 and 100%);

a HOM TX filtering (block 214) is applied to a HOM (digital) time signal (conveniently, in-phase and quadrature (I and Q) components thereof) carrying second symbols to be transmitted; wherein said HOM TX filtering (block 214) includes applying a TX raised-cosine-based filter (in particular, a TX raised-cosine-based filter $(RS)^\alpha$, where RS denotes a frequency response of a predefined raised cosine filter, and $\alpha$ is a rational number higher than zero and lower than 0.5); and, after application of the main mode and HOM TX filtering (blocks 211 and 214), the main mode and HOM time signals are combined (block 215) into a main mode and HOM combined time signal.

Preferably, in order to organize the RF Frame architecture to get the minimum bandwidth increase with respect to the original raised cosine signal, at the TX side 21 the following features are implemented in addition to the use of the main mode TX filtering (block 211) including the square root raised cosine filter 212 and the time window 213 (this latter being used to limit the number of time side lobes):

in the HOM time signal, each second symbol is repeated twice, the first time with a phase of 90 degrees and the second time with a phase of −90 degrees and with a rate equal to the main mode symbol rate; and the RF Frame is organized so that, for every ten symbols of the main mode, four symbols of the HOM(s) are arranged, leaving free of the HOM(s) the initial and the final parts of the RF frame.

Moreover, again with reference to FIG. 2, the main mode and HOM combined time signal is transmitted through a communication channel affected by noise n(t) (block 22). This channel, depending on the type of signal considered, may involve the presence of a satellite transponder (block 23) to take into account the transponder bandwidth limitations.

Furthermore, at the RX side (denoted as a whole by 24):

an RX filtering (block 241) is applied to incoming (digital) time signals, wherein said RX filtering (block 241) includes applying an RX raised-cosine-based filter (in particular, an RX raised-cosine-based filter with frequency response equal to $(RS)^{1-\alpha}$);

the filtered incoming time signals are, then, oversampled (block 242), conveniently at T/4 (where T denotes the conventional minimum sampling rate for main mode);

RF frame recovery and synchronization is performed (block 243); and, finally, a predefined RX matrix [R] is used (block 244) to extract the symbols carried by the incoming time signals via the main mode and the HOMs.

As far as FIG. 2 is concerned, it is important to note that many features are not shown in said FIG. 2, even though they are implicit therein. For example, implicit features are:

the presence at the TX side 21 of an RF TX section for digital-to-analog conversion, frequency up-shifting (in particular up to RF), high power amplification, etc.;

the presence at the RX side 24 of an RF RX section for low noise amplification, frequency down-shifting, analog-to-digital conversion, etc.; and the presence at the RX side 24 also of one or more modules for carrier and clock recovery and synchronization.

The present invention impacts only on the RX matrix (block 244), whereas does not affect the other functional blocks shown in FIG. 2 and previously described.

Figure 3:
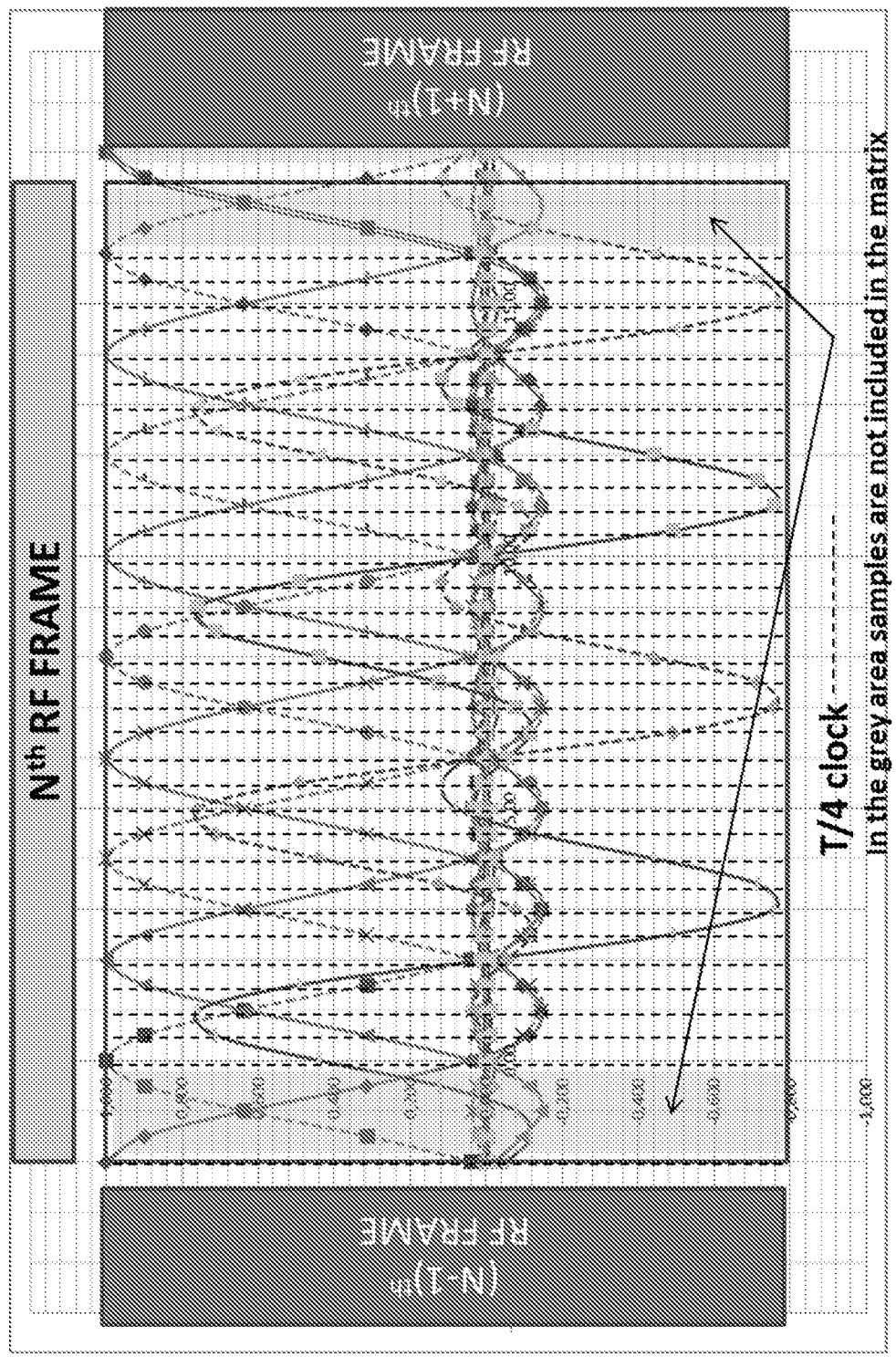
FIG. 3 shows an example of RF frame architecture suitable for minimum bandwidth signals.

An example of RF frame architecture suitable for minimum bandwidth signals is shown in FIG. 3.

The RF frame can be considered as an independent time period, with limited interference with the adjacent RF frames, for which the RX matrix based on the pseudo-inverse technique is capable of estimating the symbol complex values associated with that particular RF frame.

It is possible to verify that, due to the elimination of a few sampling points of the RF frame structure, which are not included in the RX matrix, the interference level is kept very low.

Figure 4:
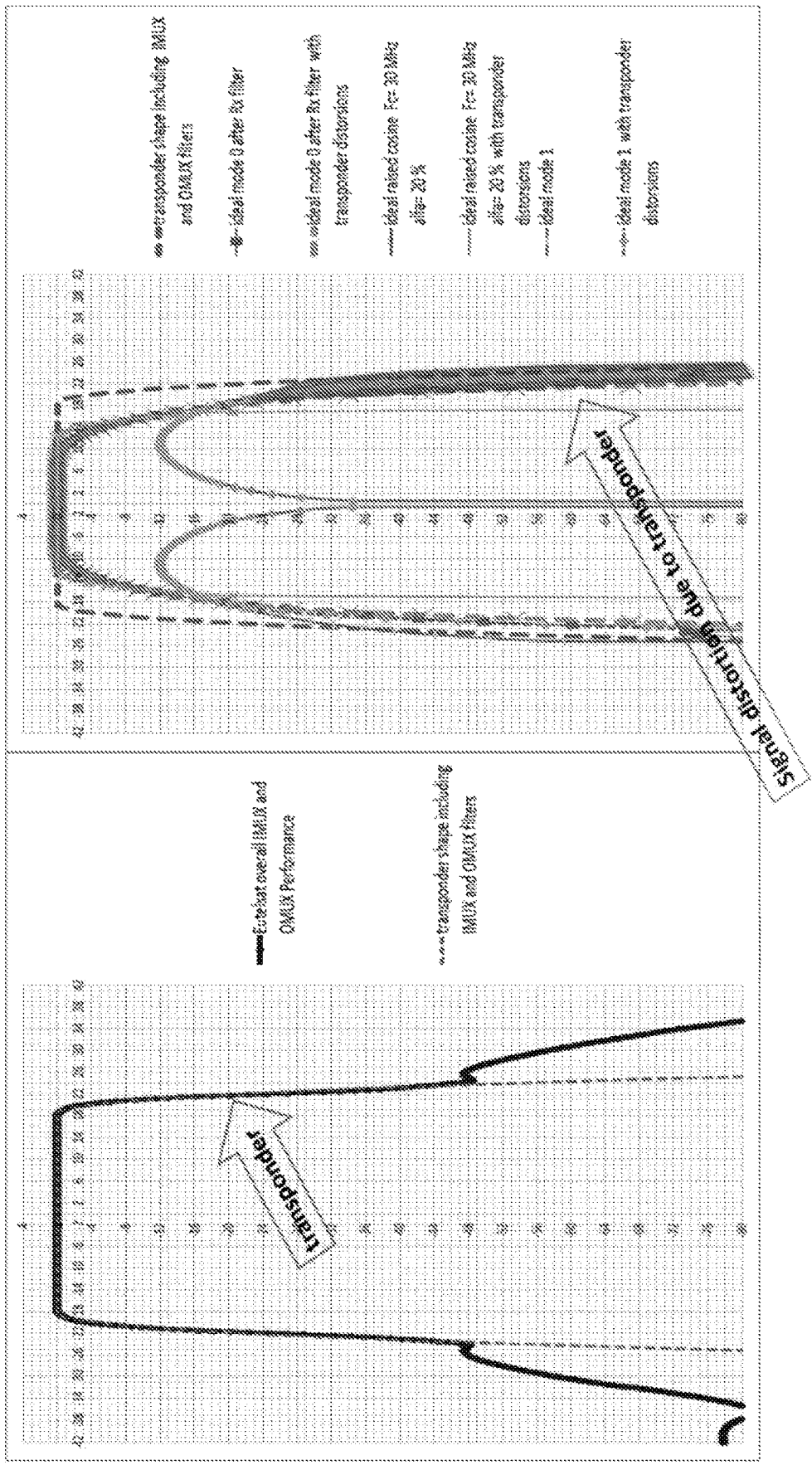
FIG. 4 shows impact on signal bandwidth due to transit through a typical satellite transponder.

In FIG. 4 two cases are presented, which may be easily generalized. A first case is related to a raised cosine signal with 20% roll-off without the distortions due to the transit through a typical satellite transponder, whereas a second case includes those distortions.

The usual RX matrix, without the inclusion of the static Kalman filter, presents degraded performance for both the configurations (i.e., without and with the transponder distortions) as the SNR decreases, whereas the RX matrix optimized with the inclusion of the static Kalman filter presents a very meaningful improvement of the performance. The difference due to the presence of the transponder consists in an additional attenuation of the side parts of the signal bandwidth, as shown in FIG. 4.

Figure 5:
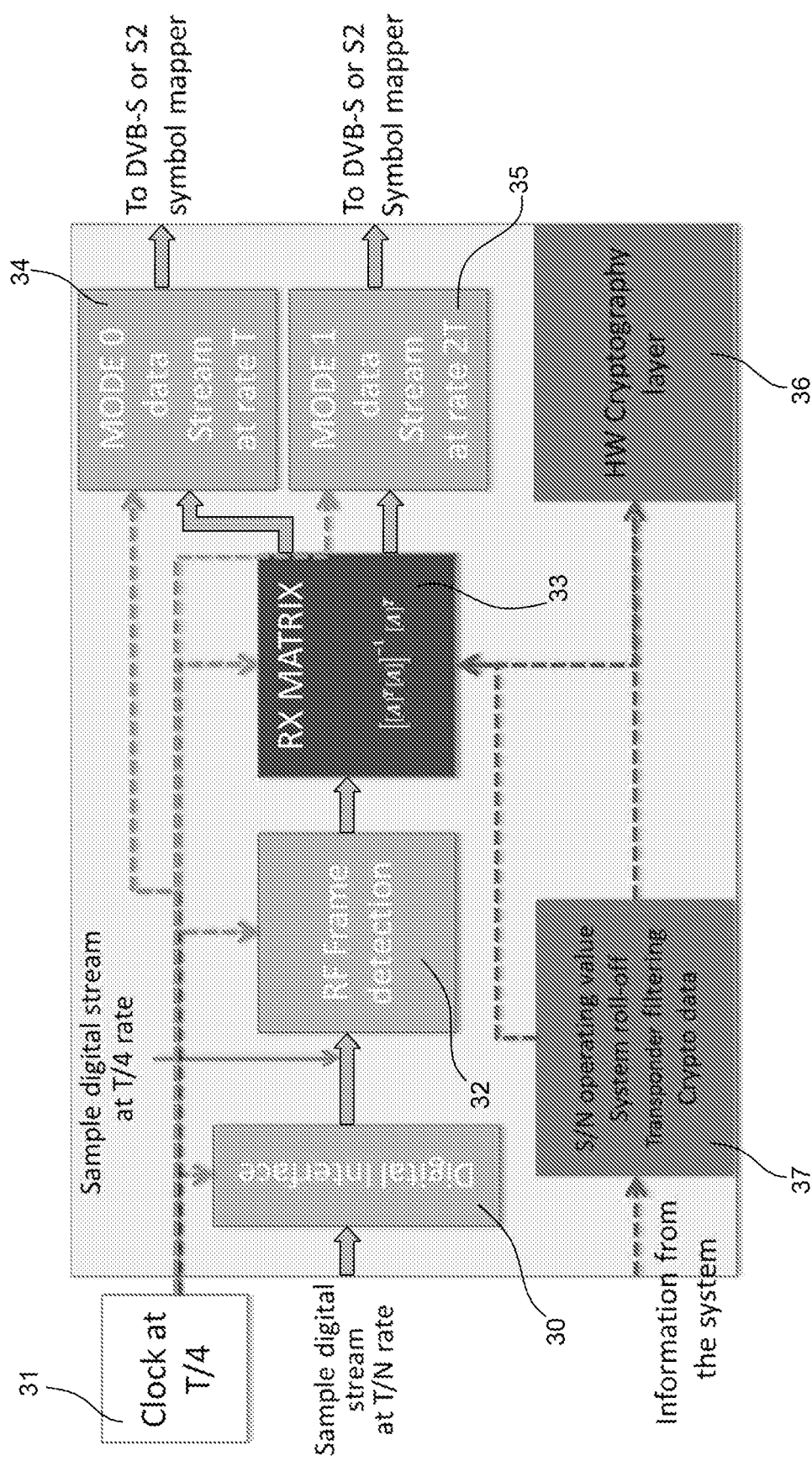
FIG. 5 schematically illustrates an example of functional architecture suitable for application, at reception side, of a reception matrix according to the teachings of PCT/IB2016/001972.

FIG. 5 schematically illustrates an example of functional architecture suitable for application of RX matrix at the RX side of the radio communications architecture according to the teachings of PCT/IB2016/001972 shown in FIG. 2.

In particular, the functional architecture shown in FIG. 5 includes modules and/or units for implementing/carrying out/providing:

a digital interface (block 30) to receive the digital sample stream;

a clock at T/4 (block 31) to provide an oversampling clock reference indicative of the rate used to sample (in particular oversample) incoming signals;

RF frame detection (block 32) to detect successive RF frames;

application of the RX matrix to each detected RF frame (block 33) to extract therefrom mode 0 data stream at rate T (i.e., symbols carried by the main mode—block 34) and mode 1 data stream at rate 2T (i.e., symbols carried by OAM mode with topological charge equal to 1—block 35);

an hardware (HW) cryptography layer (block 36) according to the teachings of PCT/IB2016/001972; and system information acquisition (block 37) to receive information items (or data) indicative of S/N values, used roll-off, transponder filtering features, cryptography-related features, etc., which information items (or data) are used to apply the RX matrix (block 33) and to perform cryptography (block 36).

Figure 6:
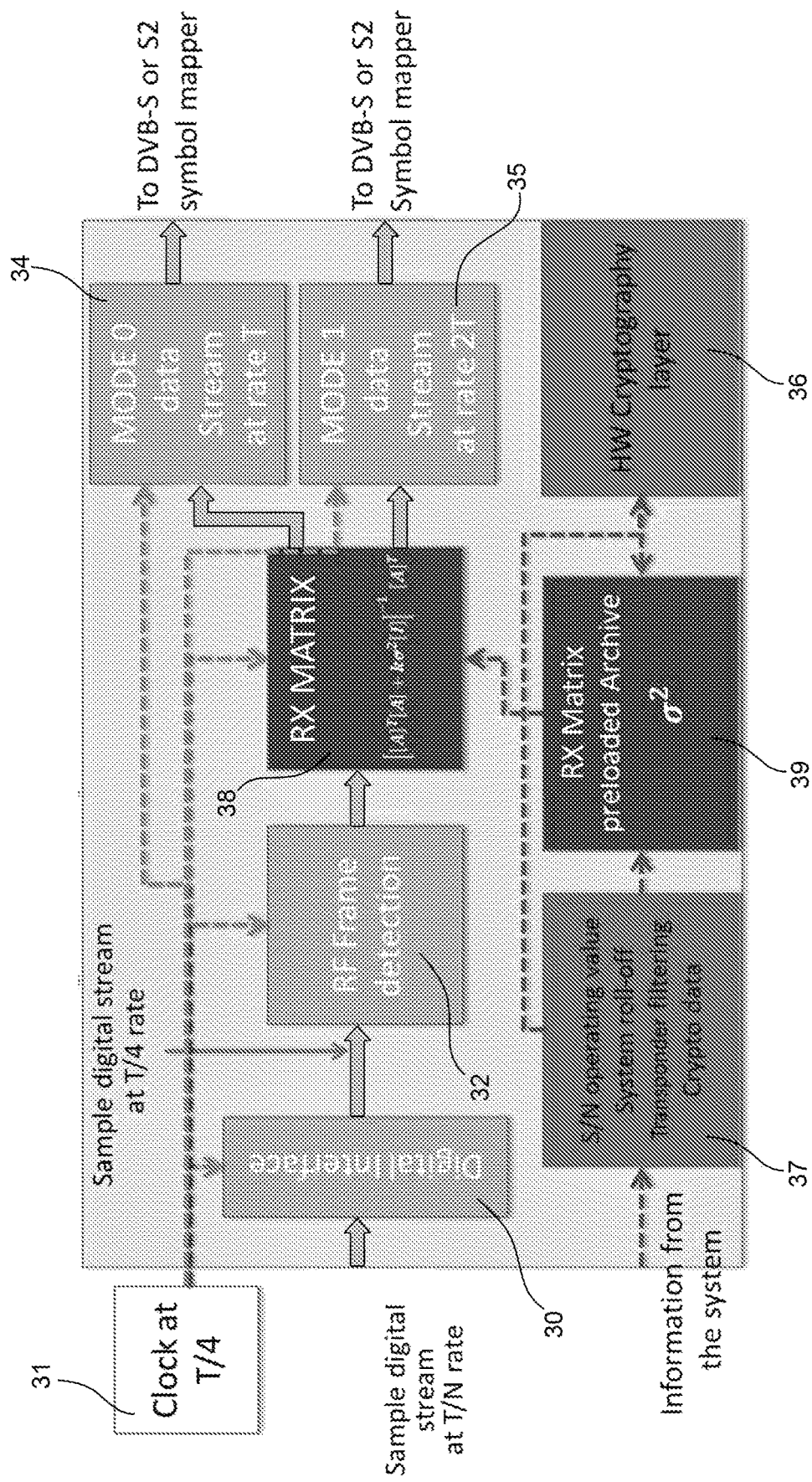
FIG. 6 schematically illustrates an example of functional architecture suitable for application, at reception side, of a reception matrix including a Kalman filter according to a preferred embodiment of the present invention.

Additionally, FIG. 6 schematically illustrates an example of functional architecture suitable for application, at RX side, of a RX matrix with Kalman filter according to a preferred embodiment of the present invention.

In particular, the functional architecture shown in FIG. 6 differs from that one shown in FIG. 5 only in two things:

the application of the RX matrix with Kalman filter (block 38 in FIG. 6 in place of block 33 in FIG. 5) wherein RX matrix coefficients are modified based on estimated noise level $\sigma^2$; and the additional presence of a preloaded RX matrix archive (block 39).

Figure 7:
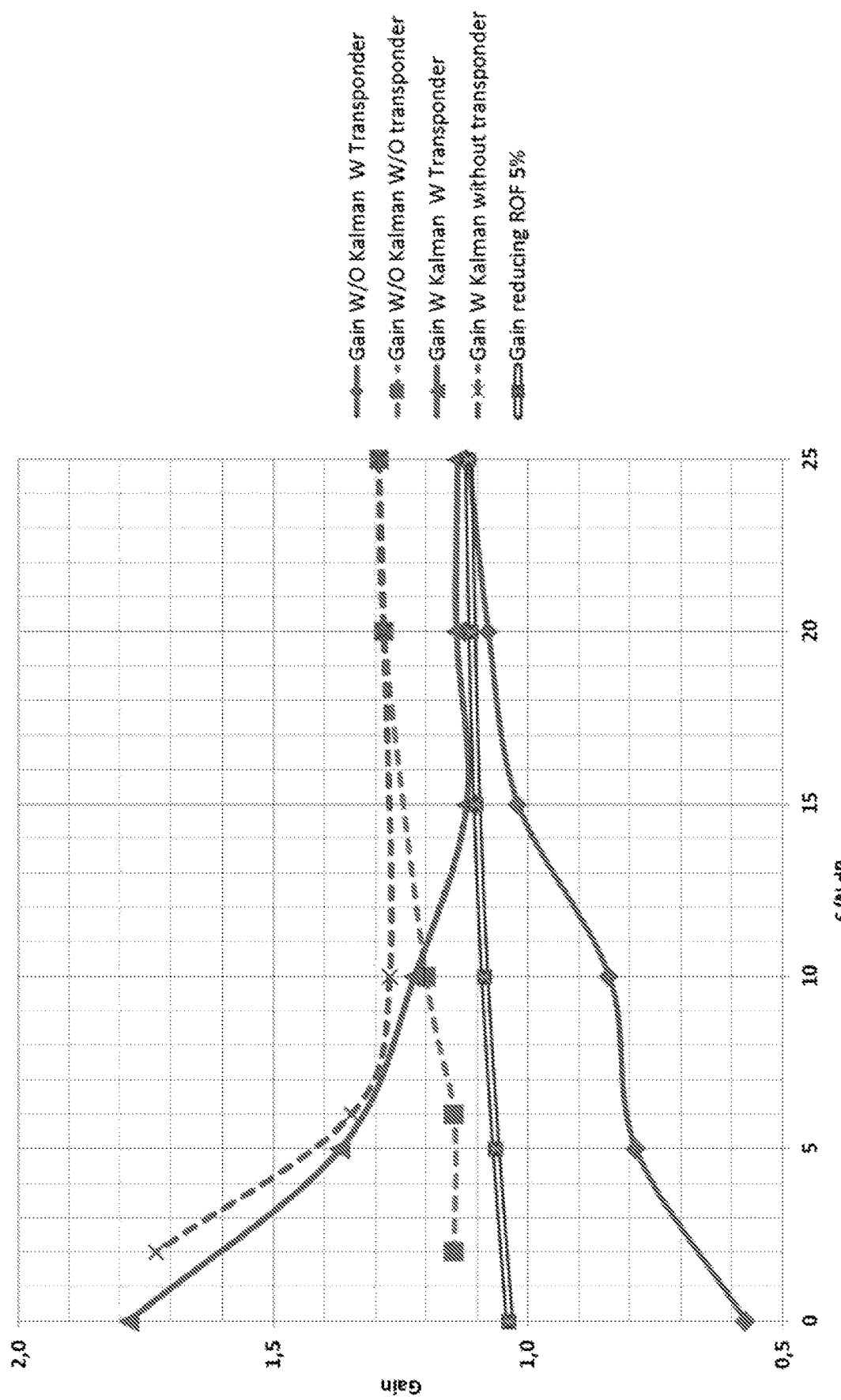
FIG. 7 shows time twisted waves' gain with and without transponder distortions, and with and without the use of the Kalman filter in the reception matrix.

FIG. 7 shows time twisted waves' gain with and without transponder distortions, and with and without the use of the Kalman filter in the RX matrix, with respect to S/N. Additionally, FIG. 7 shows also a possible optimization, reducing the roll-off of the transmitted signal (at 5% in place of 10%).

As shown in FIG. 7, time twisted waves, in absence of transponder (for instance, in case of broadband communications, wherein many channels are present in the transponder), with both the configurations with and without the Kalman filter, present better performance than the reduced roll-off configuration. The situation is rather different in presence of transponder distortions (e.g., in case of DTH broadcasting channel): if no Kalman filter is adopted, time twisted waves perform poorly, whereas adopting Kalman filter the situation is strongly improved with time twisted waves performing better than reduced roll-off configuration.

The RF Matrix coefficients are conveniently computed on the basis of the following expression:

$$[R_{kj}] = [[A_{kj}]^T [A_{kj}] + \alpha\sigma^2[I]]^{-1} [A_{kj}]^T.$$

When $\alpha=0$, the RX matrix is the conventional one; for $\alpha$ close to 1, the RX matrix acts as a Kalman filter for the telecommunication signal defined in the RF frame.

The computation complexity related to a RX matrix with the Kalman filter is the same as that one related to the corresponding RX matrix without the Kalman filter; moreover, the coefficients of a RX matrix with the Kalman filter are typically smaller than the corresponding ones of the RX matrix without the Kalman filter.

Figure 8:
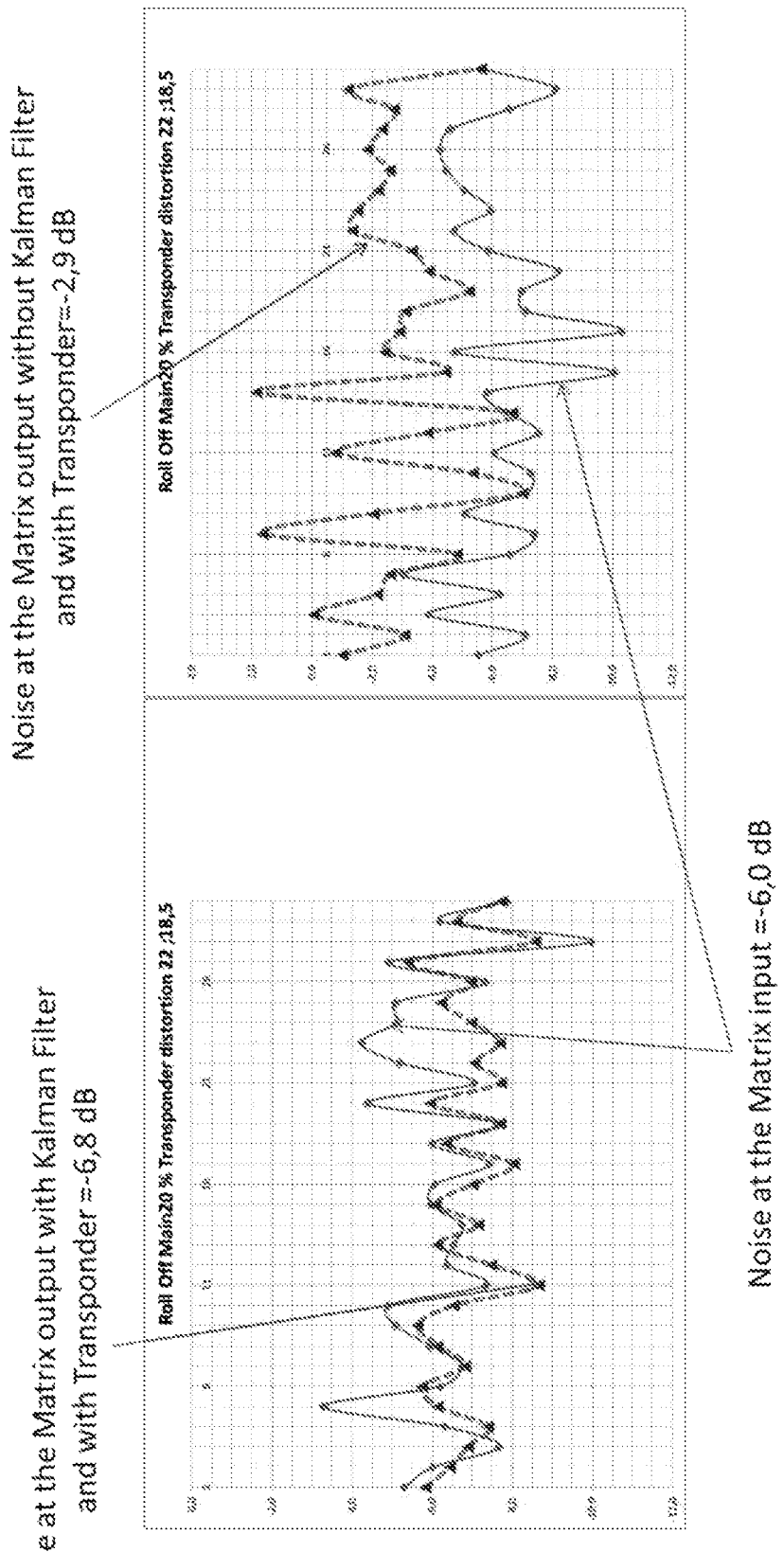
FIG. 8 shows noise levels at input and output of the reception matrix with transponder distortions, and with and without the use of the Kalman filter in the reception matrix.

FIG. 8 shows noise levels at input and output of the RX matrix with transponder distortions, and with and without the use of the Kalman filter in the RX matrix.

From FIG. 8 it can be noted that noise through the RX matrix with Kalman filter is either decreasing or in any case better than noise through the RX matrix without Kalman filter.

The sensitivity of the RX matrix depends on the condition that the signal is a minimum bandwidth signal, for other type of signals this sensitivity is much lesser and no critical at all (as it will be shown in the following paragraphs).

In the case shown in FIG. 8, it can be seen that while the RX matrix with Kalman filter performs almost 1 dB better than the input noise, the RX matrix without Kalman filter performs about 3 dB worse.

Figure 9:
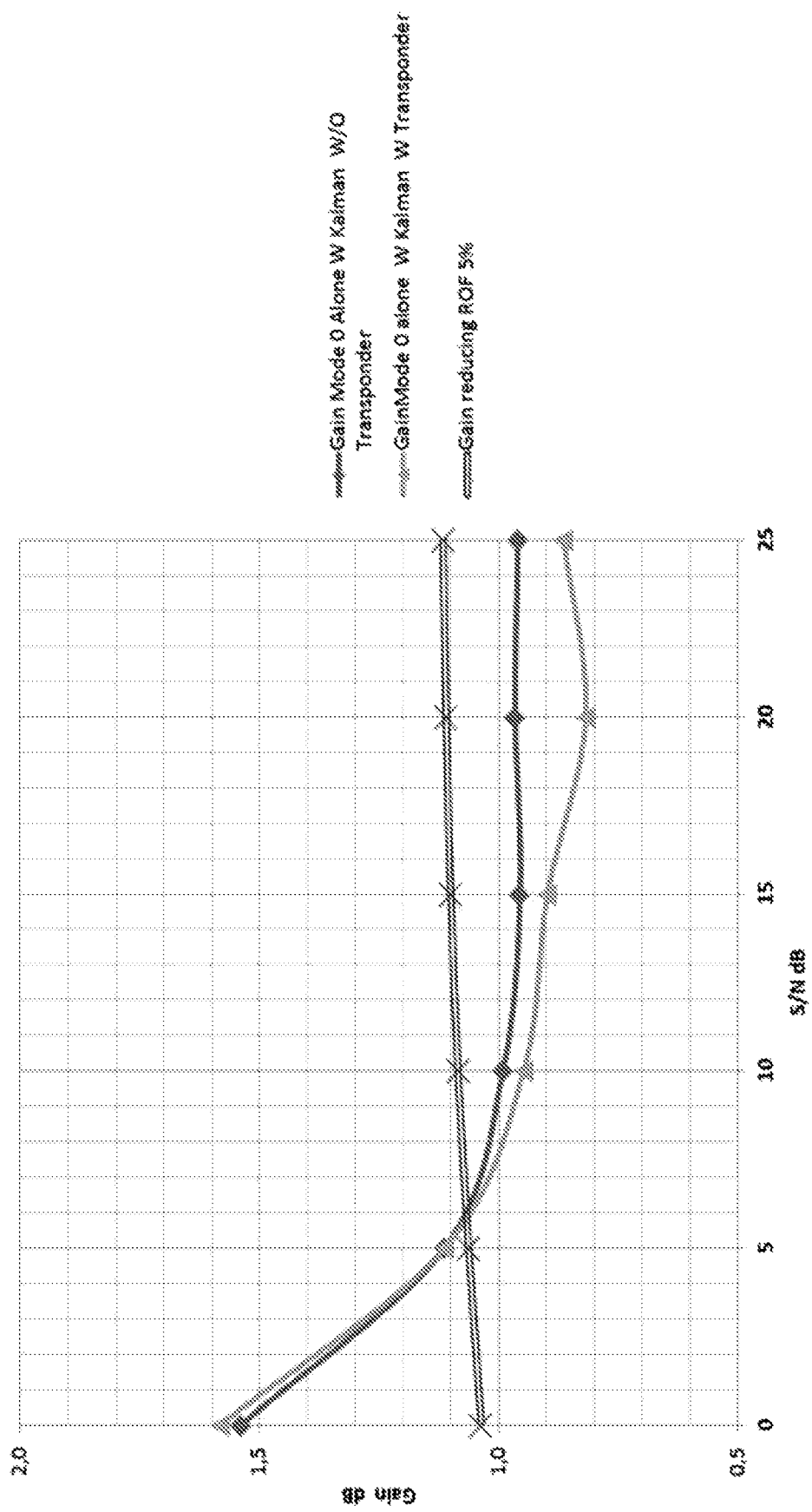
FIG. 9 shows main mode's gain with the use of the Kalman filter in the reception matrix, and with and without transponder distortions.

FIG. 9 shows main mode's gain with the use of the Kalman filter in the RX matrix, and with and without transponder distortions, with respect to S/N. Additionally, FIG. 9 shows also a possible optimization, reducing the roll-off of the transmitted signal (at 5% in place of 10%).

When S/N increases at the RX matrix input, noise level at the RX matrix output worsens (FIG. 9), but the combination with the twisted wave gain presents good performance with the RX matrix with Kalman filter for both the cases, with and without transponder, as shown in FIGS. 7 and 9. The behavior of the RX matrix with Kalman filter at low S/N, which is always very good, suggests the adoption of the RX matrix with Kalman filter also when the transmission is limited to the raised cosine signal alone, defining an RX matrix for this case. This concept is tackled in the following paragraph.

4. RX MATRIX OPTIMIZED FOR CONVENTIONAL SIGNALS

The introduction of the Kalman filter in the RX matrix opens a new approach to manage the communication channel, even without using twisted waves.

Indeed, it is possible to define an arbitrary RF frame in absence of HOMs, considering that a sufficient long sequence may be managed as it were an RF frame, with no problem in finding the "Hilbert channel" due to the absence of the Hilbert signal.

The advantage in considering this configuration is that there is no need of slightly increasing the bandwidth and the RX matrix can be optimized for this configuration. Of course, without using the Kalman filter, there is no advantage in considering this configuration.

Figure 10:
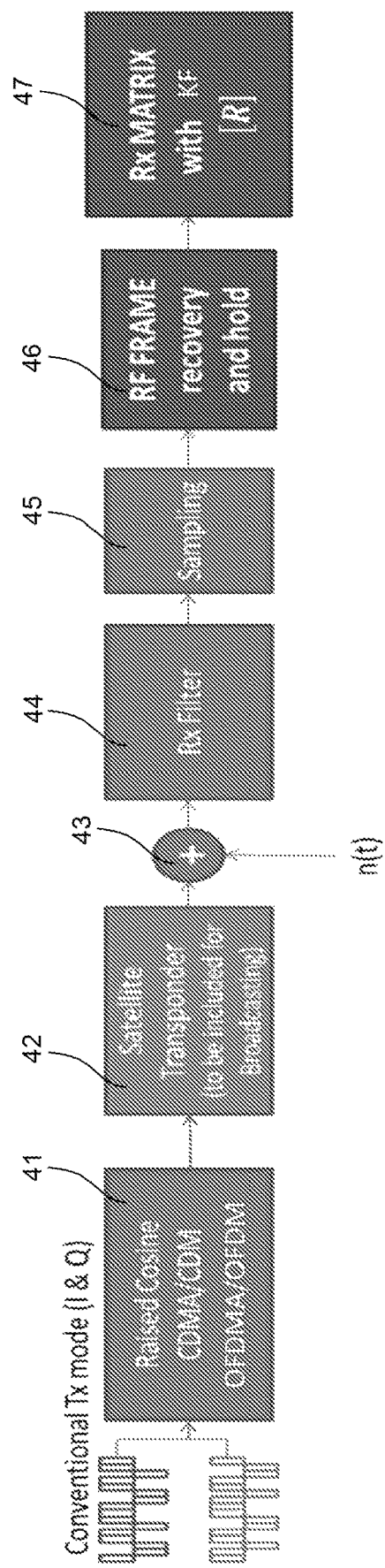
FIG. 10 schematically illustrates a radio communications architecture for conventional signal transmission, wherein the Kalman filter is used in the reception matrix.

In this respect, FIG. 10 shows a functional block diagram schematically representing a radio communications architecture for conventional signal transmission, wherein oversampling is applied at the RX side and the Kalman filter is used in the RX matrix.

In particular, in the radio communications architecture shown in FIG. 10:
- at TX side, a symbols-carrying signal is transmitted by using a transmission technique based on raised cosine filtering or CDMA/CDM or OFDMA/OFDM (block 41);
- in case of satellite communications, a satellite transponder is involved (block 42);
- due to transit through the communication channel, the transmitted signal is affected by noise n(t) (block 43);
- at RX side, an RX filter is applied (block 44), oversampling is carried out (block 45), RF frame recovery and synchronization is performed (block 46) and, finally, an RX matrix [R] with Kalman filter is used (block 47) to estimate the transmitted symbols.

The radio communications architecture shown in FIG. 10 is substantially valid for all the types of signal structure (in particular, based on raised cosine or CDMA/CDM or OFDMA/OFDM), but is particularly advantageous for minimum bandwidth signals based on the use of raised cosine filters.

As far as FIG. 10 is concerned, it is important to note that many features are not shown in said FIG. 10, even though they are implicit therein. For example, implicit features are:
- the presence at the TX side of an RF TX section for digital-to-analog conversion, frequency up-shifting (in particular up to RF), high power amplification, etc.; and
- the presence at the RX side of an RF RX section for low noise amplification, frequency down-shifting, analog-to-digital conversion, etc.

Two elements are used to implement the system advantage with respect to the conventional configuration: oversampling and Kalman filter.

Figure 11:
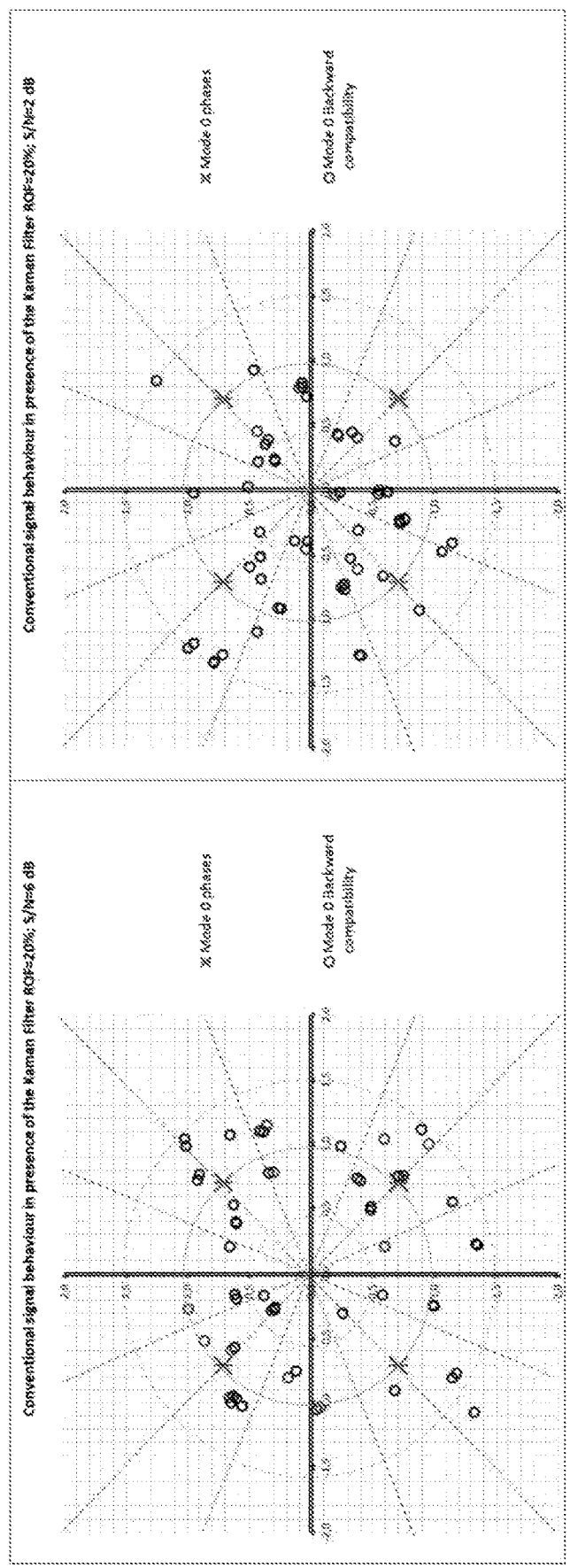
FIG. 11 shows two scatter diagrams for conventional signal in presence of the Kalman filter for two different signal-to-noise ratios.

FIG. 11 shows two scatter diagrams for conventional signal in presence of the Kalman filter for S/N=6 dB and S/N=2 dB. From FIG. 11, it is possible to verify that the advantage at S/N=6 dB is 0.5 dB and at 2 dB is 1.5 dB, which implies a gain of 7% and 20%, respectively, with respect to the conventional transmission system.

Figure 12:
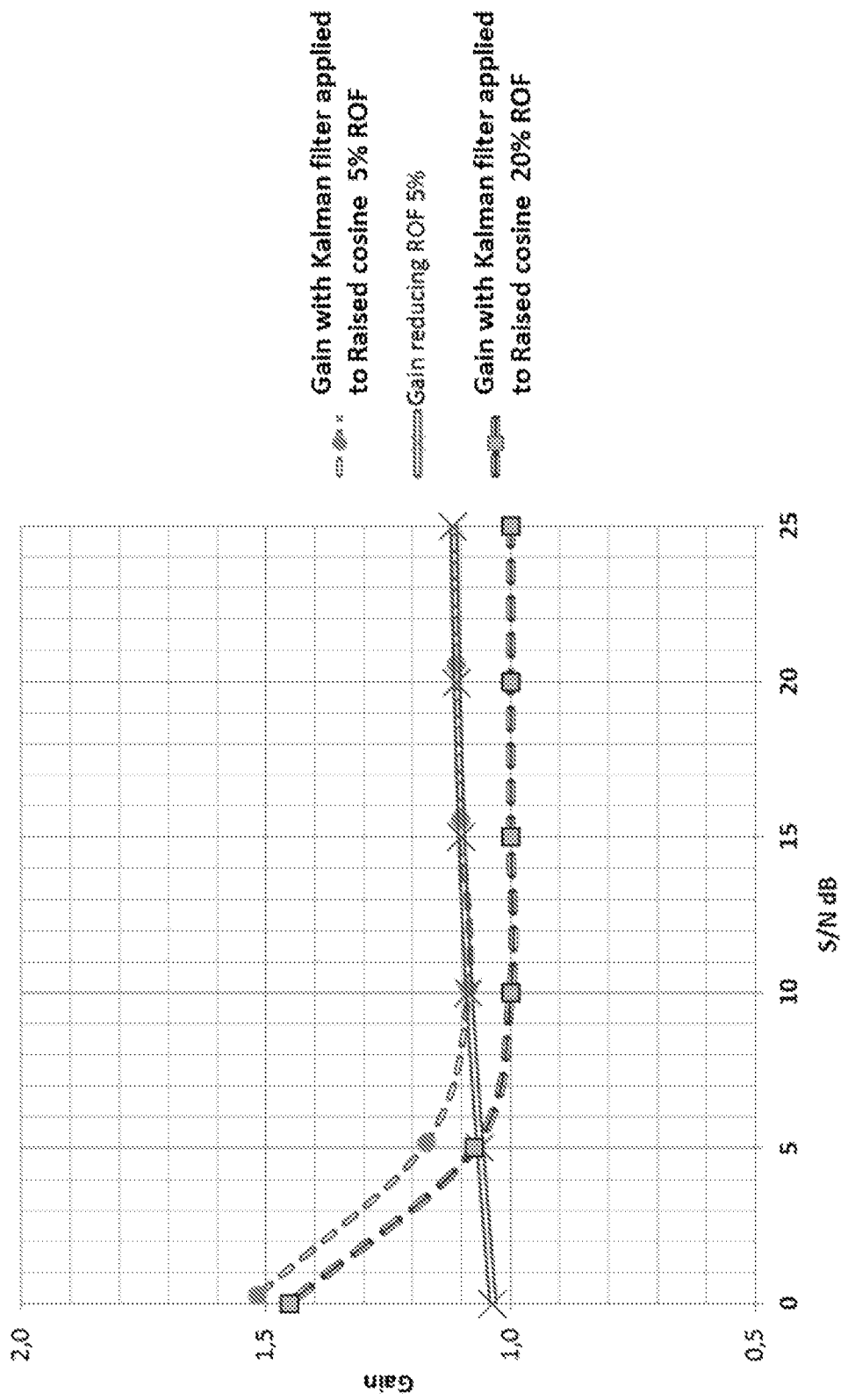
FIG. 12 shows conventional signal's gain with the use of the Kalman filter in the reception matrix.

FIG. 12 shows gain of conventional signals based on raised cosine filters with roll-off factors equal to 5% and 20% and with the use of the Kalman filter in the RX matrix, with respect to S/N. There is no evident impact due to the transponder because this configuration occupies exactly the same bandwidth as the conventional configuration. From FIG. 12, it is evident the advantage for low S/Ns in using the Kalman filter, which implies an estimation of the received signal shape instead of a simple detection of the signal at the minimum sampling points.

The possibility of using the Kalman filter at RX side offers interesting possibilities for those communications services working at low S/Ns, even before the introduction of standard evolution based twisted waves (e.g., mobile communications, aeronautical communications, etc.).

Figure 13:
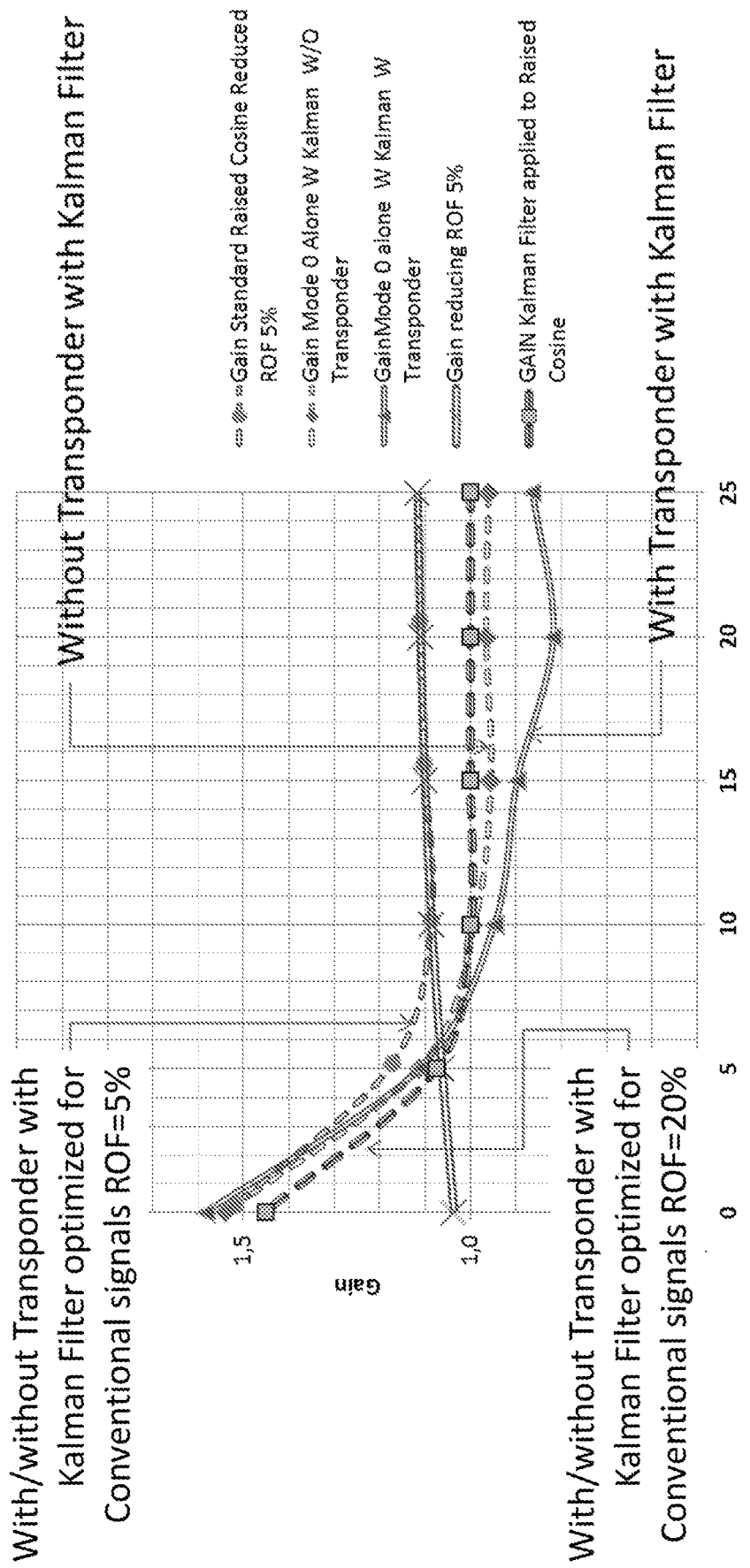
FIG. 13 shows a comparison between conventional signal transmission using a reception matrix defined for twisted waves and a reception matrix optimized for conventional signal.

FIG. 13 shows a comparison between conventional signal transmission using the RX matrix defined for twisted waves including only main mode and the RX matrix optimized for conventional signal only.

5. TIME TWISTED WAVES—SPREAD SPECTRUM SIGNALS (CDM/CDMA)

Time twisted waves may be advantageously exploited also in radio communications systems based on spread spectrum, such as CDM/CDMA systems and the 3G mobile cellular system known as Universal Mobile Telecommunications System (UMTS) based on Direct-Sequence Code Division Multiple Access (DS-CDMA).

As is broadly known, a CDMA signal (considering its application for digital signals) can be considered as the product of two synchronized waveforms: a first one, related to the information signal, can be considered as a sequence of symbols defined by a symbol rate 1/T using any modulation key, without memory; a second one, a Binary Phase-Shift Keying (BPSK) pseudo-noise sequence, having a repetition period multiple of T. Assuming to have N chips in the period T, the expansion factor is given by N.

Figure 14:
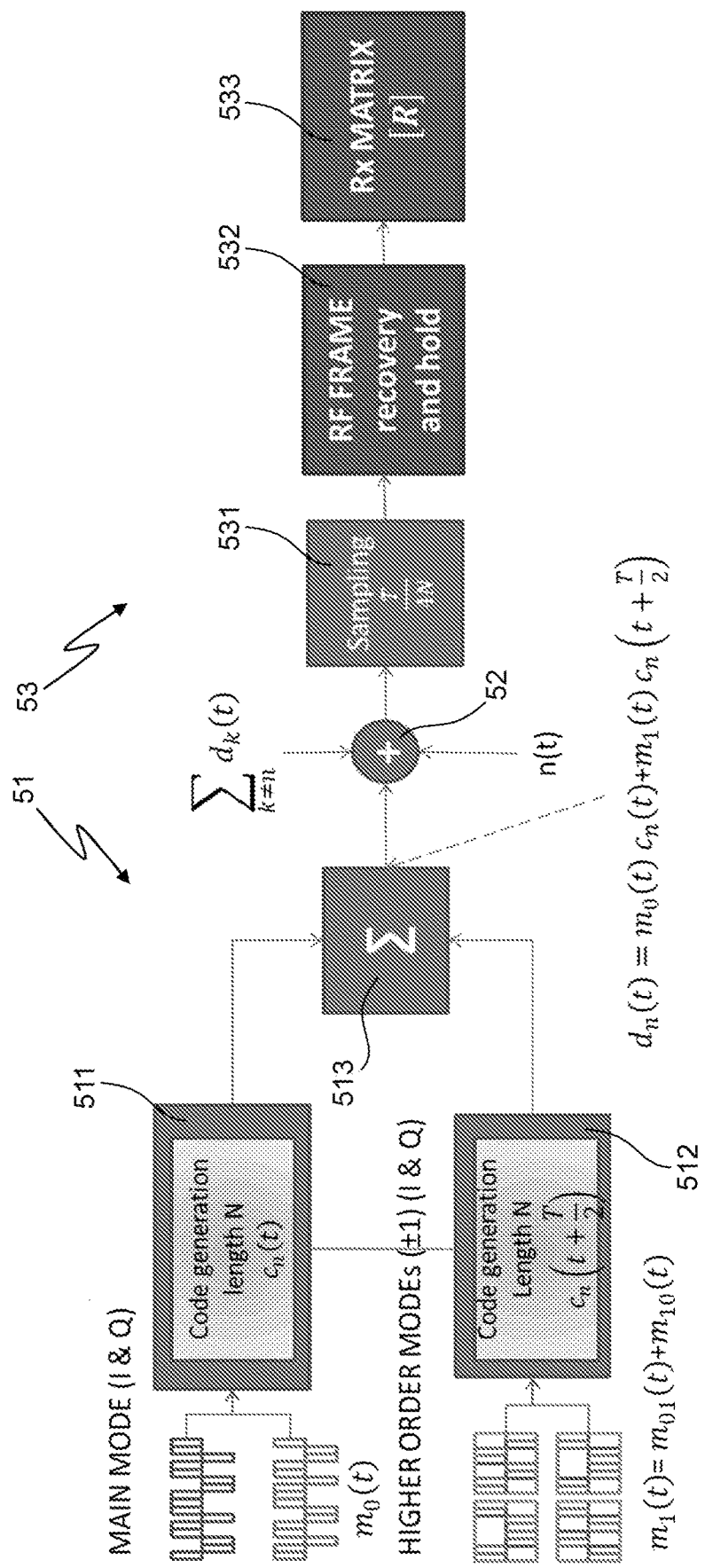
FIG. 14 schematically illustrates a radio communications architecture for combined implementation of CDM/CDMA and twisted waves.

As for application of time twisted waves to CDMA/CDM, FIG. 14 shows a functional block diagram schematically representing a radio communications architecture for combined implementation of CDM/CDMA and twisted waves.

In particular, as shown in FIG. 14, at TX side (denoted as a whole by 51) the following TX operations are performed:
  a main mode CDM/CDMA signal carrying first symbols is generated (block 511);
  a HOM CDM/CDMA signal carrying second symbols is generated (block 512); and
  the main mode and HOM CDM/CDMA signals are added together (block 513) thereby producing an overall CDM/CDMA signal transmitted through a communication channel affected by noise (block 52).

Moreover, at the RX side (denoted as a whole by 53):
  sampling at T/4N is carried out (block 531);
  RF frame recovery and synchronization is performed (block 532); and
  a predefined RX matrix [R] is used (block 533) to extract the symbols.

As far as FIG. 14 is concerned, it is important to note that many features are not shown in said FIG. 14, even though they are implicit therein (such as digital-to-analog conversion means, frequency up-shifting means, high power amplification means, etc. at the TX side 51; low noise amplification means, frequency down-shifting means, analog-to-digital conversion means, etc. at the RX side 53; etc.).

The configuration for CDM/CDMA is similar to the minimum bandwidth one, with three main differences: clock rate is much higher, modes are clockwise and counter-clockwise (two mode types instead of one), no filter is necessary for the signal itself.

The introduction of twisted waves follows the modality of the minimum bandwidth signals, taking into account that there is no bandwidth limitation problem and hence there can be an effective rotation of the twisted wave mode, and that the twisted wave is introduced including the CDMA/CDM coding expansion.

Figure 15:
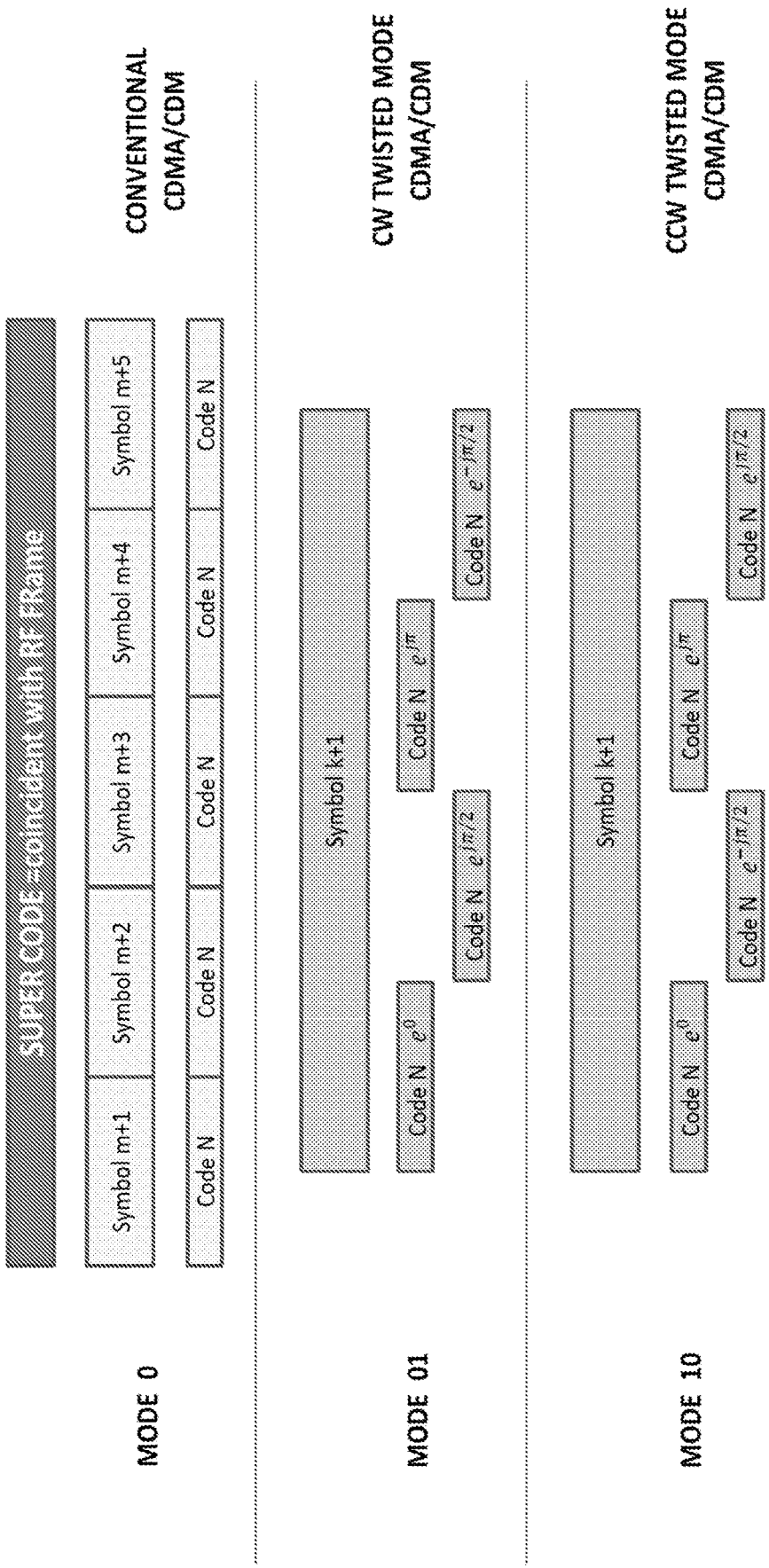
FIG. 15 shows an example of how it is possible to form an RF frame in case of combined use of CDMA/CDM and twisted waves.

FIG. 15 shows an example of how it is possible to form the RF frame in case of combined use of CDMA/CDM and twisted waves, wherein the RF frame is called "SUPER CODE" by analogy with CDMA/CDM, but it is simply the same code repetition for each of the symbols included in the RF frame.

As shown in FIG. 15, code N is the CDMA/CDM code used for conventional CDMA/CDM stream. For twisted waves applied to CDMA/CDM, a super code is defined repeating the code for a number of symbols of the main mode and introducing the same code for HOM(s) shifted of T/2 and repeating it four times rotating the phase of $\pm\pi/2$ at each repetition.

Code N can be represented as a pseudo-noise sequence of "0"s and "1"s with good properties of autocorrelation and cross-correlation between different codes.

Figure 16:
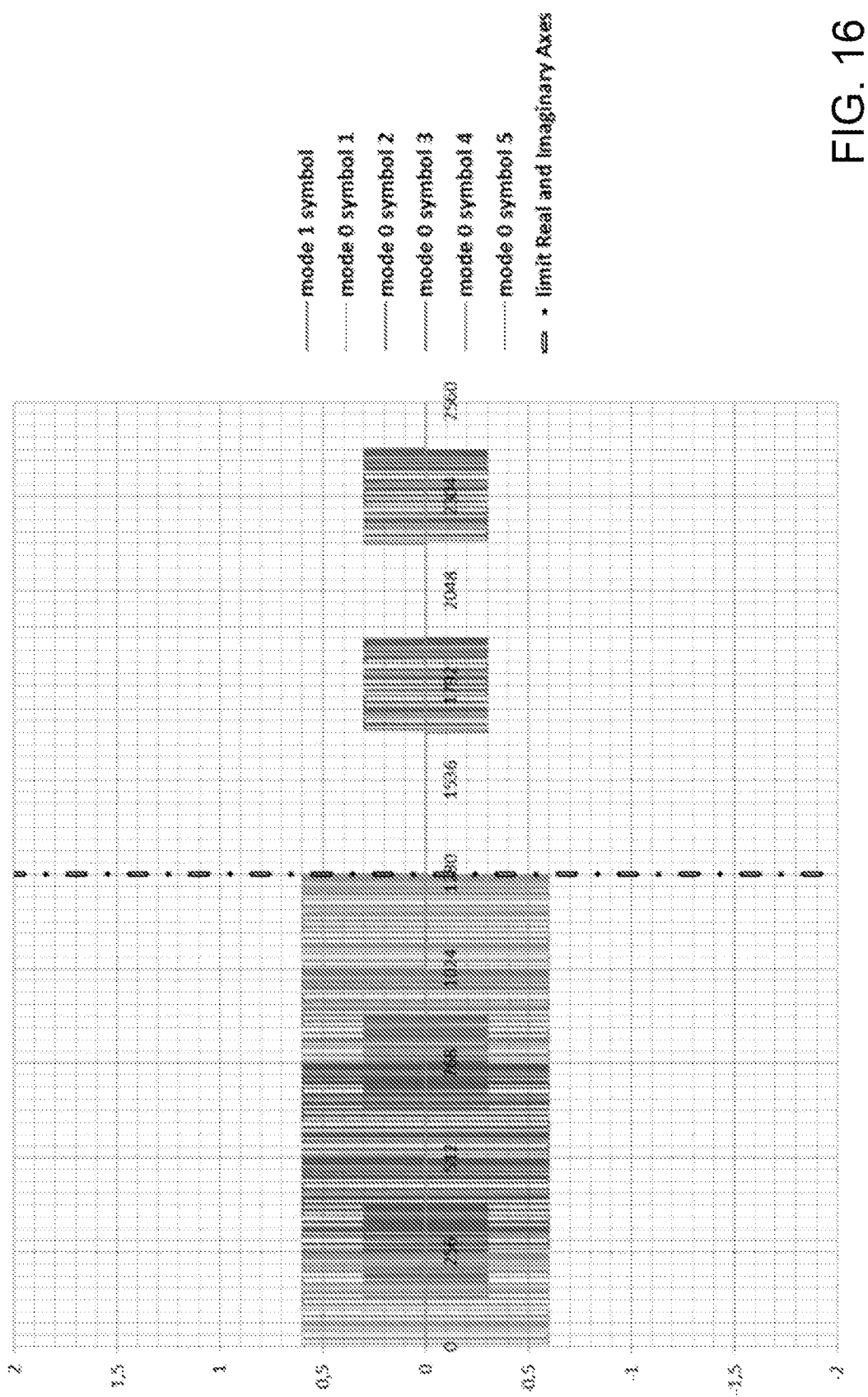
FIG. 16 shows an example of RF frame structure in case of combined use of CDMA/CDM and twisted waves.
Figure 17:
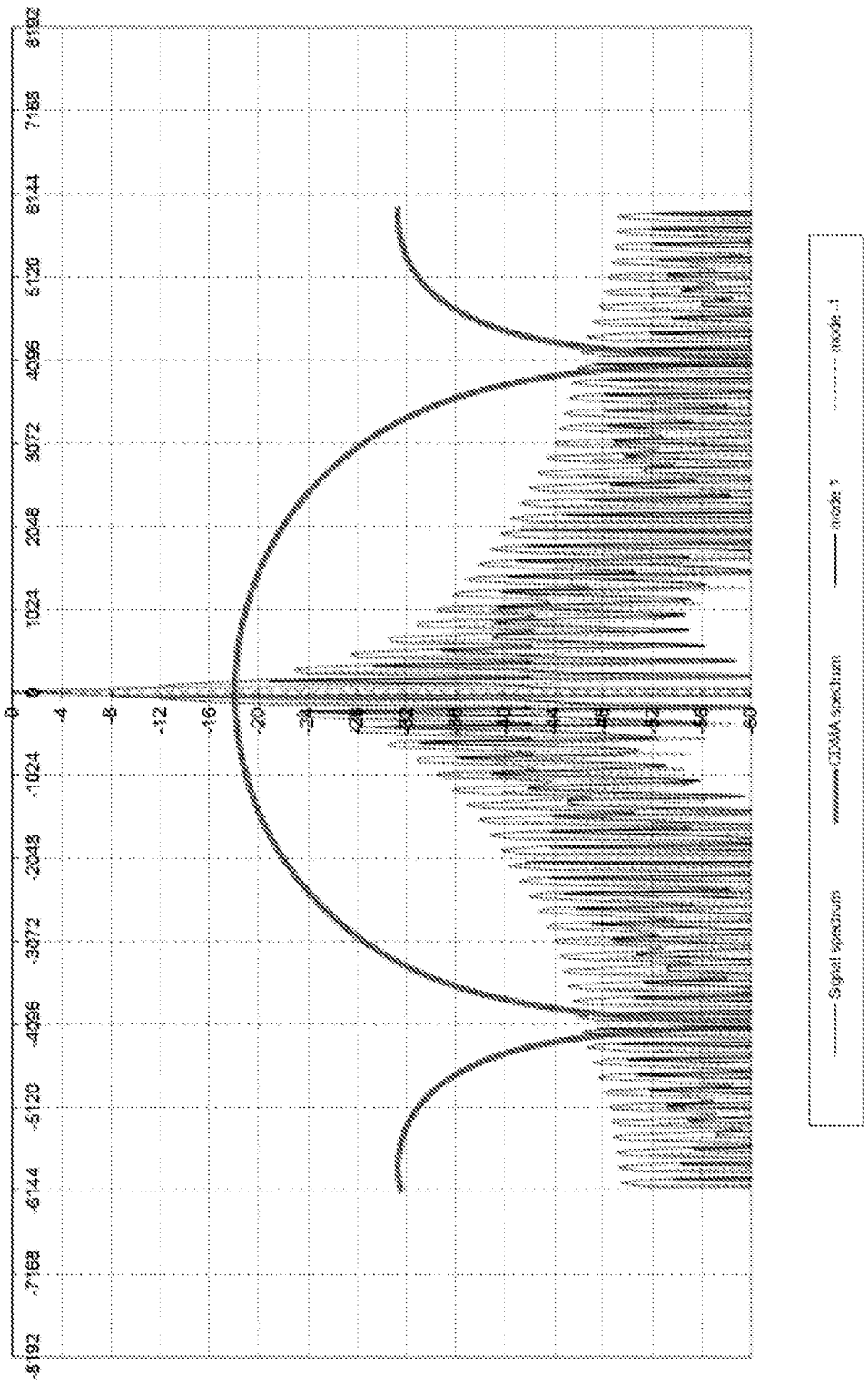
FIGS. 17 and 18 show frequency spectra of a spread spectrum signal and of three related information signals.
Figure 18:
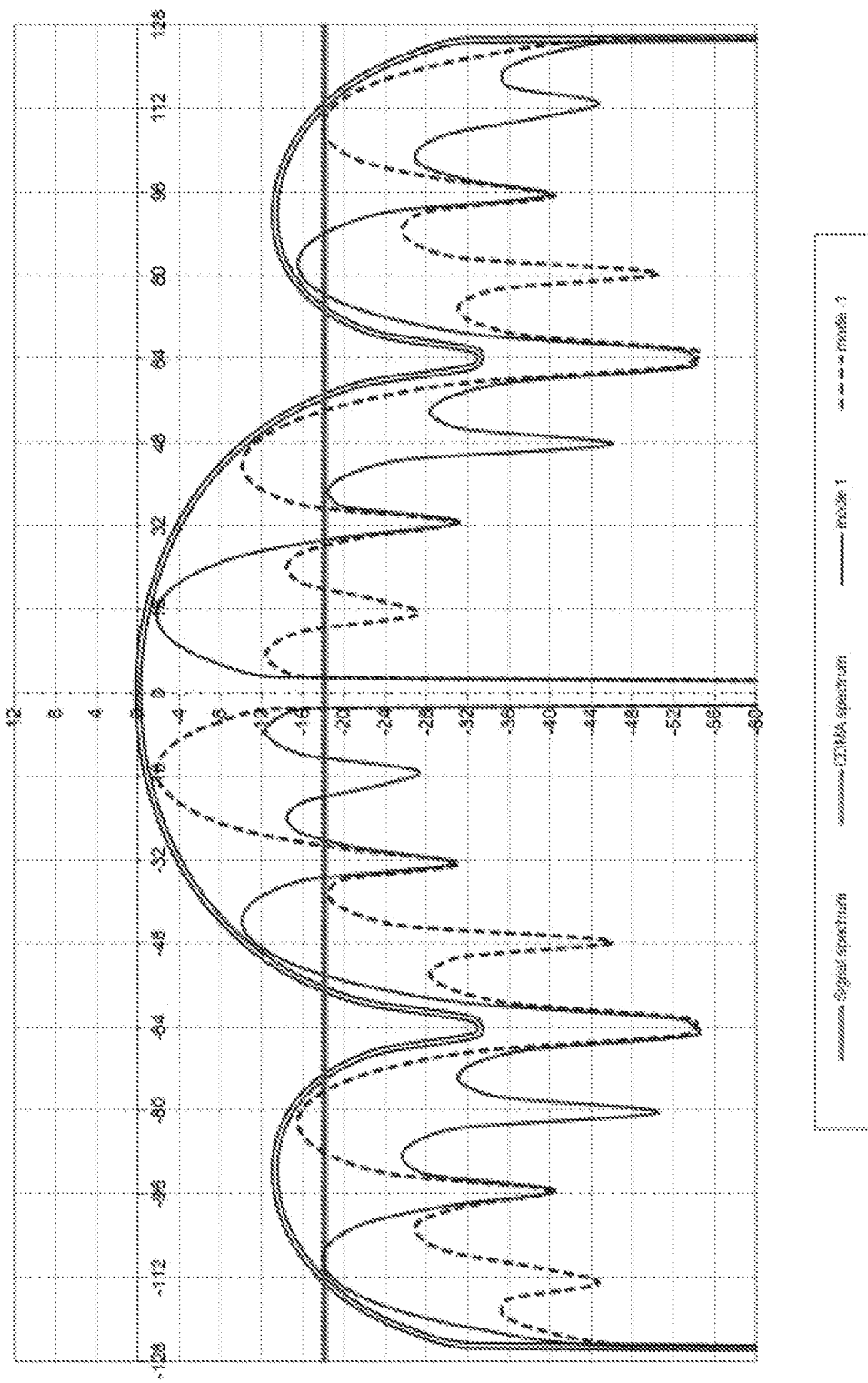

An example of RF frame structure of a signal organized in the Super Code is shown in FIG. 16, while the corresponding frequency spectra of the spread spectrum signal and of the three information signals are shown in FIGS. 17 and 18.

The code $c_N(t)$ is repeated five times for the main mode, for modes 01 and 10 the same code is rotated (twisted 90 degrees at each turn).

The spectra of modes 01 and 10 show their position shifted of $\pm\frac{1}{4}T$ with respect to the carrier according to the clockwise and the counter-clockwise rotation.

The main difference with minimum bandwidth signal is evident: the mode spectra can utilize the full spread bandwidth with no impairment on the RX matrix sensitivity to input noise. In spite of this improvement of the RX matrix performance, the use of the Kalman filter produces an additional meaningful improvement, as discussed hereinafter.

Figure 19:
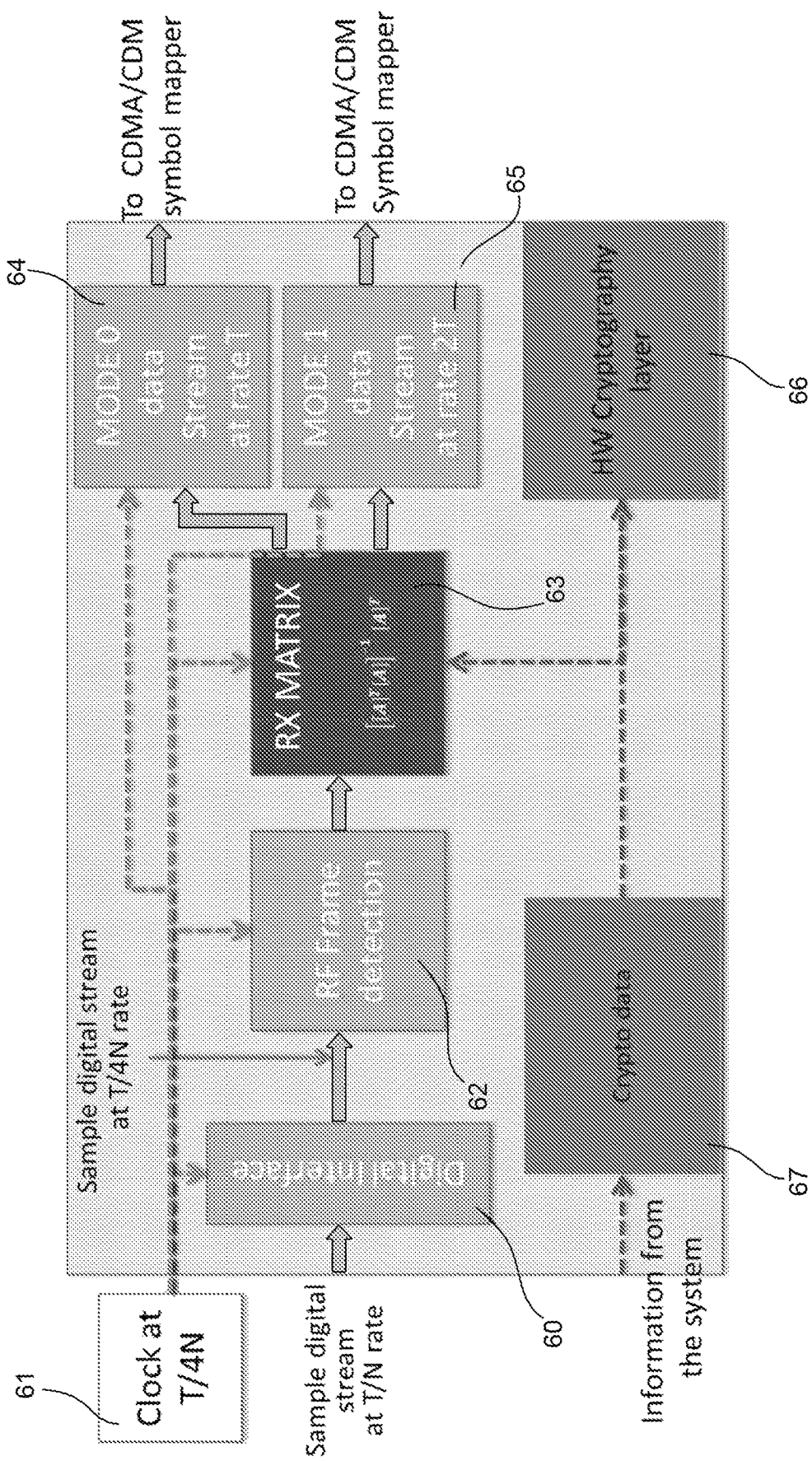
FIGS. 19 and 20 schematically illustrate examples of functional architectures suitable for application, at reception side of the radio communications architecture of FIG. 14, of a reception matrix without and with the use of a Kalman filter, respectively.

FIG. 19 schematically illustrates an example of functional architecture suitable for application of RX matrix at the RX side of the radio communications architecture shown in FIG. 14 (in particular, conveniently assuming an RF frame architecture with five symbols for the main mode and two HOMs (one mode 01 and one mode 10), oversampling of four times the chip rate, which is an usual way of oversampling CDMA/CDM signals to simplify the synchronization process).

The functional architecture shown in FIG. 19 includes modules and/or units for implementing/carrying out/providing:
  a digital interface (block 60) to receive the digital sample stream;
  a clock at T/4N (block 61) to provide an oversampling clock reference indicative of the rate used to sample (in particular, to oversample) incoming signals;
  RF frame detection (block 62);
  application of the RX matrix (block 63) to extract mode 0 data stream at rate T (i.e., symbols carried by the main mode—block 64) and mode 1 data stream at rate 2T (i.e., symbols carried by OAM mode with topological charge equal to 1—block 65);
  an hardware (HW) cryptography layer (block 66); and
  system information acquisition (block 67) to receive information items (or data), such as information items/data indicative of cryptography-related features used to apply the RX matrix (block 63) and to perform cryptography (block 66).

Figure 20:
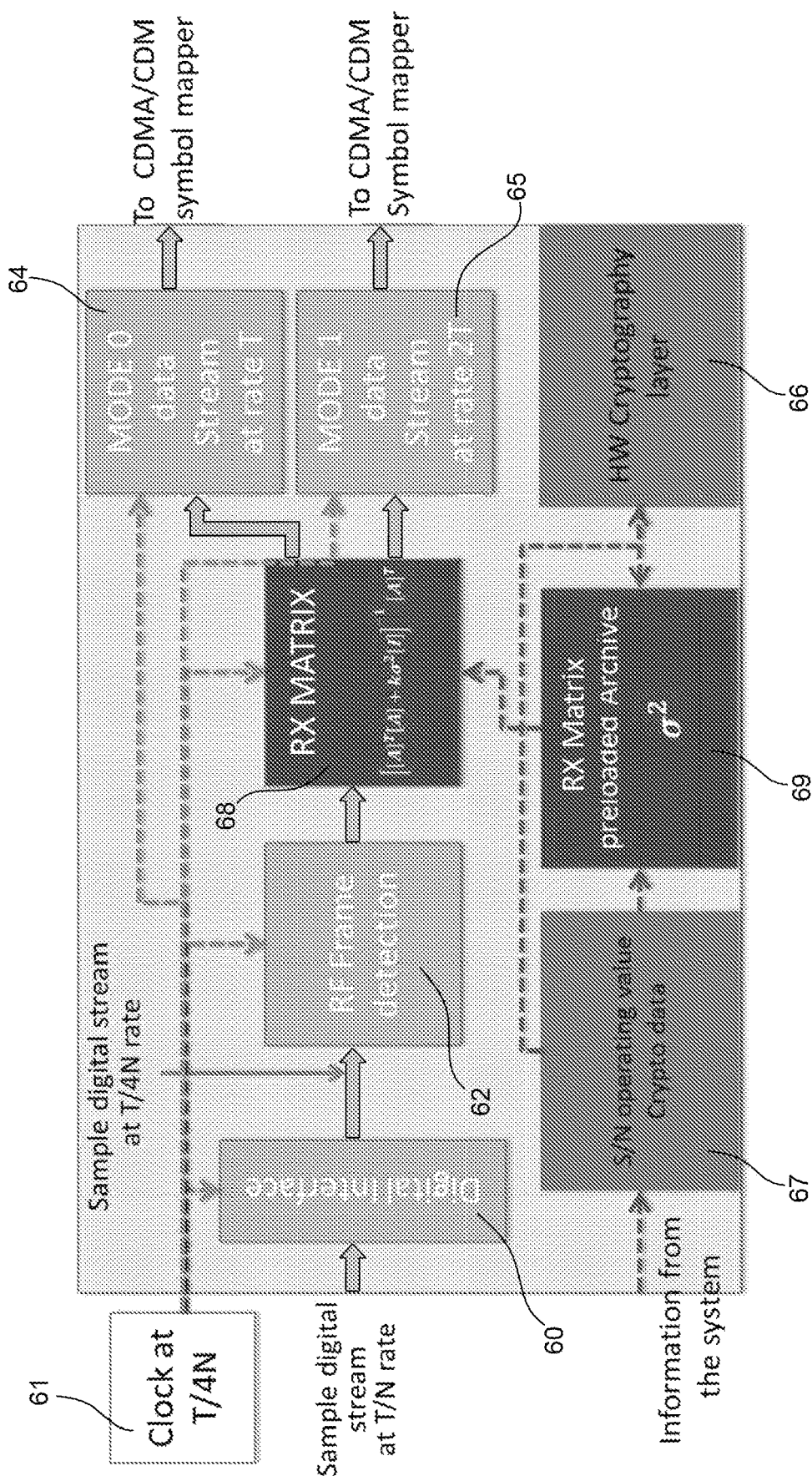

Additionally, FIG. 20 schematically illustrates an example of functional architecture suitable for application, at RX side of the radio communications architecture shown in FIG. 14, of a RX matrix with Kalman filter according to a preferred embodiment of the present invention.

In particular, the functional architecture shown in FIG. 20 differs from that one shown in FIG. 19 only in two things:

the application of the RX matrix with Kalman filter (block 68 in FIG. 20 in place of block 63 in FIG. 19) wherein RX matrix coefficients are modified based on estimated noise level $\sigma^2$; and the additional presence of a preloaded RX matrix archive (block 69).

The RX matrix acts as a generalization of the usual correlation device used for CDMA/CDM coding, considering that in this case a super code is considered which carries five main mode symbols and two HOM symbols.

The introduction of the Kalman filter slightly increases computational effort, but the impact on the performance is remarkable.

It is worth noting that, in the case of CDMA signals and partially also in case of CDM signals, the main contribution to the MER performance is the presence of interference due to the presence of codes that are not perfectly orthogonal.

Figure 21:
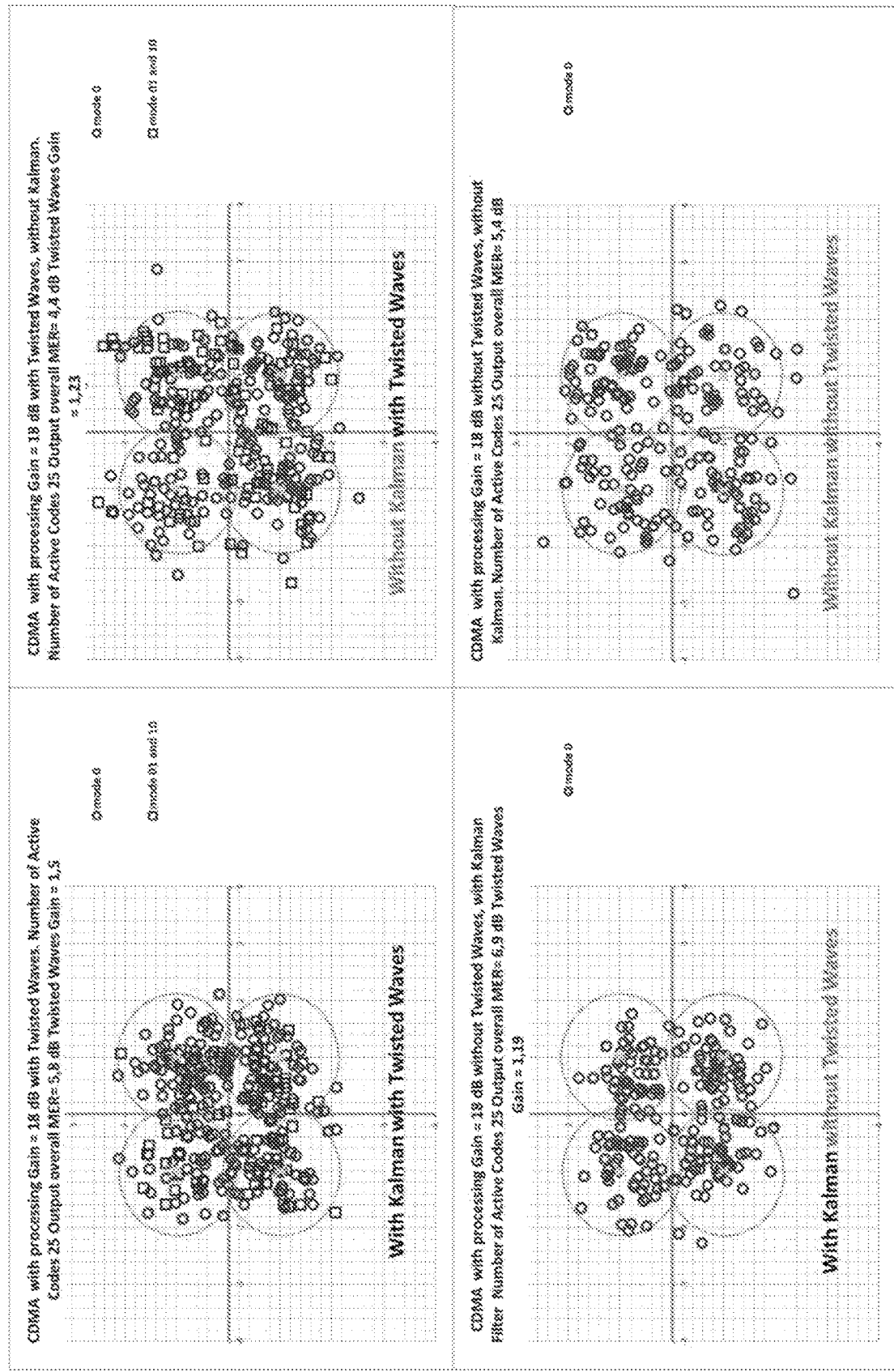
FIG. 21 shows experimental results related to combined use of CDMA/CDM and twisted waves.

In FIG. 21 experimental results are shown with and without Kalman filter, with and without HOM twisted waves signals, supposing a S/N for each spread signal (after spreading) equal to −5 dB and 25 simultaneous codes with a coding gain equal to 18 dB (assuming a code length of 64 chips). In this case, two separate effects can be verified: the use of twisted waves gives a gain advantage of about 23% without Kalman and 50% with Kalman. Using Kalman without twisted waves there is an advantage of 19% with respect to conventional CDMA signals. Therefore, for this kind of signal the total gain can be approximated as:

$$\text{Gain}_{Twisted\ Waves+Kalman\ Filter} = \text{Gain}_{Twisted\ Waves} \cdot \text{Gain}_{Kalman\ Filter}.$$

The above relation is very important for backward capability as shown hereinafter.

Figure 22:
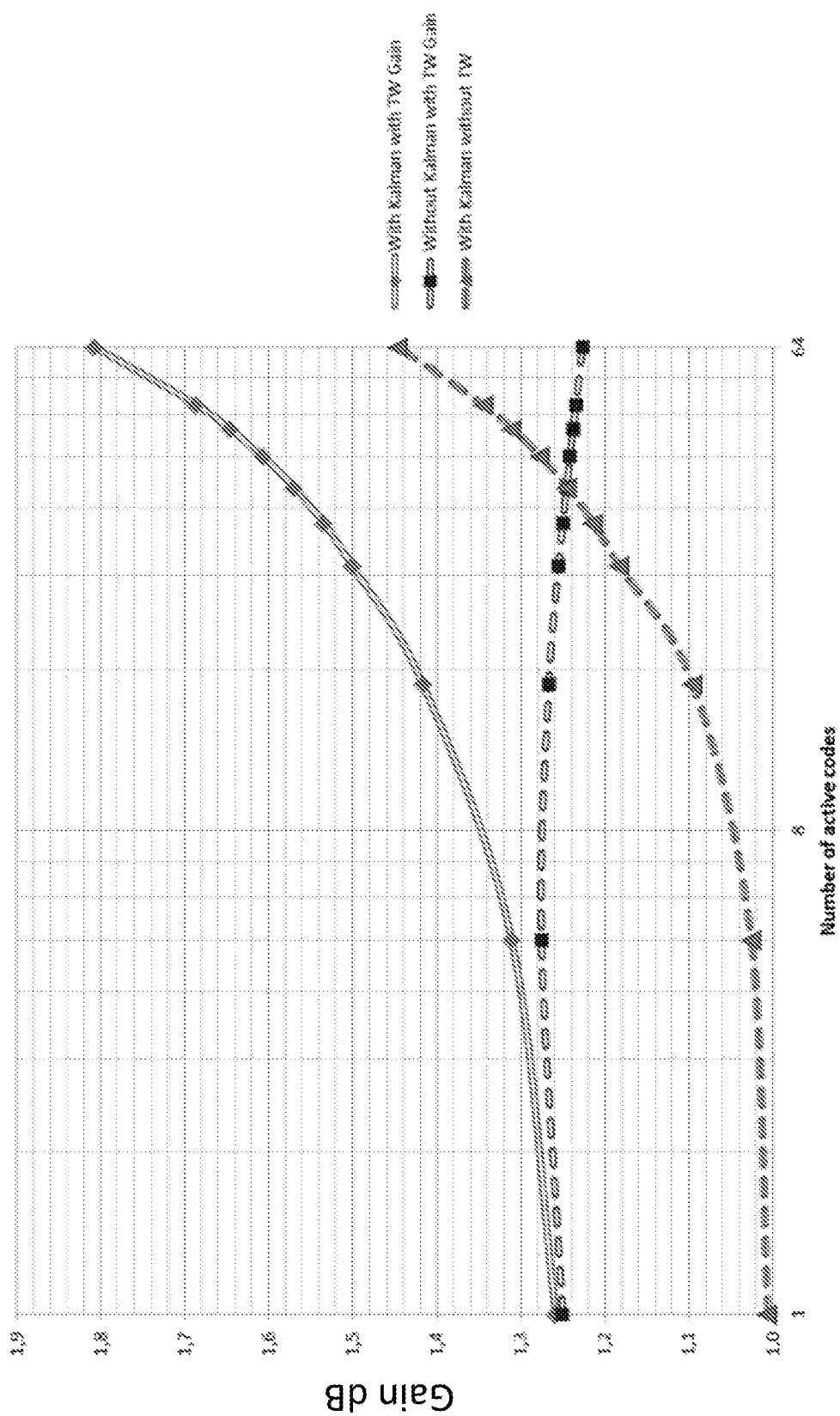
FIG. 22 shows gain of CDMA with and without the use of Kalman filter, and with and without twisted waves.

FIG. 22 shows gain of CDMA with and without Kalman filter, and with and without twisted waves, with respect to number of simultaneous codes used. The results indicate that CDMA can work with a much higher load of simultaneous codes with very good performance. Indeed, looking at the use of 64 codes, the gain with twisted waves and Kalman filter is more than 80% and the use of Kalman filter alone give a gain advantage of 45%, higher than the 23% advantage of twisted waves without Kalman. The total gain can be approximated by the product of the two gains.

CDMA/CDM is a very powerful technique, which allows not only to spread the signal over a larger bandwidth and the possibility of transmitting simultaneous "orthogonal" codes over the same bandwidth, but also the fundamental characteristic to use the spread bandwidth to maintain all the information related to the "baseband signals". This is a very important feature with respect to the minimum bandwidth signals, where the symbol rate is very close to the occupied bandwidth.

Figure 23:
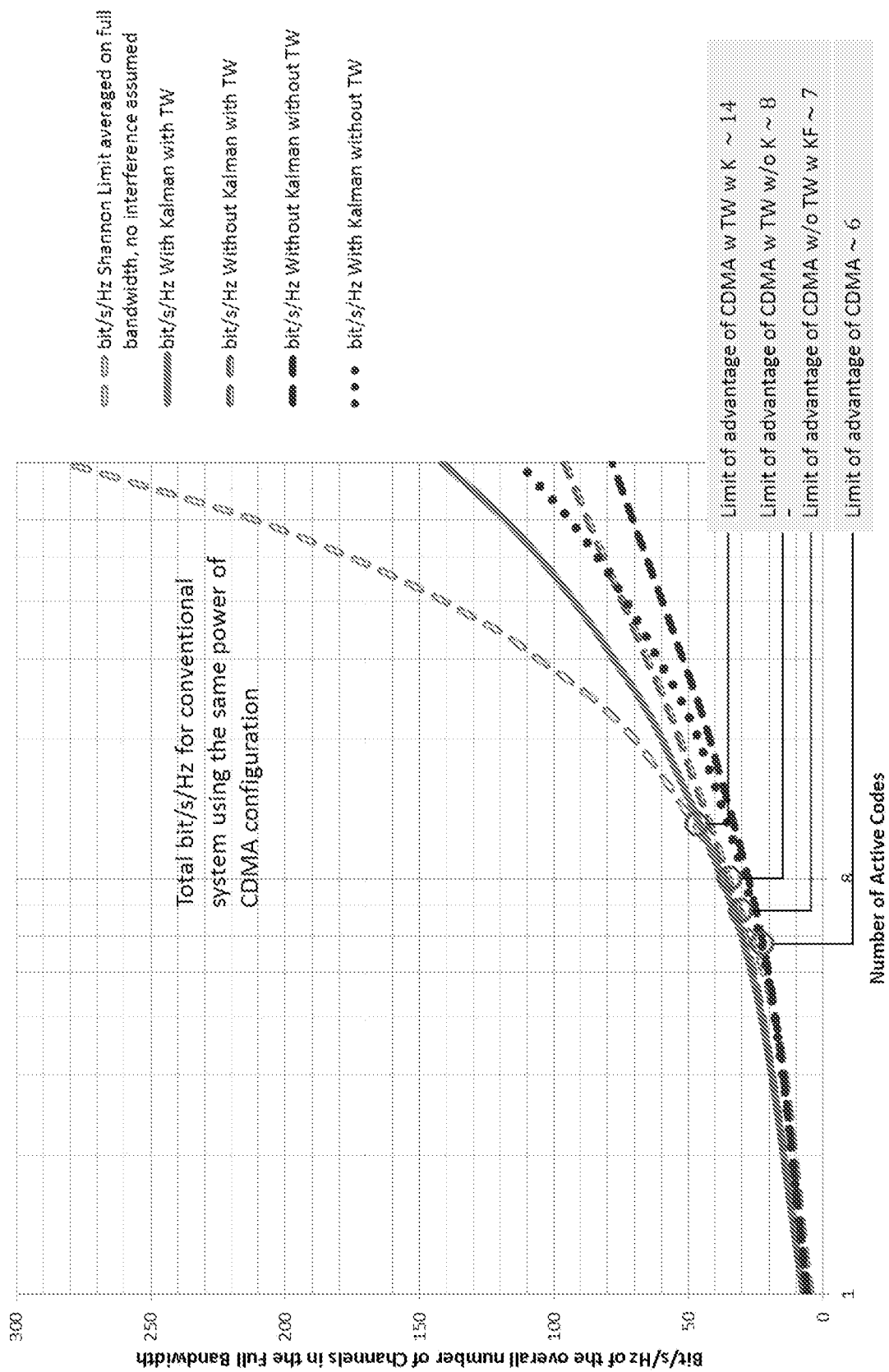
FIG. 23 shows spectral efficiency of CDMA with/without twisted waves and Kalman filter with respect to conventional signal with the same total bandwidth and power.

Considering the available total power (given by the product of the single coded signal by the number of active codes, namely $$\text{Total Power}_{active\ codes} = \text{Power}_{c_k} N_{number\ active\ codes},$$

it is interesting to verify the total bit/s/Hz ratios (spectral efficiency) of a conventional signal architecture and of CDMA/CDM (with/without twisted waves and Kalman filter), including also a typical interference, due to the use of multi-code transmission. Experimental results are shown in FIG. 23 (that illustrates spectral efficiency of CDMA with/without twisted waves and Kalman filter with respect to conventional signal with the same total bandwidth and power (64 channels maximum)). The advantage of using the combination of twisted waves and Kalman filter is evident, but also the advantage of using only Kalman filter is good and this peculiarity may be proposed as an approach to manage the transition from CDMA to twisted wave+CDMA, guaranteeing for all the users a full "loss free" backward compatibility.

Wideband Code Division Multiple Access (W-CDMA or WCDMA), along with UMTS-FDD, UTRA-FDD, or IMT-2000 CDMA Direct Spread, is an air interface standard developed inside 3G mobile telecommunications networks. It supports conventional cellular voice, text and MMS services, but can also carry data at high speeds, allowing mobile operators to deliver higher bandwidth applications including streaming and broadband Internet access.

The UMTS uses DS-CDMA to transmit data. DS-CDMA is well suited to transmit data over the multipath fading channel. The high signal bandwidth for the WCDMA system (5 MHz) allows the received signal to be split into distinct paths with high resolution. For the first generation of UMTS handsets, a rake receiver is the chosen receiver because it allocates one rake finger to each path, thus maximizing the amount of received signal energy. The rake receiver combines these different paths into a composite signal with substantially better characteristics for demodulation than a single path. To combine the different paths meaningfully, the rake receiver needs such channel parameters as the number of paths, their location (in the delay domain), and their attenuation complex values. In a WCDMA system, the necessary channel parameters are estimated and tracked throughout the transmission.

The rake receiver was designed to equalize the effects of multipath. It uses a combination of correlators, code generators, and delays, or "fingers", to spread out the individual echo signals of the multipath. Each signal is then delayed according to peaks found in the received signal.

In a typical mobile multipath environment, each path can be approximated via a complex attenuation and a delay time, due to the different length of the path itself.

The rake receiver is capable of managing the different paths, as far as the relevant delay is larger than 1/NT, which is the time dimension of the spread spectrum sequence chip.

In a typical rake receiver, delay time of each path is detected, then each path is descrambled and de-spread, finally the different paths are synchronized and phased to get the proper channel estimation and obtain an increased equivalent S/N ratio. The S/N improvement depends on the number of paths that can give contribution. It is reasonable to assume an increase of S/N ratio between 3 and 6 dB.

Delays depend on the cell dimensions and complexity of the cell environment. Typical values for a cell of about 5 km of equivalent radius can be between 0.26 μs (which is the minimum size of the chip) to 3-4 μs, corresponding to a path difference of about 1 km.

Figure 24:
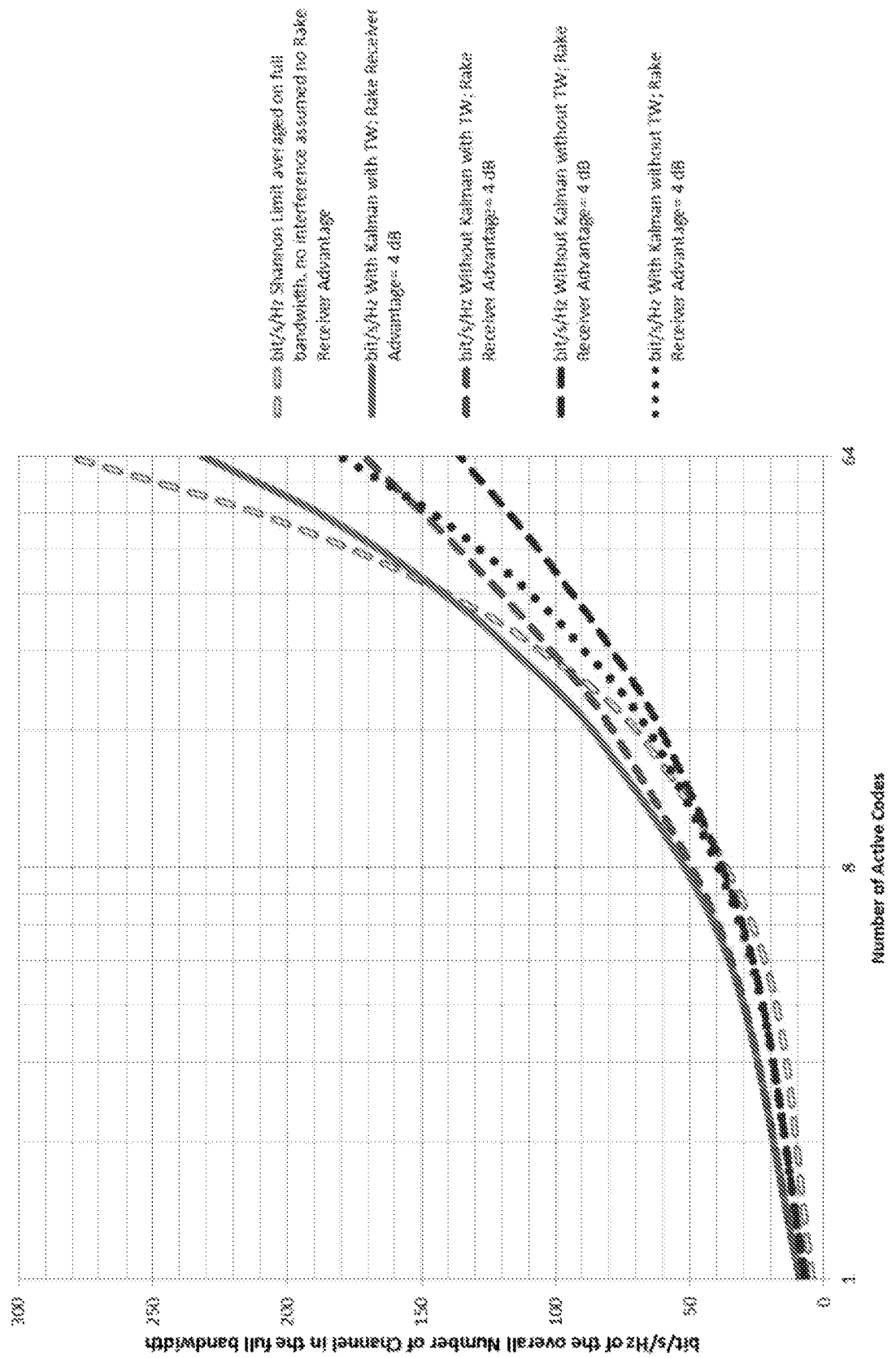
FIG. 24 shows combined rake receiver and twisted waves performance.

These figures are much smaller than the code length, which is about 133 μs. This consideration is very important because allows the use of the rake receiver not only for the main mode but also for the HOM, with the advantage that the two effects: rake receiver and HOM (deriving from the use of twisted waves) can be combined as shown in FIG. 24 (that illustrates combined rake receiver and twisted waves performance).

The combined use of rake receiver and twisted waves is possible for the majority of path combinations which can be present in a mobile cell. This element can be utilized for improving significantly the UMTS performance, as it possible to verify by comparing FIGS. 23 and 24. The use of Kalman filter, twisted waves and rake receiver (assuming an advantage of 4 dB) allows to reach the cross over between the Shannon limit and the CDMA at about 45 active codes instead of 28. For the conventional configuration the cross over with rake receiver (4 dB gain) is 25 instead of 16.

6. FREQUENCY TWISTED WAVES

In WO 2015/189653 A1, WO 2015/189703 A2 and WO 2015/189704 A2 it is presented the possibility of using the same approach of time twisted waves also in the frequency domain (by exploiting the property of time and frequency to be "conjugated variables"), thereby obtaining frequency twisted waves.

Assuming a time-limited signal in the time window T (this is a usual technique in the case of OFDM-OFDMA signals), in the frequency domain the signal can be represented by a serial of frequency "sync" pulses:

$$X(f) = \sum_{k=-\infty}^{\infty} a_k e^{j\varphi_k} \frac{\sin\left[\pi T\left(f - \frac{k}{T}\right)\right]}{\pi T\left(f - \frac{k}{T}\right)}.$$

If the signal X(f) can be approximated with a band-limited (in the bandwidth B) signal, this implies that:

$$X(f-f_0) = X^+(f-f_0) + X^-(f-f_0),$$

where + and − represent positive and negative frequencies, respectively.

Considering only the positive part, it can be written:

$$X^+(f - f_0) = X(f - f_0), \text{ for } f \geq 0 \text{ and } 0 \text{ elsewhere},$$

and $$X^+(f) = \sum_{k=-N}^{N} a_k e^{j\varphi_k} \frac{\sin\left[\pi T\left(f - f_0 - \frac{k}{T}\right)\right]}{\pi T\left(f - f_0 - \frac{k}{T}\right)}, \text{ where } N = TB$$

Each sample is constituted by the real part given by $a_k \cos \varphi_k$, and the imaginary part given by $a_k \sin \varphi_k$. These functions are considered part of the "even mode".

In a way similar to the time approach, the "odd modes" are introduced considering four frequencies shifted of ½T and rotated of π/2 each step or −π/2 (clockwise and counter-clockwise mode) associated with the HOM symbols, limiting the presence of the first HOMs.

Modes ±1 can be conveniently generated by repeating the same symbol at four different frequencies 1/T (½+k), changing each time their phases according to e^(±jk π/2), k=0, 1, 2, 3 rotations.

It is important to note some differences between the time and the frequency pulses:
- time pulses are real, while the frequency pulses are in general complex;
- time pulses do not imply a larger bandwidth, while frequency pulses require it; this is typically ensured by the structure of the OFDM/OFDMA signal, where the total bandwidth is N time larger than the minimum information bandwidth associated with the component signal (assuming 0% roll-off).

As previously explained, Applicant's International application WO 2015/189703 A2 relates to the use of frequency twisted waves to increase transmission capacity of:
- in general, wireless communication systems based on Orthogonal Frequency-Division Multiplexing (OFDM) and/or Orthogonal Frequency-Division Multiple Access (OFDMA) and/or Single-Carrier Frequency-Division Multiple Access (SC-FDMA) and/or combinations/variants/developments of these technologies; and,
- in particular, 4G (4$^{th}$ Generation) cellular networks based on Long Term Evolution (LTE) and/or LTE Advanced standards, future 5G (5$^{th}$ Generation) cellular networks, and also wireless communication systems based on Worldwide Interoperability for Microwave Access (WiMAX) standard.

Hereinafter, some basic concepts concerning the use of frequency twisted waves with OFDM/OFDMA and SC-FDMA (and, in particular, with LTE and LTE Advanced) will be presented. Anyway, all related details can be found in WO 2015/189703 A2 (whose content is herewith enclosed by reference).

As is known, the project from UMTS to LTE was intended to get higher performance, backward compatibility and wide application.

LTE employs OFDMA for downlink data transmission and SC-FDMA for uplink data transmission. The use of OFDMA for downlink allows improving spectral efficiency, reducing Inter-Symbol Interference (ISI) effect by multipath and simplifying measures against frequency selective fading.

For uplink, SC-FDMA was selected, being a new single carrier multiple access technique that has similar structure and performance to OFDMA with a salient advantage over OFDM (OFDMA) that is a low Peak to Average Power Ratio (PAPR, typically 6 dB advantage). Therefore, the main advantage of such a configuration is to reduce user terminal power consumption, consequently increasing battery life.

Figure 25:
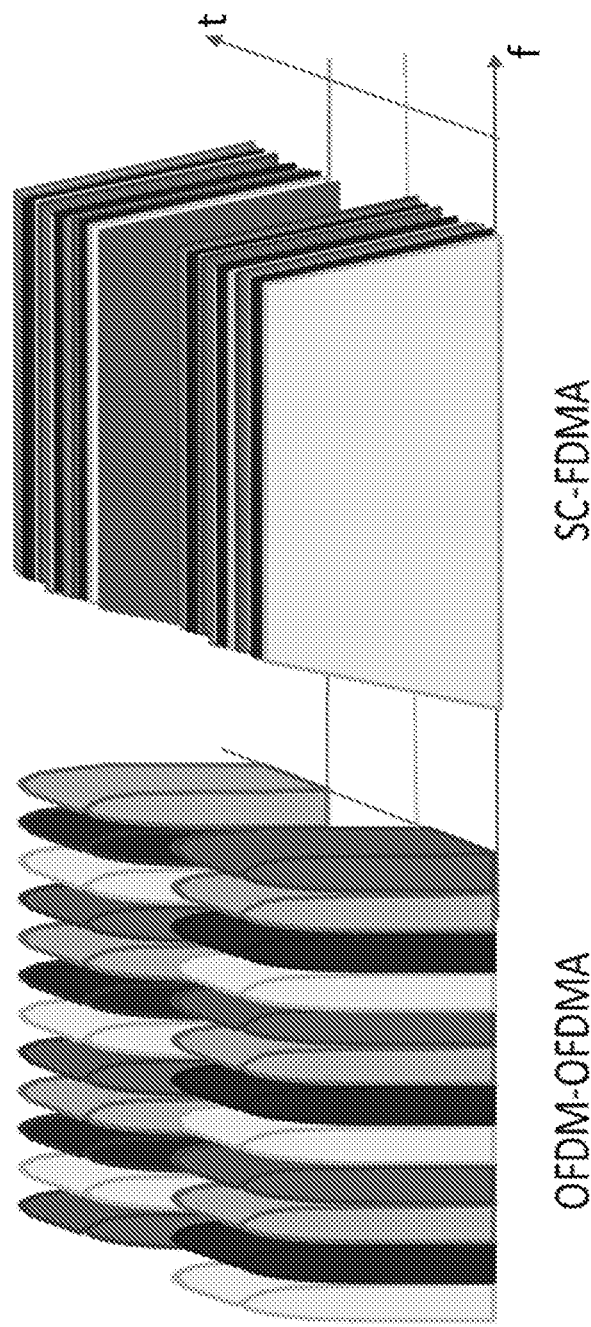
FIG. 25 shows a comparison between frequency-time allocation in OFDM-OFDMA and in SC-FDMA.

In OFDM-OFDMA, one symbol is associated with one frequency (15 KHz) for each resource element. In SC-FDMA, twelve symbols are associated with twelve simultaneous resource elements, while each symbol is distributed on twelve frequencies. In this connection, FIG. 25 schematically illustrates a comparison between frequency-time allocation in OFDM-OFDMA and in SC-FDMA.

In LTE, the access network is simplified and includes a base station called Evolved Node B (abbreviated as eNodeB or eNB). As previously explained, the physical layer is based on SC-FDMA for uplink and OFDMA for downlink. Two modes are considered, namely Frequency-Division Duplexing (FDD) and Time-Division Duplexing (TDD). LTE includes also a new form of Multimedia Broadcast Multicast Services (MBMS) called eMBMS (i.e., evolved MBMS), compatible with LTE physical layer.

The eNodeB is complex and the introduction of frequency twisted wave technology has a limited impact: in principle, it changes only the physical layer by adding the additional channels generated by the frequency twisted wave technology with a full compatibility with OFDM-OFDMA and SC-FDMA. In practical terms, some modifications could be required also to the Radio Link Control (RLC) layer, the Medium access Control (MAC) layer up to the Scheduler and the eNB Measurement Configuration and Provision layers. These modifications are related, on the one hand, to management of the additional transmission capacity created by the use of frequency twisted waves, and, on the other hand, to the management of the different behavior of the frequency twisted waves in multipath environment.

In extreme synthesis, the introduction of a new radio interface standard was intended to get:

significantly increased peak data rates;
increased cell edge bit rates;
improved spectrum efficiency (no roll off is needed);
improved latency;
scalable bandwidth;
reduced CAPEX (CAPital EXpenditure) and OPEX (OPerating EXpenditure);
acceptable system and terminal complexity, cost and power consumption;
compatibility with earlier releases and with other systems
optimization for low mobile speed with support for high mobile speed.

In particular, the goal of significantly increased peak data rates, linearly scaled according to spectrum allocation, implies the following targets:
instantaneous downlink peak data rate of 100 Mbps in a 20 MHz downlink spectrum (i.e., 5 bit/s/Hz); and
instantaneous uplink peak data rate of 50 Mbps in a 20 MHz uplink spectrum (i.e., 2.5 bit/s/Hz).

The mobility enhancement defined by the transition from the existing UTRAN (Universal Terrestrial Radio Access Network) to the Evolved UTRAN (E-UTRAN) implies that the mobile channel:
is optimized for mobile speeds from 0 to 15 km/h;
supports, with high performance, speeds between 15 and 120 km/h;
maintains mobility at speeds between 120 and 350 km/h and even up to 500 km/h depending on the frequency band; and
supports voice and real-time services over the entire speed range with quality at least as good as UTRAN.

Another important reason to change from time to frequency is the spectrum flexibility. In fact, the new E-UTRA (Evolved Universal Terrestrial Radio Access) is capable of:
operating in 1.25, 1.6, 2.5, 5, 10, 15 and 20 MHz allocation, allowing different possibilities for re-using uplink and downlink spectrum already in use, paired and unpaired;
coexisting with GERAN/3G (GSM EDGE Radio Access Network/3G) on adjacent channels with other operators on adjacent channels, with overlapping or adjacent spectrum at country border; and
enabling handover with UTRAN and GERAN, and also with other non-3GPP technologies (such as CDMA 2000, WiFi, WiMAX).

LTE physical layer is defined in a "bandwidth-agnostic" way thereby being adaptable to various spectrum allocations.

Figure 26:
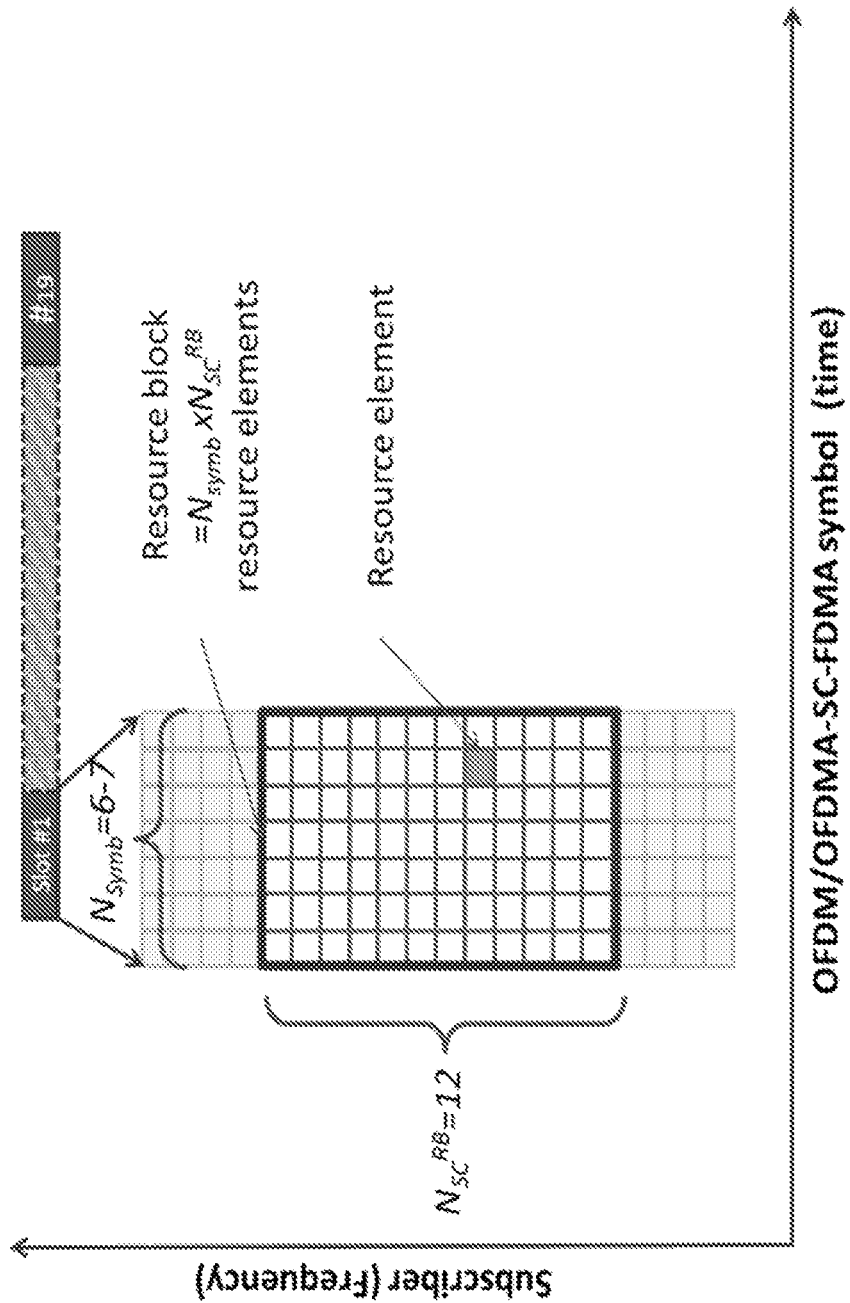
FIG. 26 shows a traditional LTE physical resource block.

The traditional LTE radio frame for both FDD and TDD has a duration of 10 ms and consists of 20 time slots each with a duration of 0.5 ms. Two adjacent time slots form one sub-frame of length 1 ms. A physical resource block (PRB) spans either 12 sub-carriers with a sub-carrier bandwidth of 15 kHz, or 24 sub-carriers with a sub-carrier bandwidth of 7.5 kHz, each over a time slot duration of 0.5 ms. In this respect, FIG. 26 schematically shows a traditional LTE physical resource block, wherein:
one frame is 10 ms and contains 10 sub-frames;
one sub-frame is 1 ms and contains 2 time slots;
one time slot is 0.5 ms and involves N physical resource blocks (with 6<N<110); and
one physical resource block is 0.5 ms and contains 12 sub-carriers.

An additional framing is defined for TDD owing to backward compatibility with Time Division Synchronous Code Division Multiple Access (TD-SCDMA).

The physical channels defined in downlink are the Physical Downlink Shared Channel (PDSCH), the Physical Downlink Control Channel (PDCCH) and the Common Control Physical Channel (CCPCH). The physical channels defined in uplink are the Physical Uplink Shared Channel (PUSCH) and the Physical Uplink Control Channel (PUCCH).

In addition, signals are defined as reference signals, primary and secondary synchronization signals or random access preambles.

The modulation schemes supported in downlink and uplink are QPSK, 8-PSK, 16-QAM, 32-QAM and 64-QAM. The Broadcast channel use only QPSK.

The channel coding scheme for transport blocks in LTE is Turbo Coding with a coding rate of $R=\frac{1}{3}$, two 8-state constituent encoders and a contention-free Quadratic Permutation Polynomial (QPP) turbo code internal interleave. Trellis termination is used for the turbo coding. Before the turbo coding, transport blocks are segmented into byte aligned segments with a maximum information block size of 6144 bits. Error detection is supported by the use of 24 bit Cyclic Redundancy Check (CRC).

The generic frame structure is applicable to both FDD and TDD. Each radio frame is long and consists of 20 time slots of length $T_{slot}=15360 \times T_i=0.5$ ms, numbered from 0 to 19. The structure of each half-frame in a radio frame is identical. A sub-frame is defined as two consecutive time slots.

As previously explained, LTE employs OFDMA for downlink data transmission and SC-FDMA for uplink transmission. The main reasons for changing with respect to the former cellular standards are based on the need to increase the available bandwidth, taking into account the channel fading, and, at the same time, on the system flexibility for low, medium and high communication throughputs.

Figure 27:
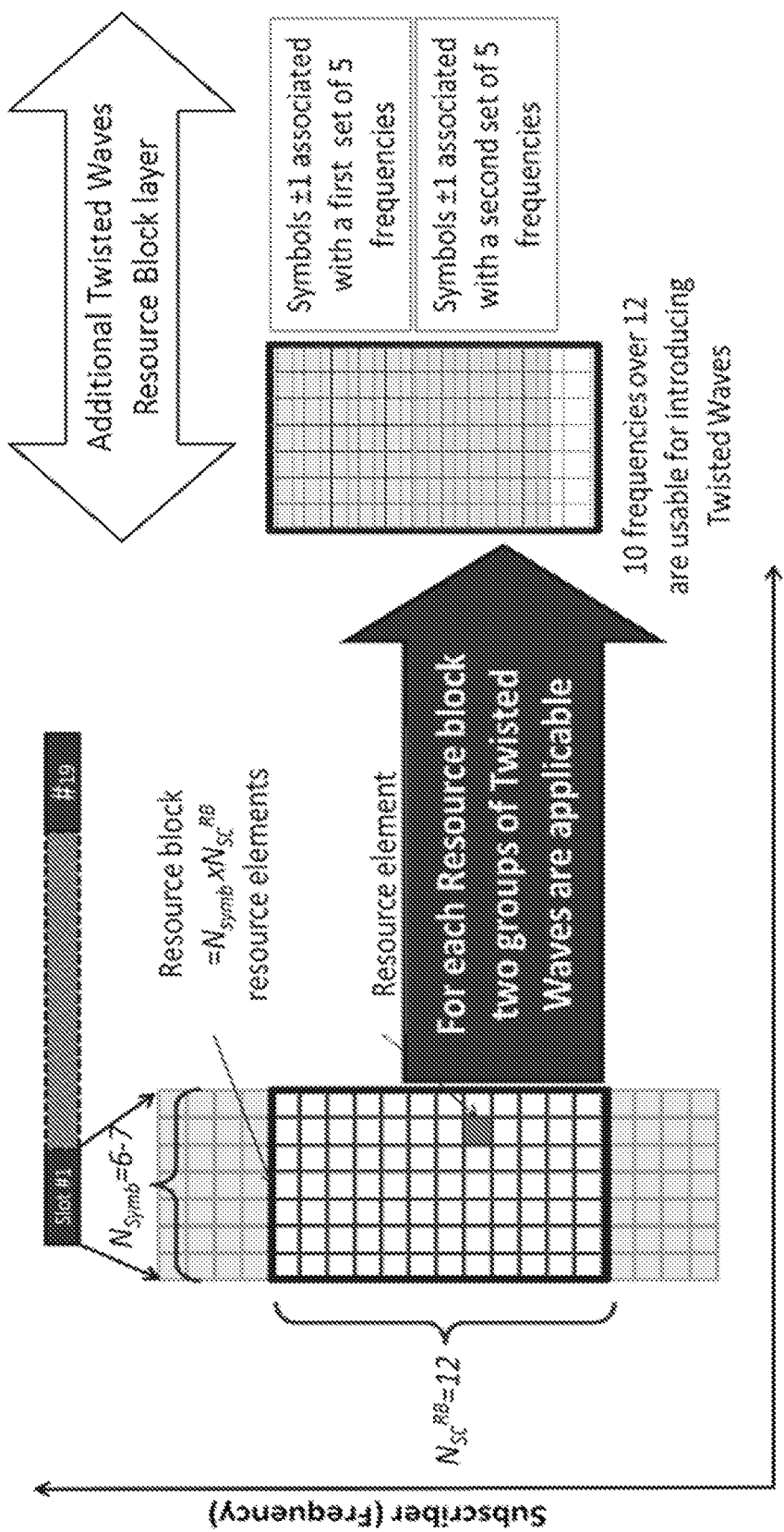
FIG. 27 shows introduction of twisted modes in LTE physical resource block.

As taught in WO 2015/189703 A2, frequency twisted waves can be advantageously applied to LTE and, more in general, to OFDM/OFDMA and SC-FDMA systems. In this connection, FIG. 27 schematically illustrates introduction of twisted HOMs in LTE physical resource block.

Figure 28:
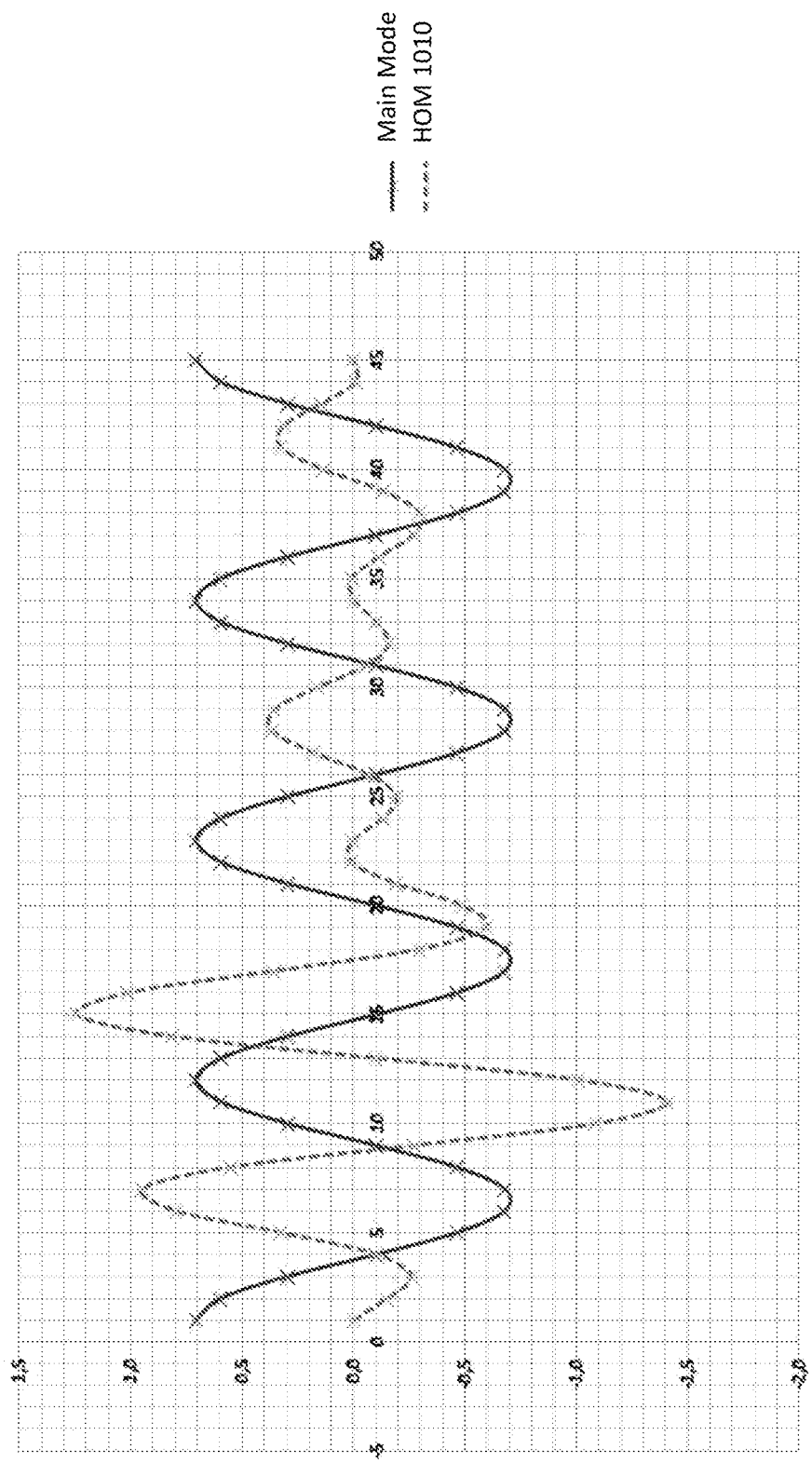
FIG. 28 shows an example of time shape of frequency twisted waves, in particular a main mode and an HOM.

The RF frame defined in OFDM/OFDMA standard can host four additional symbols, using HOMs 01 and 10. In this connection, FIG. 28 shows an example in which one main mode and one HOM are present (only real parts thereof): mode 0 is a portion of a cosine signal, while HOM 1010 is the sum of four frequencies properly phased.

It is worth noting that HOMs and main mode are orthogonal and that cross-correlation between any two different rows of the RX matrix is always lower than −40 dB.

Future 5G mobile communication technology represents, nowadays, the most attractive research field in the communications area with a very large number of improvements intended to optimize the possible waveforms to be used in the system architecture and modulation standard. All the new waveforms aim at reducing interference, depending on the long tail of the side-lobes of the traditional OFDM-OFDMA waveforms. This optimization does not affect twisted waves introduction (thanks to the fact that these new methods do not vary the main condition for twisted wave best performance, i.e., the possibility of using an overall bandwidth much larger than the single component signal symbol rate) and the Kalman filter introduction (which is based on oversampling and not on the used bandwidth).

Nowadays, Universal Filtered OFDM (UF-OFDM), Filter Bank MultiCarrier (FBMC), and Generalized Frequency Division Multiplexing (GFDM) are under investigation worldwide as promising candidates for new 5G mobile communication systems.

Preparations for the migration from LTE/LTE-Advanced to next-generation mobile communications systems (i.e., 5G) are worldwide progressing.

In particular, the European METIS6 and 5GNOW7 projects have advanced the research of new waveforms meeting 5G requirements.

LTE/LTE-Advanced currently uses Cyclic Prefix OFDM (CP-OFDM) as the wireless signal multiplexing method, because it has high spectrum efficiency as well as high tolerance against multipath propagation and fading.

On the other hand, CP-ODFM signal requires high linearity to output power amplifiers according to its high PAPR. As a result, the power amplifier efficiency is low, increasing the User Equipment (UE) battery power consumption. Consequently, there are problems with shortened hours to receive wireless services. Moreover, the CP-OFDM spectrum has high out-of-band (OOB) side-lobes, causing problem with lowered spectrum efficiency when many UEs operate at one location.

Use of the Filtered Multi-carrier technology is examined to reduce the OB side-lobes and is recognized as "New Waveform". Various different methods have been proposed for implementing the Filtered Multi-carrier technology. These methods offer to improve CP-OFDM using sub-carrier filtering but each filtering method is different.

In particular, as previously explained, UF-OFDM, FBMC and GFDM are the new proposed waveforms.

UF-OFDM is similar to OFDM and uses same OFDM processing chain. Unlike OFDM, filters are used in UF-OFDM after Inverse Discrete Fourier Transform (IDFT).

FBMC uses a technology for which non adjacent subcarriers are separated perfectly. No cyclic prefix is needed and hence there is an improvement in spectral efficiency. Filtering is applied in frequency domain.

GFDM uses multi-dimensional block structure with cyclic prefix and circular signal structure (in time and frequency), pulse shaped sub-carriers and overlapping sub-carriers.

Introduction of twisted waves and Kalman filter does not cause any substantial variation, as far as the new waveforms are considered in the estimation matrix used at RX side.

The advantages of the new waveforms is a strong reduction of the OOB interference, which allows improving transmission capacity of the overall system, allowing the introduction of twisted waves.

Considering again OFDM/OFDMA and SC-FDMA, the introduction of twisted waves can be approached as a generalization of the OFDM/OFDMA and SC-FDMA conventional technologies. The RF frame creation can be regarded as a generalization of the Inverse Fast Fourier Transform (IFFT) and the RX matrix as a generalization of Fast Fourier Transform (FFT), characterized by the introduction of an oversampling of ¼T instead of the minimum sampling rate 1/2T.

Figure 29:
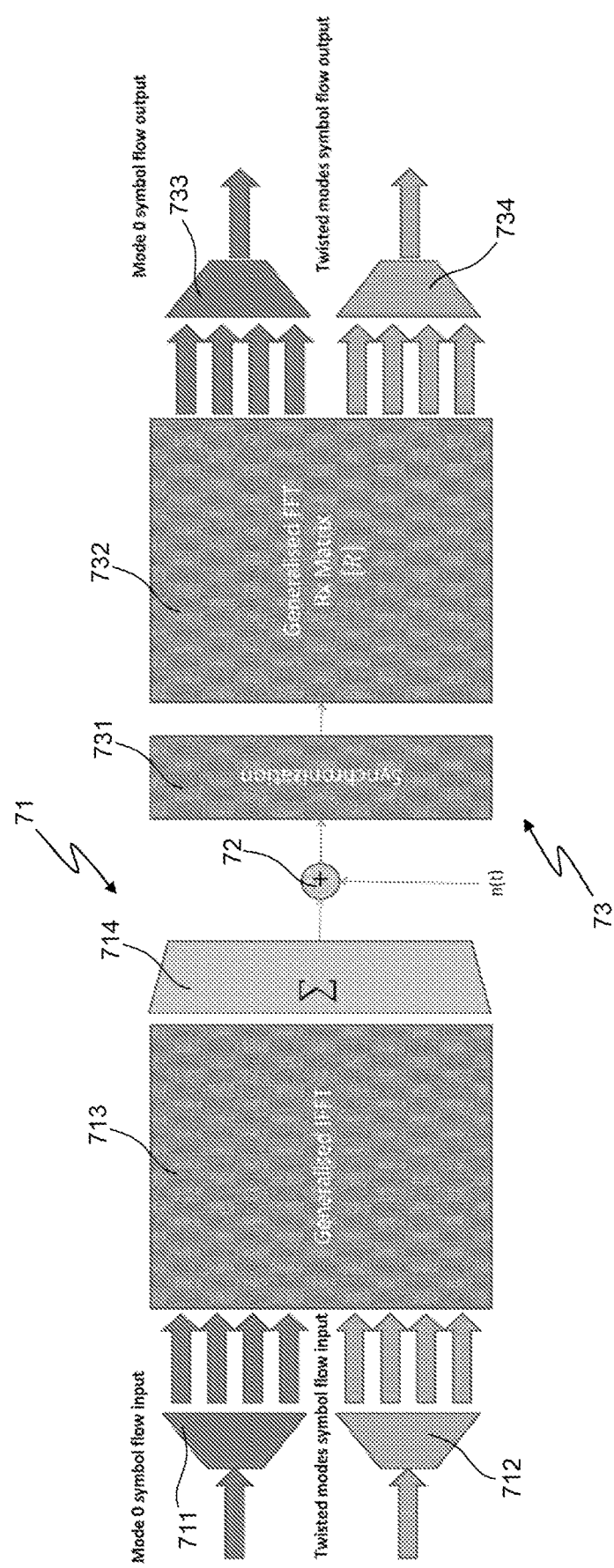
FIG. 29 schematically illustrates a radio communications architecture according to the teachings of WO 2015/189703 A2 related to the combined use of OFDMA/OFDM with frequency twisted waves.

In this connection, FIG. 29 shows a functional block diagram schematically representing a radio communications architecture according to the teachings of WO 2015/189703 A2 related to the combined use of OFDMA/OFDM with frequency twisted waves (and, thence, suitable, for example, for LTE downlink transmissions).

In particular, as shown in FIG. 29, at the TX side (denoted as a whole by 71) a first serial-to-parallel conversion (block 711) is applied to a first input sequence of first symbols to be transmitted and a second serial-to-parallel conversion (block 712) is applied to a second input sequence of second symbols to be transmitted, thereby parallelizing the first symbols (to be transmitted via traditional OFDMA) and the second symbols (to be transmitted via frequency twisted modes).

Then, a Generalized IFFT (block 713) is applied to the parallelized first and second symbols so as to generate (block 714) an output (digital) time signal transmitted through a communication channel affected by noise n(t) (block 72), wherein said output time signal results from:
  (traditional) OFDMA frequency samples carrying the first symbols, wherein said OFDMA frequency samples are positioned at OFDMA frequencies spaced apart by a predetermined frequency spacing (i.e., at traditional OFDMA sub-carriers with a sub-carrier bandwidth of, for example, 7.5 or 15 kHz); and
  additional twisted mode frequency samples carrying the second symbols, wherein said twisted mode frequency samples are positioned at respective twisted mode frequencies that are shifted with respect to the OFDMA frequencies.

Furthermore, at the RX side (denoted as a whole by 73):
  RF frame synchronization is performed (block 731);
  a Generalized FFT is applied (block 732) by using a predefined RX matrix [R] to extract the first and second symbols; and
  a first parallel-to-serial conversion (block 733) is applied to the first symbols extracted and a second parallel-to-serial conversion (block 734) is applied to the second symbols extracted, thereby obtaining output sequences of the first and second symbols extracted.

As far as FIG. 29 is concerned, it is important to note that many features are not shown in said FIG. 29, even though they are implicit therein (such as digital-to-analog conversion means, frequency up-shifting means, high power amplification means, etc. at the TX side 71; low noise amplification means, frequency down-shifting means, analog-to-digital conversion means, etc. at the RX side 73; etc.).

Figure 30:
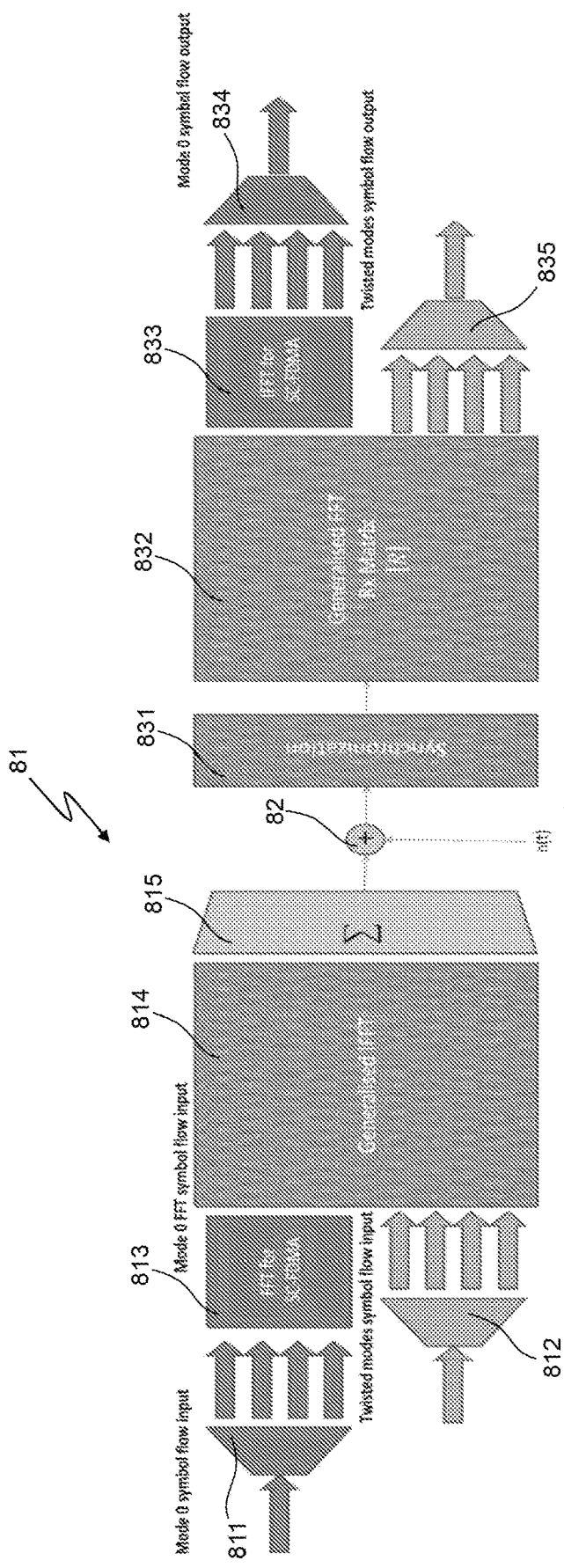
FIG. 30 schematically illustrates a radio communications architecture according to the teachings of WO 2015/189703 A2 related to the combined use of SC-FDMA with frequency twisted waves.

Moreover, FIG. 30 shows a functional block diagram schematically representing a radio communications architecture according to the teachings of WO 2015/189703 A2 related to the combined use of SC-FDMA with frequency twisted waves (and, thence, suitable, for example, for LTE uplink transmissions).

In particular, as shown in FIG. 30, at the TX side (denoted as a whole by 81) a first serial-to-parallel conversion (block 811) is applied to a first input sequence of first symbols to be transmitted and a second serial-to-parallel conversion (block 812) is applied to a second input sequence of second symbols to be transmitted, thereby parallelizing the first symbols (to be transmitted via traditional SC-FDMA) and the second symbols (to be transmitted via frequency twisted modes).

Then, an FFT (block 813) is applied to the first symbols parallelized (as requested by SC-FDMA in order to obtain symbol spreading and, thence, a low PAPR), and a Generalized IFFT (block 814) is applied to the outputs of the FFT and to the second symbols parallelized so as to generate (block 815) an output (digital) time signal transmitted through a communication channel affected by noise n(t) (block 82).

Furthermore, at the RX side (denoted as a whole by 83):
  RF frame synchronization is performed (block 831);
  a Generalized FFT is applied (block 832) by using a predefined RX matrix [R] so as to extract
    the first symbols transmitted via SC-FDMA, wherein said first symbols are obtained, as in standard SC-FDMA, via a post-processing based on IFFT (block 833) and the second symbols transmitted via frequency twisted modes; and a first parallel-to-serial conversion (block 834) to the first symbols extracted and a second parallel-to-serial conversion (block 835) is applied to the second symbols extracted, thereby obtaining output sequences of the first and second symbols extracted.

As far as FIG. 30 is concerned, it is important to note that many features are not shown in said FIG. 30, even though they are implicit therein (such as digital-to-analog conversion means, frequency up-shifting means, high power amplification means, etc. at the TX side 81; low noise amplification means, frequency down-shifting means, analog-to-digital conversion means, etc. at the RX side 83; etc.).

The two architectures of FIGS. 29 and 30 are applicable with and without the use of the Kalman filter in the RX matrix (since all the differences are concentrated in the RX matrix design).

Figure 31:
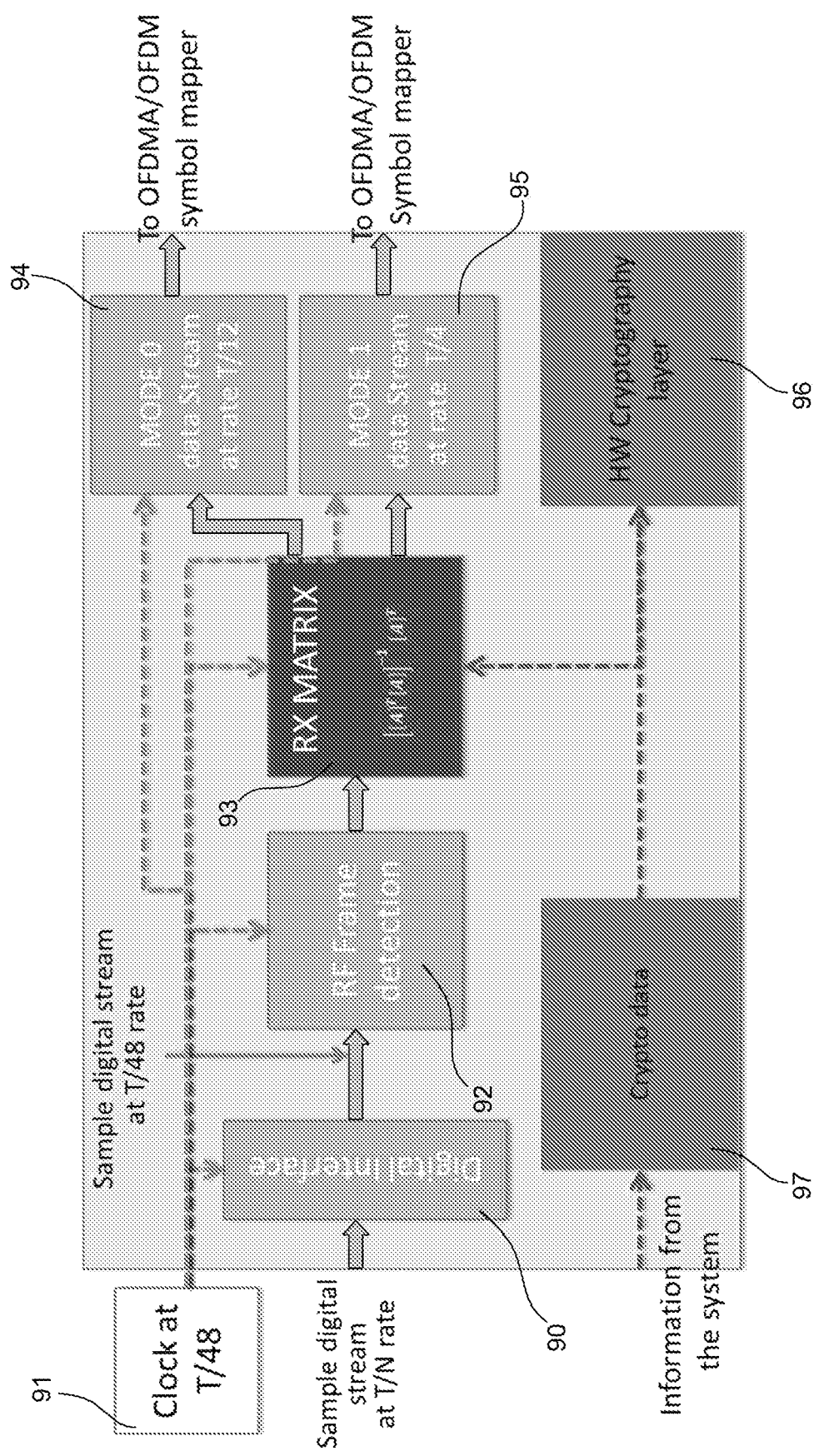
FIGS. 31 and 32 schematically illustrate examples of functional architectures suitable for application, at reception side of the radio communications architecture of FIG. 29, of a reception matrix without and with the use of a Kalman filter, respectively.

FIG. 31 schematically illustrates an example of functional architecture suitable for application of RX matrix at the RX side of the radio communications architecture shown in FIG. 29 (in particular, conveniently assuming an oversampling used also for frequency twisted waves with a clock of T/48, that is equivalent to an increase of four time of the clock rate, wherein twelve samples are used for the main mode, thirty-three for HOMs, and three are unused at the edge).

The functional architecture shown in FIG. 31 includes modules and/or units for implementing/carrying out/providing:
- a digital interface (block 90) to receive the digital sample stream;
- a clock at T/48 (block 91) to provide an oversampling clock reference indicative of the rate used to sample (in particular, to oversample) incoming signals;
- RF frame detection (block 92);
- application of the RX matrix (block 93) to extract mode 0 data stream at rate T/12 (i.e., symbols carried by the main mode—block 94) and mode 1 data stream at rate T/4 (i.e., symbols carried by OAM mode with topological charge equal to 1—block 95);
- an hardware (HW) cryptography layer (block 96); and
- system information acquisition (block 97) to receive information items (or data), such as information items/data indicative of cryptography-related features used to apply the RX matrix (block 93) and to perform cryptography (block 96).

Figure 32:
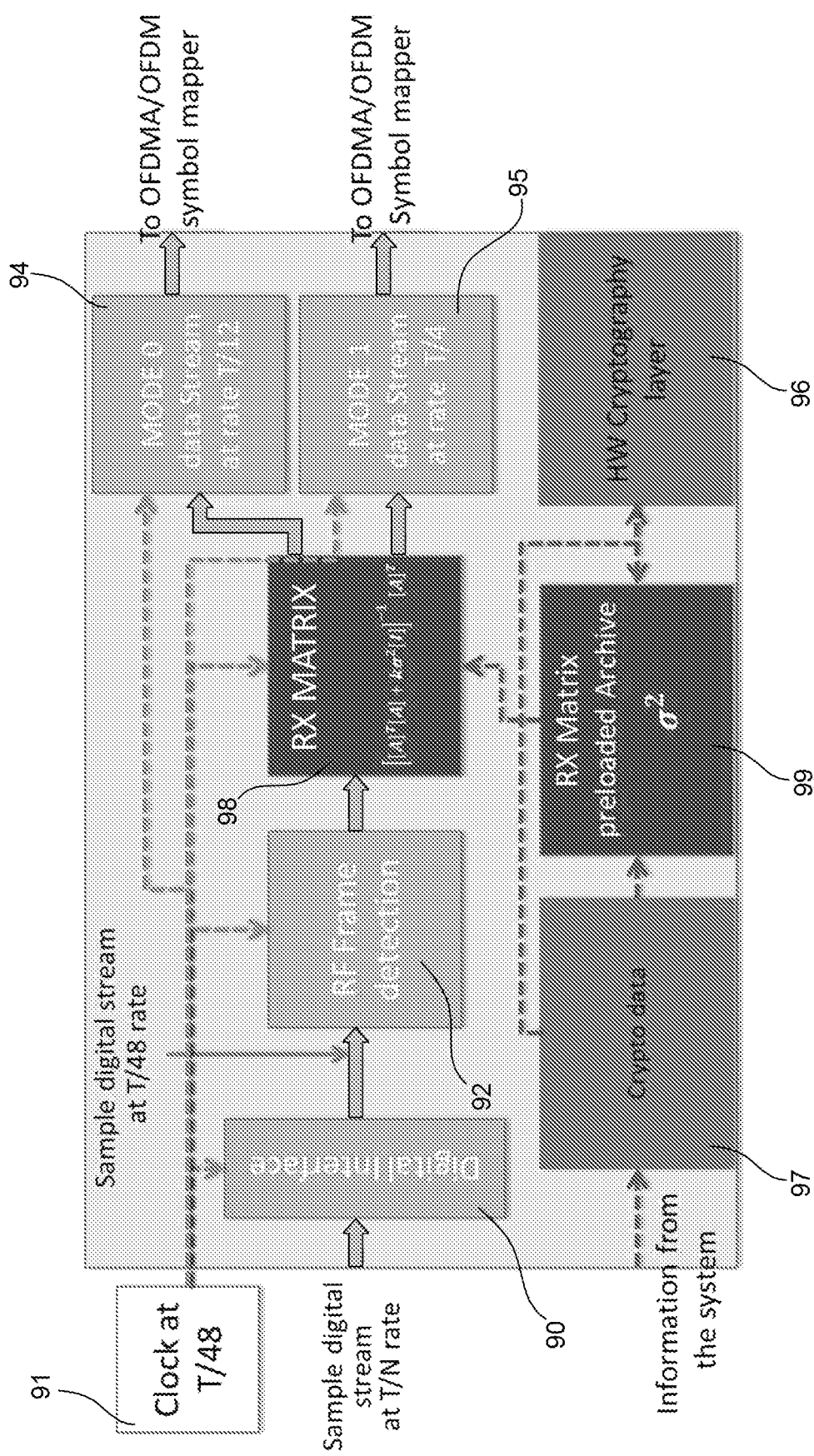

Additionally, FIG. 32 schematically illustrates an example of functional architecture suitable for application, at RX side of the radio communications architecture shown in FIG. 29, of a RX matrix with Kalman filter according to a preferred embodiment of the present invention.

In particular, the functional architecture shown in FIG. 32 differs from that one shown in FIG. 31 only in two things:
- the application of the RX matrix with Kalman filter (block 98 in FIG. 32 in place of block 93 in FIG. 31) wherein RX matrix coefficients are modified based on estimated noise level $\sigma^2$; and
- the additional presence of a preloaded RX matrix archive (block 99).

OFDMA/OFDM signals are orthogonal, therefore the main contribution to the overall S/N ratio is not generated by the cross-correlation interference as in the case of CDMA/CDM signals, but by: thermal noise, potential non-linearity of the communication channel, adjacent channel interference, or impairment due to environment. For the scope of the following analysis, a generic additive noise level has been considered.

Figure 33:
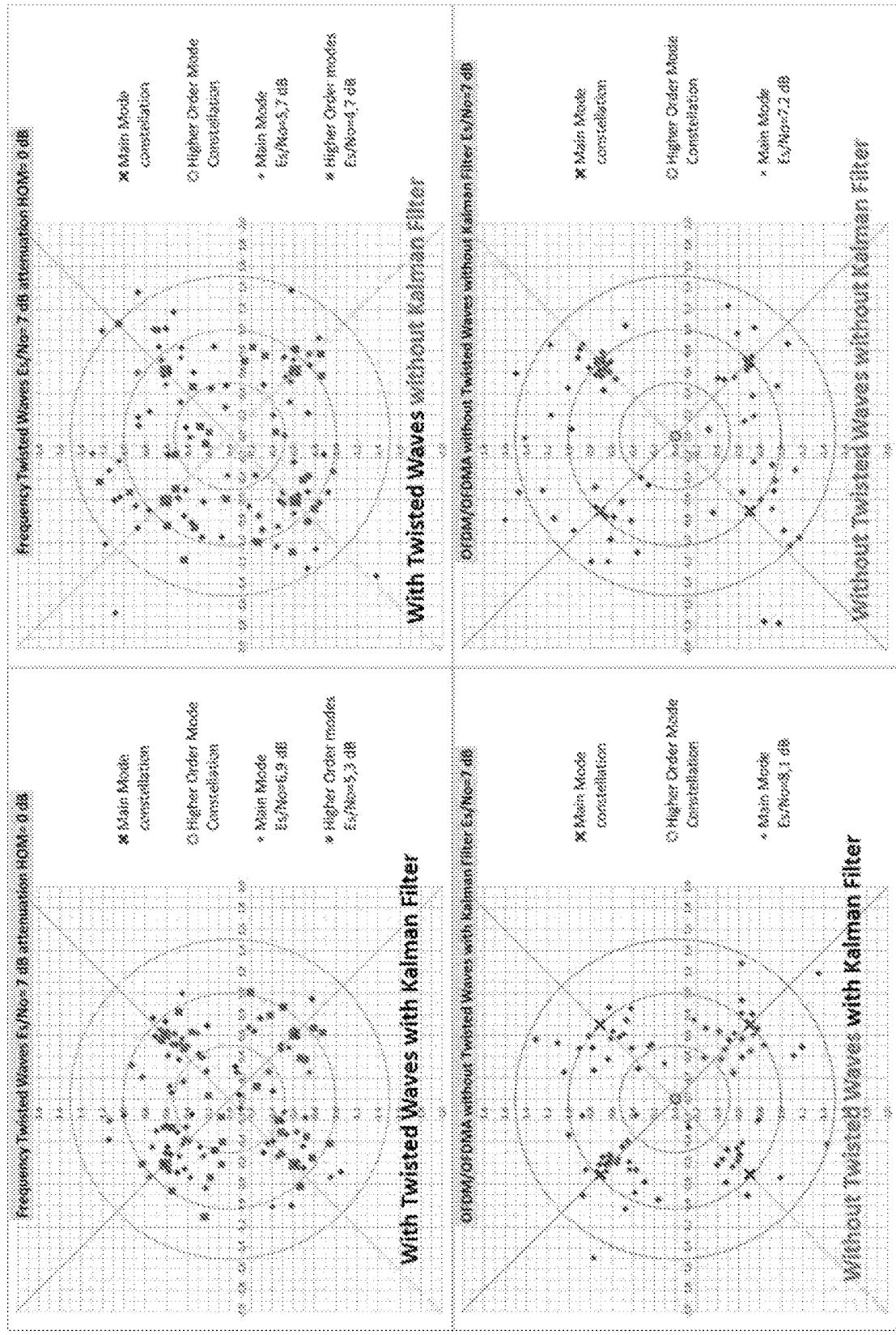
FIG. 33 shows OFDM/OFDMA performance with and without twisted waves, and with and without the use of the Kalman filter in the reception matrix.

In FIG. 33 experimental results are shown for a value of $E_s/N_0=7$ dB, considering four cases with and without twisted waves and with and without the use of the Kalman filter. The advantage of the combination of twisted waves and Kalman filter is clearly shown, but also in this case the use of Kalman filter alone gives an additional advantage with respect to the conventional case.

Figure 34:
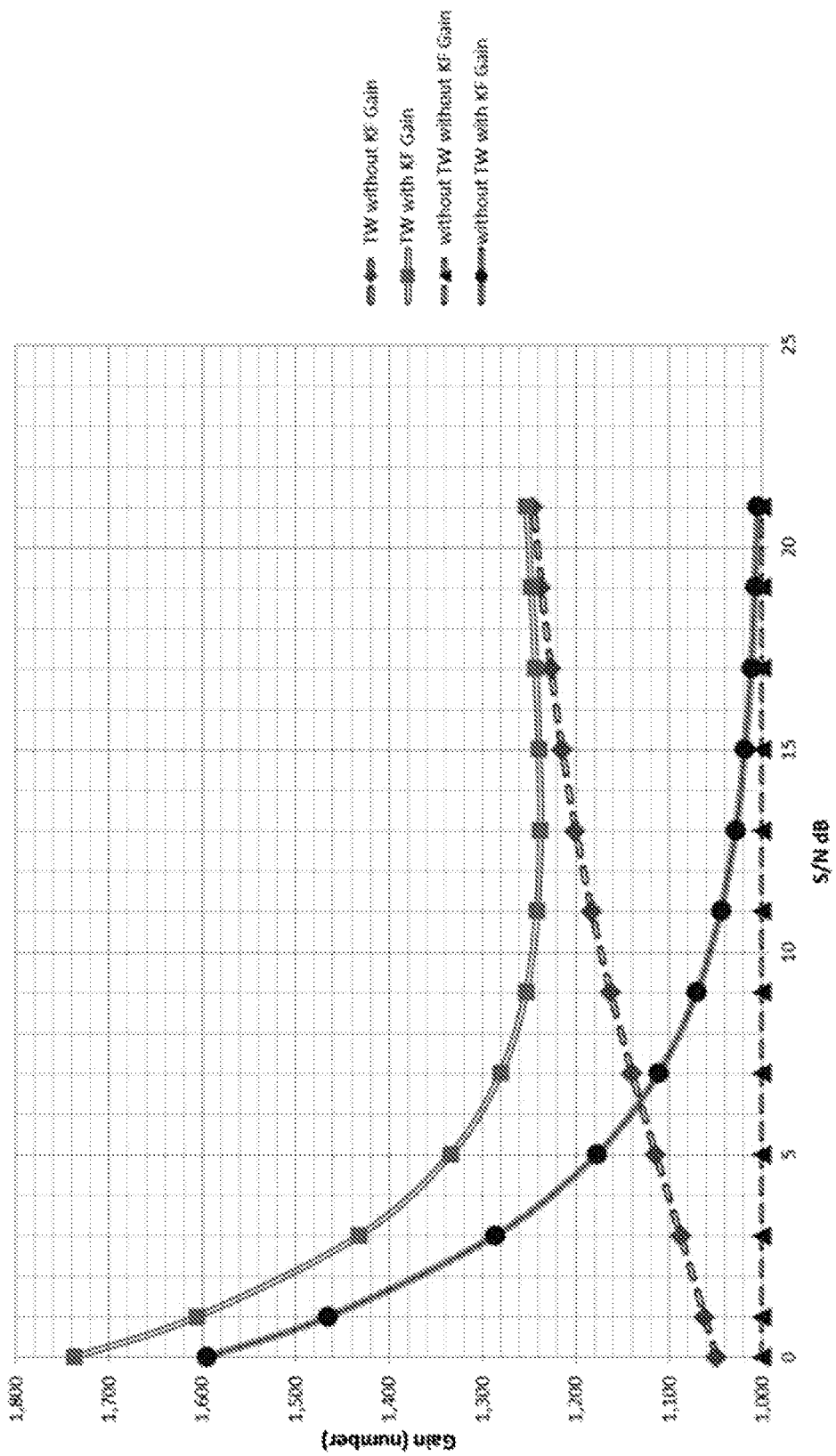
FIG. 34 shows OFDM/OFDMA's gain with and without twisted waves, and with and without the use of the Kalman filter in the reception matrix.

FIG. 34 shows OFDM/OFDMA's gain with and without Twisted waves, and with and without the use of the Kalman filter in the RX matrix, as a function of $E_s/N_0$. The improvement given by the Kalman filter at low S/N is rather important either with or without twisted waves. Due to the advantage of using a signal defined in a band much larger than the minimum one necessary for the associated symbol rate, OFDM/OFDMA performs well with twisted waves at any S/N ratio. This characteristic, which is similar to the one of CDM/CDMA signals, gives again an additional freedom in the backward compatibility strategy for the installed base, when the new system is introduced.

The overall gain can be approximated also for OFDM/OFDMA signals, similarly to the CDMA/CDM case, as the product of the twisted wave gain and the Kalman filter gain:

$$\text{Gain}_{Twisted\ Waves+Kalman\ Filter} = \text{Gain}_{Twisted\ Waves} \cdot \text{Gain}_{Kalman\ Filter}.$$

The use of OFDM allows, on one side, to limit the effects due to frequency selective fading and, on the other side, the possibility of constructively combining two or more RF paths at the receiver. In fact, the coherence bandwidth of the channel is often smaller than the bandwidth of the signal.

The use of OFDM and its use of independent, orthogonal, partially overlapped frequency slots offer the possibility to manage in an optimum way the presence of frequency slots damaged by frequency selective fading, limiting only their transmission characteristics, without sensitive impacts on the remaining slots.

The transmission capability can be optimized by correctly managing the channels, without an expensive and complex equalization system.

In order to combine more paths at the receiver, it is necessary to utilize the cyclic prefix, which has a key importance also for reducing ISI and for simply introducing frequency twisted waves in the signal organization.

The signal takes many paths to the destination; consequently, the propagation delay along each path is different. The effects are frequency selective fading and ISI.

ISI can be limited by making the baud rate of each symbol small. This is one of the main reasons for introducing OFDM. The use of the cyclic prefix allows the coherent combination of multiple paths when the signal delay is lesser than the cyclic prefix itself.

The main characteristics of a mobile channel are synthesized in the following:
- power limitation for both downlink (i.e., from the base station to the mobile terminal) and uplink (i.e., from the mobile terminal to the base station); in particular the mobile terminals generally require a low Output Back-Off (OBO) in order to optimize power consumption;
- interference from other service areas (spots); in particular, the situation can be very different according to the access system used for the mobile systems (from GSM-PCS, where essentially the frequency reuse scheme is, with a good approximation, fixed, up to UMTS based on CDMA and characterized by a large variability of the interference level due to the traffic conditions, and to LTE based on OFDM-OFDMA, where the available bandwidth is adaptive according to the multipath conditions (fading and frequency selective interference));
variability of the channel impairment during service;
environmental and thermal noises (multipath, fading and classical thermal noise).

The introduction of LTE has allowed to design and define a standard such that to optimize the overall spectral efficiency (bit/Hz/s) as a function of the SNR.

In particular, three cell sizes have been defined for LTE:
5 km optimal performance;
30 km acceptable performance;
extended cell up to 100 km.

These performances are roughly based on the capability of combining the cell diameters with the OFDM frequency slots.

From a system perspective, frequency twisted waves introduce a relation among a group of frequency slots. This condition reduces the cell diameter, considering the same environmental conditions and in agreement with the number of frequencies belonging to the frequency group.

In particular, using frequency twisted modes ±1, the frequency twisted wave group is extended over five plane wave frequency slots; adding modes ±2, the group is extended over nine plane wave frequency slots. This grouping increases the OFDM-OFDMA frequency granularity by a factor of 5 or 9; therefore, this grouping reduces the diameter of the cell, where the maximum performances are guaranteed.

The above implies that users in one and the same cell could have the possibility of either using or not the additional frequency twist layer according to their distance from the base station.

Figure 35:
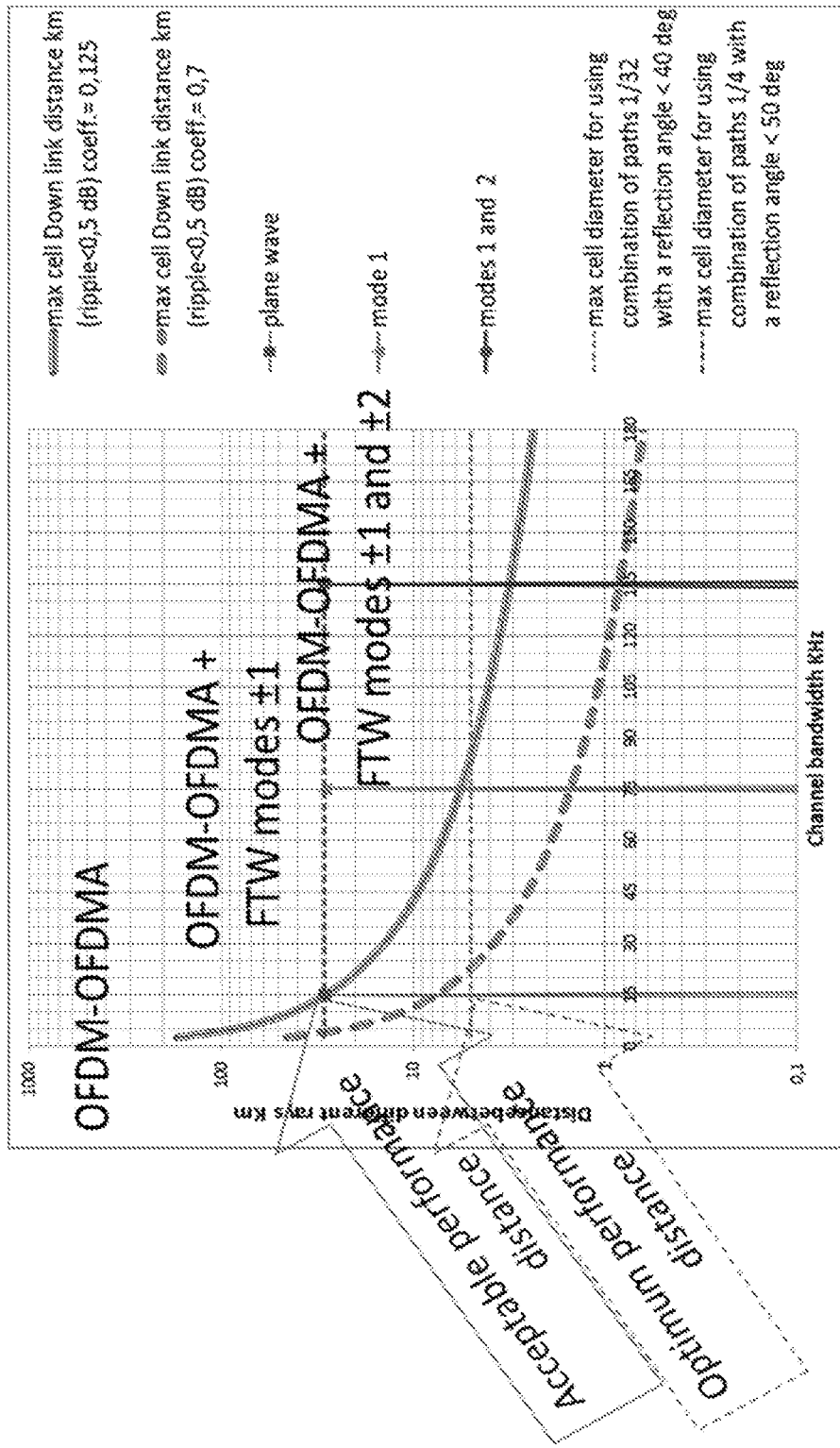
FIG. 35 shows relation between the use of frequency twisted waves and the distance from a base station of an LTE network.

In this respect, FIG. 35 schematically shows relation between the use of frequency twisted waves and the distance from the base station (i.e., eNB) of an LTE network. In particular, FIG. 35 schematically illustrates a principle: on the assumption of a given operative distance for OFDM-OFDMA, frequency twisted waves can be used up to a maximum distance that is five times smaller than said given operative distance in case of frequency twisted modes ±1, and nine times smaller if also modes ±2 are used.

As previously described, a traditional LTE physical resource block generally contains twelve sub-carriers, or frequency slots. Therefore, frequency twisted waves are introduced so as to meet this OFDM/OFDMA physical resource block hierarchy and organization. In particular, with physical resource blocks of twelve frequency slots it is possible to use either two sets of frequency twisted modes ±1, or two sets of frequency twisted modes ±1 plus one set of frequency twisted modes ±2.

A preferred embodiment according to WO 2015/189703 A2 involves only the use of frequency twisted modes ±1, which imply a higher flexibility and a lower hardware complexity than higher-order modes. Moreover, for frequency twisted modes ±1 the efficiency is equal to 10/12 (in fact, ten frequencies are used for twisted modes ±1), while for modes ±2 nine frequencies are necessary and, thence, the efficiency is 9/12. If also modes ±3 are used, the twelve-frequency block is not sufficient and, thence, it is necessary to consider two blocks so as to include the seventeen frequencies necessary for frequency twisted modes ±3.

Figure 36:
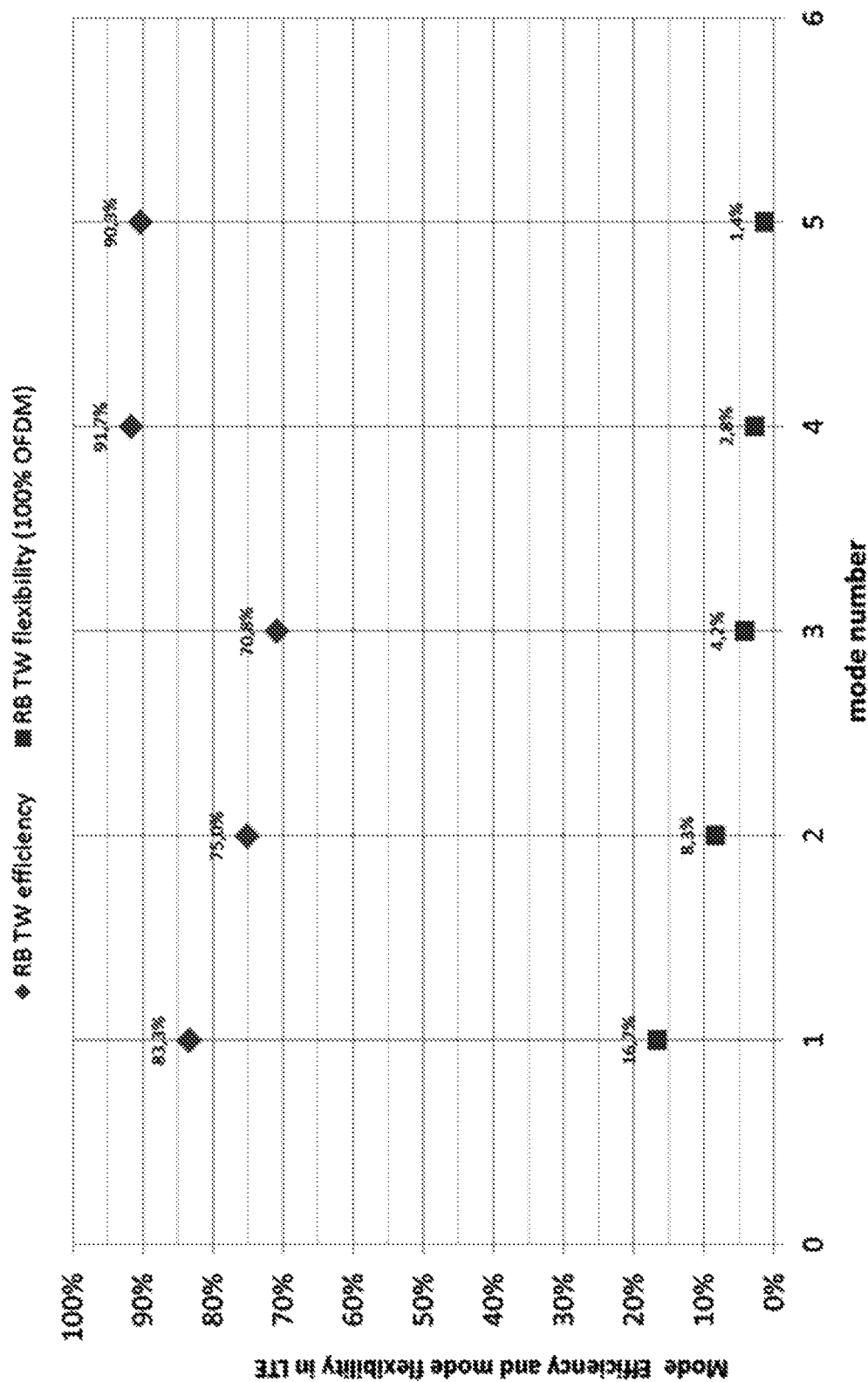
FIG. 36 shows frequency twisted mode efficiency and flexibility in LTE as a function of the topological charge of the highest twisted modes used.

In this respect, FIG. 36 schematically shows frequency twisted mode efficiency and flexibility in LTE as a function of the topological charge of the highest twisted modes used. It is clear that the best selection is a compromise between flexibility, efficiency and hardware/software complexity. FIG. 36 confirms that a preferred solution involves only the use of the first modes ±1, which represent the best choice according to the three above criteria when frequency twisted modes up to ±3 are considered. Instead, from modes ±4 onwards the efficiency grows, but flexibility reduces and hardware/software complexity rises quickly, and consequently the use of these higher-order modes proves to be poorly practical.

Figure 37:
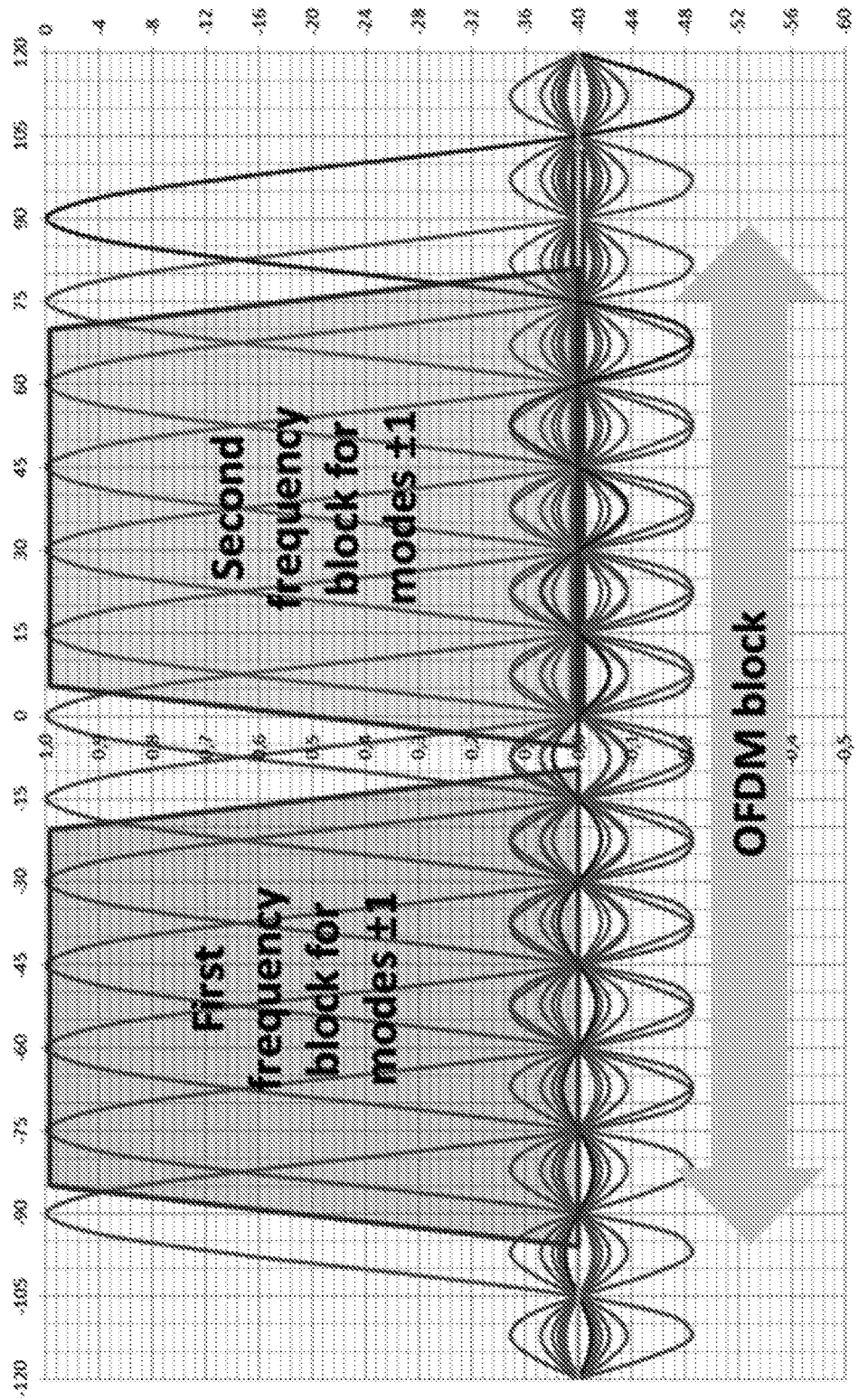
FIG. 37 shows an example of introduction of two sets of frequency twisted modes ±1 into an LTE physical resource block according to a preferred embodiment disclosed in WO 2015/189703 A2.

FIG. 37 schematically illustrates an example of introduction of two sets of frequency twisted modes ±1 into an LTE physical resource block of twelve sub-carriers according to a preferred embodiment disclosed in WO 2015/189703 A2. In particular, FIG. 37 shows positioning of the additional frequency samples of the two sets of frequency twisted modes ±1 in the LTE physical resource block.

Recently, MIMO technology has proven to be one of the most significant technical breakthrough in modern radio communications.

A key feature of MIMO technology is the ability to turn multi-path propagation, traditionally a pitfall of wireless transmission, into a benefit for the user. MIMO embraces a very wide set of wireless communication systems/methods, from single user to multiple users, open loop to close loop.

Open loop MIMO systems include Space Time Transmit Diversity (STTD) MIMO, Spatial Multiplexing (SM) MIMO and Uplink Collaborative MIMO.

In a very general way, MIMO is the use of multiple antennas at both the transmission and reception sides to improve communication performance and this is the main reason for which this technology is largely compatible with frequency twisted waves, which operate on the signal before splitting it into different antennas.

The wireless communication systems before MIMO were constrained by network capacity, which is related to channel quality and coverage of transmission on a multipath channel. In wireless communications, the propagation channel is characterized by multipath propagation due to scattering on different obstacles. Multipath is a typical issue in communication systems, since it entails time variations and time spread. As for time variations, multipath causes channel fading and S/N variations. As for time spread, multipath becomes important for suitable frequency selectivity.

Smart antenna systems can positively react against the above problems and can be divided into the following types:
Single Input Single Output (SISO), wherein both the transmitter and the receiver have only one antenna;
Single Input Multiple Output (SIMO), wherein the transmitter has one antenna, while the receiver has multiple antennas;
Multiple Input Single Output (MISO), wherein the transmitter has multiple antennas, while the receiver has one antenna; and
MIMO, wherein, as previously explained and as broadly known, both the transmitter and the receiver have multiple antennas.

MIMO exploits the geometrical (physical) space dimension to improve wireless systems capacity, range and reliability. It offers significant increases in data throughput and link range without additional bandwidth or increased transmit power. MIMO achieves this goal by spreading the same total transmit power over the antennas to achieve an array gain that improves the spectral efficiency (more bit/s/Hz) or to achieve a diversity gain that improves the link reliability (reduced fading). The channel capacity increases according to the increase in the number of antenna elements. In particular, MIMO systems' capacity increases linearly with the number of antennas (or antenna elements), while the capacity of SIMO and MISO systems increases with the logarithm of the number of antennas (or antenna elements).

There are two major classifications related to MIMO, which are based on:

type of MIMO control, which, in turn, includes two major categories, namely open loop MIMO, wherein the communication channel does not use explicit information regarding the propagation channel; common open loop MIMO techniques include Space Time Transmit Diversity (STTD) MIMO, Spatial Multiplexing (SM) MIMO, and Collaborative Uplink MIMO; and closed loop MIMO techniques (Transmitter Adaptive Antenna (TX-AA) techniques) are also known as beam-forming; and number of users, which, in turn, includes two major categories, namely Single User MIMO (SU-MIMO), wherein data rate is increased for a single user; and Multi-User MIMO (MU-MIMO) or collaborative MIMO, wherein individual streams are assigned to various users; this mode is particularly useful in uplink, since it keeps complexity at the user side at a minimum by using only one transmitting antenna.

As for MIMO, antenna technology is the key technology in increasing network capacity. Essentially, MIMO is an intelligent way to optimize the geometrical space to get from it the best performance.

For MIMO, the operations are, thence, based on RF propagation characteristics. On the other hand, the frequency twisted waves operate on the signal without any assumption on the propagation channel (except for the condition that it is reasonably flat for each twisted wave frequency slot). The use of the main mode (the "even" one) and the higher-order modes (the "odd" ones) is possible using the property of the approximated Hilbert transform applied to digital signals (in particular to OFDM-OFDMA and SC-FDMA signals) and the orthogonality is defined in terms of a full set of functions generated in the "frequency space".

Antenna technology improvement have allowed to fully utilize the space properties, passing from the pioneering GSM sectored antennas (in GSM the capacity can be tripled by 120 degree antennas that act as "space Filters") to adaptive antennas, which intensify spatial multiplexing using narrow beams, up to smart antennas, which are adaptive antenna arrays but differ in their smart direction of arrival (DoA) estimation. Smart antennas can form a user-specific beam.

The latest antennas are based on beam-forming; they can be considered time-varying space filters suitable for creating the radiation pattern of an antenna array. Beam-forming can be applied in all antenna arrays and MIMO systems.

MIMO systems use a number of functions to optimize space performance:

pre-coding (a generalization of beam-forming to support multi-layer transmission in multi-antenna wireless communication environments);

spatial multiplexing (using only MIMO antenna configuration; in spatial multiplexing, a high-rate signal is split into multiple lower-rate streams and each stream is transmitted from a different transmitting antenna in one and the same frequency channel; if these signals arrive at the receiver antenna array with sufficiently different spatial signatures, the receiver can separate these streams into (almost) parallel channels; spatial multiplexing is a very powerful technique for increasing channel capacity at higher signal-to-noise ratios); and diversity coding (used when there is no channel knowledge at the transmission side; in diversity methods, a single stream, unlike multiple streams in spatial multiplexing, is transmitted, but the signal is coded using techniques called space-time coding).

MIMO has been largely used in 3GPP systems and in LTE.

An analysis at system level has been carried out by the Applicant, considering the variety of situation and the consequent complexity. Essentially, the increase in the number of frequency slots necessary for generating the frequency twisted waves results in the fact that the conventional OFDM/OFDMA and SC-FDMA can be used up to a distance R from the base station, while the frequency twisted waves can be used up to a distance R/5 from the base station, but this is not an absolute limitation, since the actual scenario depends on the type of cell and environment. In fact, there could be a wide number of cases to which the aforesaid limitation does not apply (for instance, in the case of beam-forming and some MIMOs).

From cellular network operators' perspective, frequency twisted waves represent an additional system layer for LTE and LTE Advanced, which offers the capability, in many cases, to increase the channel capacity up to a factor of about 1.3 with Kalman filter and 1.2 without Kalman filter, at S/N=5 dB.

The introduction of Kalman filter is compatible with the application of MIMO independently of the presence of twisted waves and the total gain is given by the gain product.

It is worth noting that LTE can operate combining signals according to several operational modes:

diversity;

beam-forming;

SDMA (Spatial Division Multiple Access); and

MIMO (Multiple Input Multiple Output).

These operational modes imply that their use and their combinations are possible only under certain operational conditions and, thence, not always.

The above operational modes are derived from propagation and smart antenna characteristics and are all compatible with frequency twisted wave technology with (or without) the use of the Kalman filter; in addition, they may operate in presence of the Kalman filter without twisted waves. In fact, the optimization of the antennas is independent, in principle, from the characteristics of the frequency twisted waves and from the additional function of estimation supplied by the Kalman Filter, which are properties of the single RF channel before the antenna. The only dependence is thence related to the signal bandwidth used for said operational modes.

Figure 38:
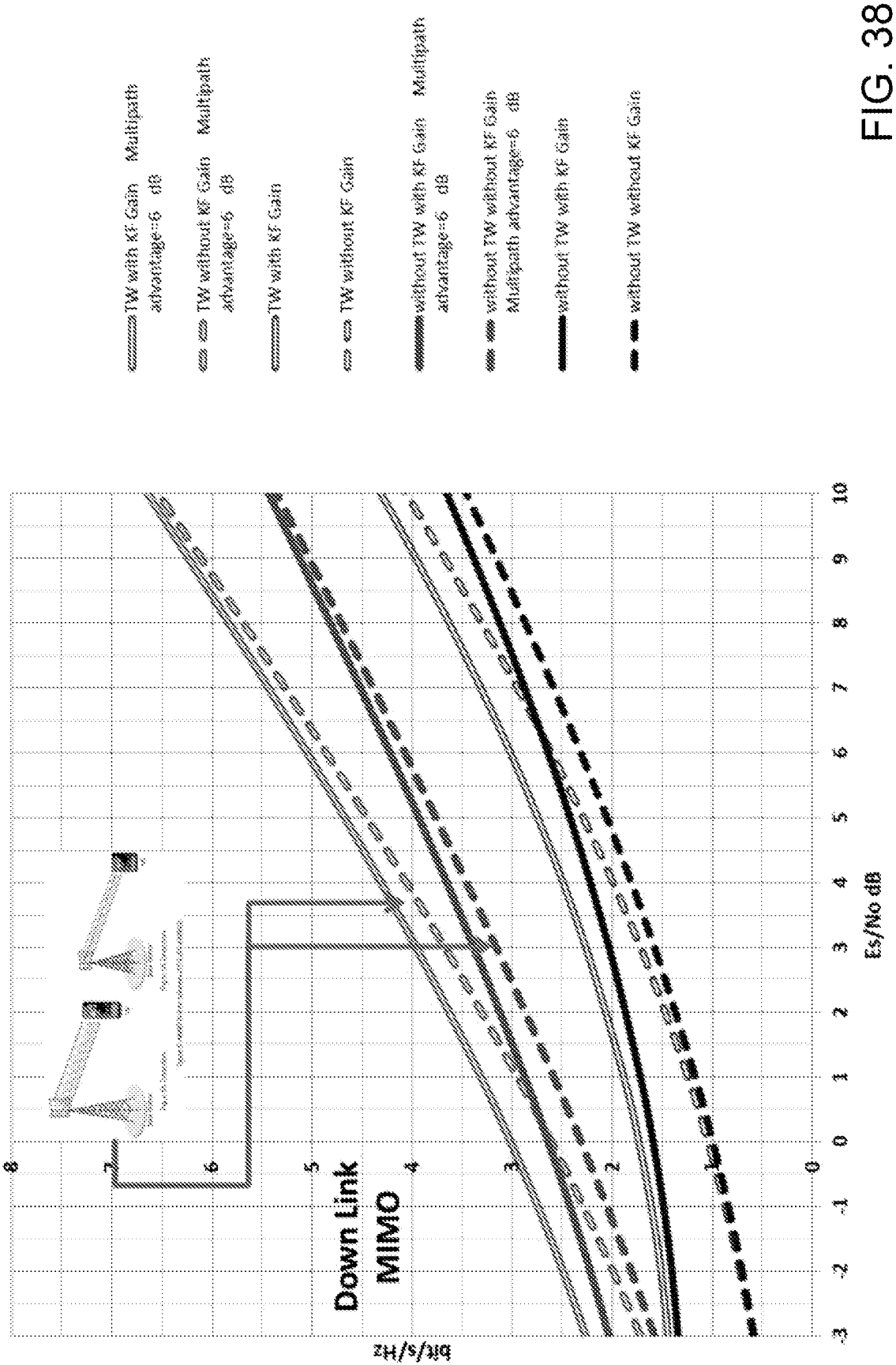
FIGS. 38 and 39 show spectral efficiency in downlink and uplink, respectively, with respect to the conventional LTE system with and without the use of the Kalman filter, and with and without MIMO gain.
Figure 39:
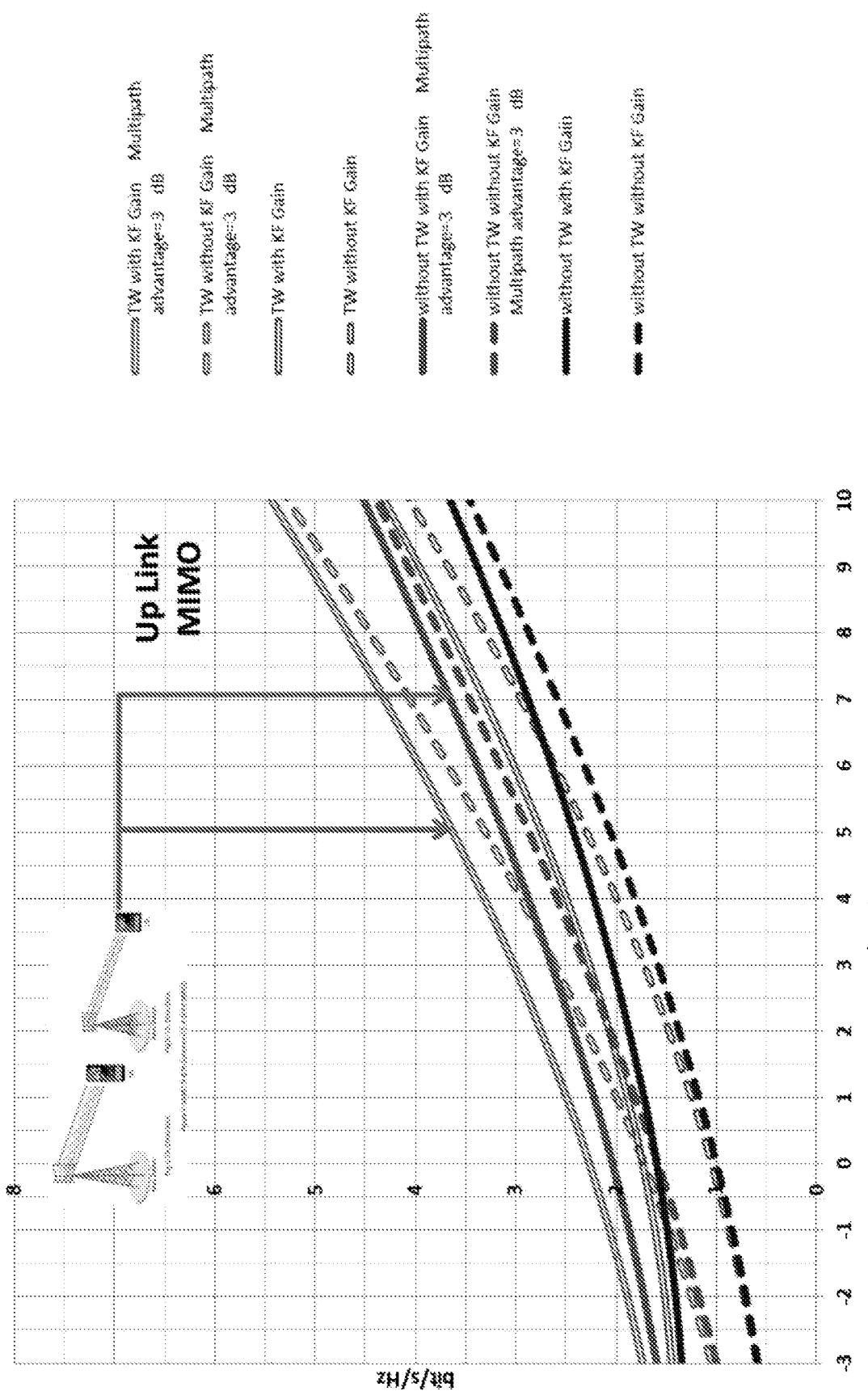

FIG. 38 shows improvement due to frequency twisted waves for downlink with respect to the conventional LTE system with and without Kalman filter, with and without MIMO gain, while FIG. 39 shows the corresponding situation in uplink with 3 dB gain for MIMO. The advantage of frequency twisted waves increases vs S/N. It can be noted that frequency twisted waves produce a dramatic improvement when Kalman filter is applied in the area of 8 dB S/N either in presence of MIMO or not. The two layers are, indeed, independent when both twisted waves and MIMO can be applied.

It is interesting to note the additional level of flexibility ⅘ G obtainable with the introduction of twisted wave with the adoption of the Kalman filter. The bit/s/Hz can be selected properly choosing the wished combination of MIMO and twisted waves.

At 5 dB S/N, the uplink bit/s/Hz can be optimized from 2 to 3 by using only MIMO and from 2 to 3.6 by using the Kalman filter and twisted waves, while the downlink bit/s/Hz from 2 to 3.9 by using only MIMO and from 2 to 4.6 by using twisted waves with the Kalman filter.

In general terms, the integration of frequency twisted waves, Kalman Filter, LTE and smart antennas can be usefully summarized as presented in the following table according to the possibility of constructively using multipath, MIMO or beam forming in presence of smart antennas.

TABLE

|  | Kalman Filter | MIMO | Beam Forming | Multipath |
|---|---|---|---|---|
| Conventional OFDMA | yes | yes | yes | yes in a cell with R radius |
|  | no | yes | yes | yes in a cell with R radius |
| OFDMA + Twisted Waves | yes | yes | yes | yes in a cell with R/5 radius |
|  | no | yes | yes | yes in a cell with R/5 radius |

Kalman filter can be always used without any restriction; the only limitation may be in the cell radius as indicated in the above table; in fact, twisted waves in presence of strong multipath may have a restriction on the application cell radius, but no restriction in case of MIMO or beamforming.

MIMO and twisted waves can be applied in the different zones according to frequency modularity. This implies that the frequency twisted waves can be considered an additional layer of the physical channel when it is available, the Kalman filter can be applied for MIMO only, for twisted waves only and for both according to the cell propagation characteristics.

As an example, two configurations are presented for downlink and uplink with OBO 0.5 and 2 dB respectively, assuming a full cell diameter of about 7 km and an inner diameter of about 1.5 km.

From the above table it is possible to appreciate the potential advantage, derived from the introduction of frequency twisted waves and Kalman filter in the LTE architecture.

7. CLOSING REMARKS

From the foregoing, the innovative features and the technical advantages of the present invention are immediately clear.

In conclusion, it is clear that numerous modifications and variants can be made to the present invention, all falling within the scope of the invention, as defined in the appended claims.

The invention claimed is:

1. A radio communications method including carrying out, by a transmitter, transmission operations that comprise:
   generating digital transmission signals carrying symbols to be transmitted and having a predefined time length; and
   transmitting a radio frequency signal carrying, in successive, non-overlapped time frames or slots having the predefined time length, the digital transmission signals generated;
   the radio communications method further including carrying out, by a receiver, reception operations that comprise:
   receiving the radio frequency signal transmitted by the transmitter;
   processing the received radio frequency signal so as to obtain a corresponding digital incoming signal;
   applying an oversampling operation to the digital incoming signal thereby obtaining an oversampled digital incoming signal;
   detecting successive, non-overlapped time frames/slots with the predefined time length in the oversampled digital incoming signal; and,
   for each detected time frame/slot, estimating respective symbols carried by the oversampled digital incoming signal in said time frame/slot by using a predefined reception matrix, wherein the predefined reception matrix incorporates a static and non-iterative Kalman filter based on predefined or estimated noise levels related to radio communication carried out by the transmitter and the receiver.

2. The radio communications method of claim 1, wherein the digital transmission signals are generated by using one of the following digital transmission techniques: a predefined raised-cosine-filter-based technique, a predefined code-division technique, or a predefined frequency-division technique.

3. The radio communications method of claim 2, wherein the radio frequency signal is transmitted through a satellite transponder.

4. The radio communications method according to claim 1, wherein the generated digital transmission signals carry:
   first symbols via a first phase, or amplitude and phase, digital modulation related to an Orbital Angular Momentum mode with topological charge equal to zero; and
   second symbols via a second phase, or amplitude and phase, digital modulation related to one or more Orbital Angular Momentum modes with topological charge different than zero.

5. The radio communications method of claim 4, wherein the first and second phase, or amplitude and phase, digital modulations are performed in time or frequency domain.

6. A radio communications system comprising a transmitter and a receiver configured to carry out, respectively, the transmission and the reception operations of the radio communications method as defined in claim 1.

7. A transmitting and receiving equipment configured to carry out the transmission operations and the reception operations of the radio communications method as defined in claim 1.

8. A transmitting equipment configured to carry out the transmission operations of the radio communications method as defined in claim 1.

9. A receiving equipment configured to carry out the reception operations of the radio communications method as defined in claim 1.

10. A radio communications method including carrying out, by a transmitter, transmission operations that comprise:
   generating digital transmission signals carrying symbols to be transmitted and having a predefined time length, wherein the generated digital transmission signals carry:
   first symbols via a first phase, or amplitude and phase, digital modulation related to an Orbital Angular Momentum mode with topological charge equal to zero; and second symbols via a second phase, or amplitude and phase, digital modulation related to one or more Orbital Angular Momentum modes with topological charge different than zero; and transmitting a radio frequency signal carrying, in successive, non-overlapped time frames or slots having the predefined time length, the digital transmission signals generated;

the radio communications method further including carrying out, by a receiver, reception operations that comprise:

receiving the radio frequency signal transmitted by the transmitter;

processing the received radio frequency signal so as to obtain a corresponding digital incoming signal;

applying an oversampling operation to the digital incoming signal thereby obtaining an oversampled digital incoming signal;

detecting successive, non-overlapped time frames/slots with the predefined time length in the oversampled digital incoming signal; and, for each detected time frame/slot, estimating respective symbols carried by the oversampled digital incoming signal in said time frame/slot by using a predefined reception matrix incorporating a predefined Kalman filter.

* * * * *